(12) United States Patent
Shimizu et al.

(10) Patent No.: US 6,386,001 B1
(45) Date of Patent: May 14, 2002

(54) OPTICAL FIBER MANUFACTURE METHOD INCLUDING ELONGATING A PREFORM IN A VERTICAL DIRECTION AND A HORIZONTAL DIRECTION

(75) Inventors: Yoshiaki Shimizu; Takaaki Nagano; Tadakatsu Shimada; Hideo Hirasawa; Masataka Watanabe; Kazuhisa Hatayama; Mitsukuni Sakashita; Minoru Taya; Waichi Yamamura; Shinji Suzuki, all of Annaka; Jiro Moriya, Niigata, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/434,280

(22) Filed: Nov. 5, 1999

(30) Foreign Application Priority Data

| Nov. 5, 1998 | (JP) | 10-314553 |
| Nov. 5, 1998 | (JP) | 10-314564 |
| Nov. 5, 1998 | (JP) | 10-314574 |
| Nov. 6, 1998 | (JP) | 10-315849 |
| Nov. 6, 1998 | (JP) | 10-315856 |
| Jan. 19, 1999 | (JP) | 11-010197 |
| Jan. 25, 1999 | (JP) | 11-015293 |
| Jan. 26, 1999 | (JP) | 11-016840 |
| Feb. 23, 1999 | (JP) | 11-044902 |
| Feb. 24, 1999 | (JP) | 11-046141 |
| Mar. 11, 1999 | (JP) | 11-064994 |
| Mar. 12, 1999 | (JP) | 11-065819 |
| Mar. 12, 1999 | (JP) | 11-067199 |
| Mar. 12, 1999 | (JP) | 11-067366 |
| Mar. 19, 1999 | (JP) | 11-075129 |
| Apr. 20, 1999 | (JP) | 11-112354 |
| Apr. 26, 1999 | (JP) | 11-118094 |

(51) Int. Cl.[7] ............... C03B 37/07; C03B 37/025

(52) U.S. Cl. .............. 65/377; 65/381; 65/382; 65/486; 65/404; 65/435

(58) Field of Search .................. 65/381, 377, 382, 65/486, 404, 435

(56) References Cited

U.S. PATENT DOCUMENTS

| 4,793,840 A | * | 12/1988 | Harding | 65/381 |
| 5,755,849 A | * | 5/1998 | Hoshino | 65/381 |
| 6,098,428 A | * | 8/2000 | Bogdahn | 65/381 |
| 6,134,922 A | * | 10/2000 | Shimada | 65/381 |
| 6,138,480 A | * | 10/2000 | Blais | 65/486 |
| 6,178,778 B1 | * | 1/2001 | Kenmochi | 65/381 |

FOREIGN PATENT DOCUMENTS

| DE | 3929894 | * | 3/1991 | | 65/486 |
| EP | 870736 | | 10/1998 | | |
| EP | 881196 | | 12/1998 | | |
| JP | 63151640 | * | 6/1988 | | 65/377 |
| JP | 3115131 | * | 5/1991 | | 65/381 |
| JP | 4331734 | * | 11/1992 | | 65/381 |
| WO | 98/49109 | | 11/1998 | | |

OTHER PUBLICATIONS

Patent Abstracts of Japan, Ichie, Jun. 14, 1986, Hot Drawing Method of Glass, 61127629.

Patent Abstracts of Japan, Ishikura, Dec. 26, 1986, Automatic Drawing Device for Parent Material for Optical Fiber, 61295252.

(List continued on next page.)

*Primary Examiner*—John Hoffmann
(74) *Attorney, Agent, or Firm*—Pillsbury Winthrop LLP

(57) ABSTRACT

A method for manufacturing an optical fiber comprises setting a heating condition for heating a glass rod, which is a parent material of the optical fiber, and an elongating speed of the glass rod based on a prescribed numerical value which changes with a progress of elongation of the glass rod; heating and elongating the glass rod to generate a preform based on the heating condition and the elongating speed which are set by the setting; and drawing the preform to a filament-like form by further heating the preform to generate the optical fiber.

8 Claims, 45 Drawing Sheets

OTHER PUBLICATIONS

Patent Abstracts of Japan, Ishikura, Dec. 26, 1986, Drawing Method for Parent Material for Optical Fiber, 61295251.

Patent Abstracts of Japan, Suzuki, Drawing Method for Parent Material for Optical Fiber, vol. 11, No. 167, May 28, 1986 & JP 61 295250 A (Dainichi Nippon Cables Ltd.), Dec. 26, 1986.

Patent Abstracts of Japan, Ishikura, Automatic Drawing Device for Parent Material for Optical Fiber, vol. 11, No. 167, May 28, 1986 & JP 61 295253 A (Dainichi Nippon Cables Ltd.), Dec. 26, 1986.

Patent Abstracts of Japan, Narita, Drawing Machine for Parent Material of Optical Fiber, vol. 9, No. 74, Apr. 3, 1985 & JP 59 207849 A (Hitachi Cable Co. Ltd.), Nov. 26, 1984.

Patent Abstracts of Japan, Furuya, Apparatus for Drawing Optical Fiber Preform, vol. 10, No. 36, Feb. 13, 1986 & JP 60 186431 A (Furukawa Electric Co. Ltd.), Sep. 21, 1985.

Patent Abstracts of Japan, Mukai, Stretching Method and Device for Preform for Optical Fiber, vol. 17, No. 627, Nov. 19, 1993 & JP 05 193970 A (Sumitomo Electric Ind. Ltd.), Aug. 3, 1993.

Patent Abstracts of Japan, Yokogawa, Production of Quartz Rod, vol. 15, No. 38, Jan. 30, 1991 & JP 02 275723 A (Shin–Etsu Chem. Co. Ltd.), Nov. 9, 1990.

* cited by examiner 380
(a)
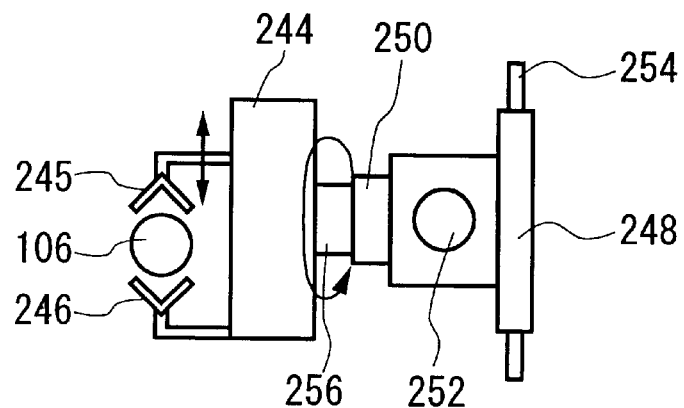
380
(b)
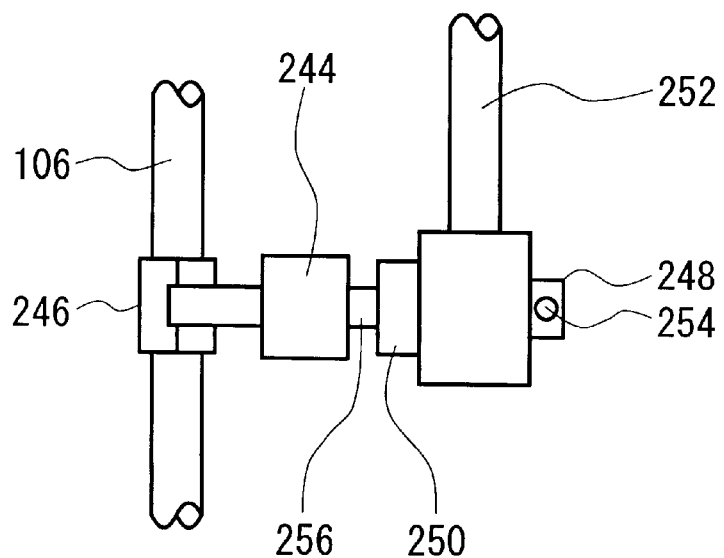
FIG. 20

224
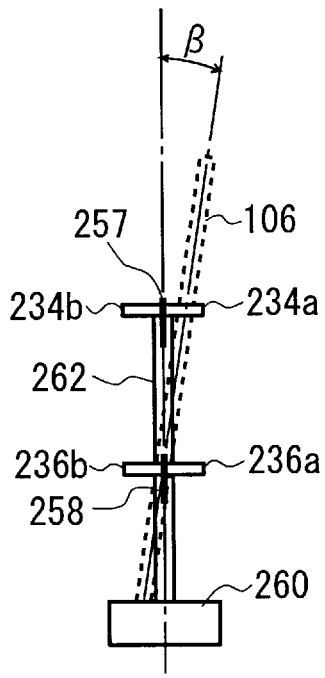
(a)
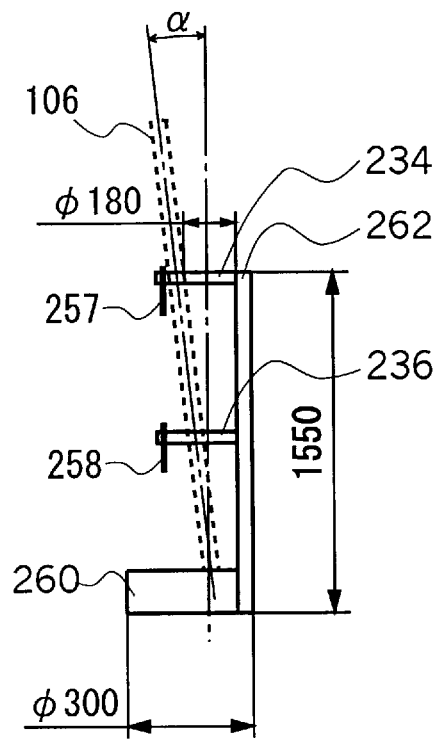
(b)
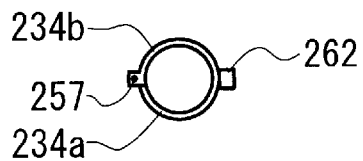
(c)
FIG. 21

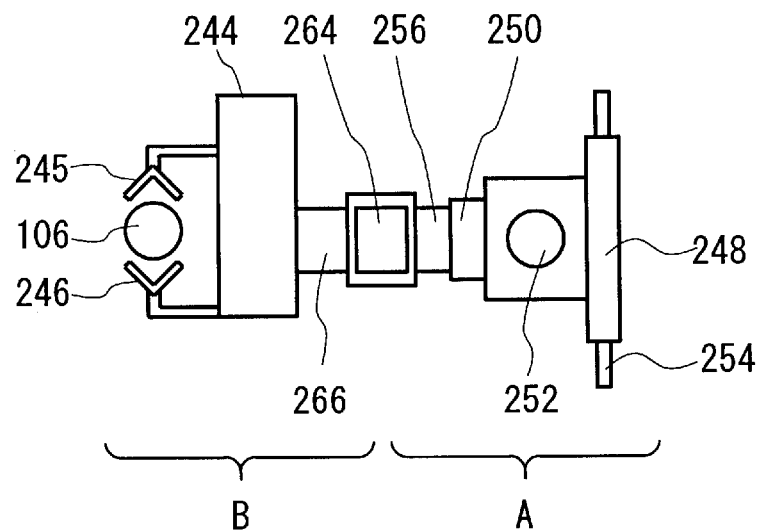
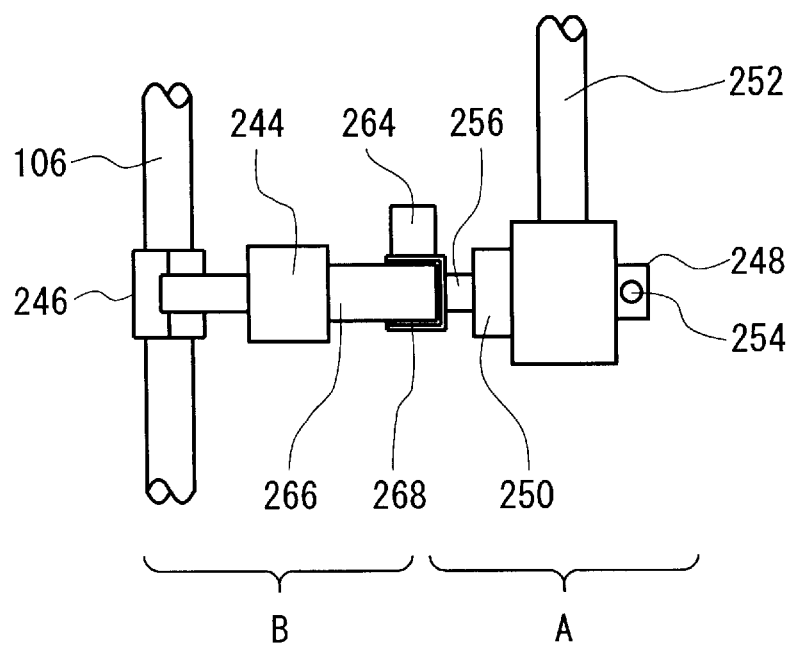
FIG. 23

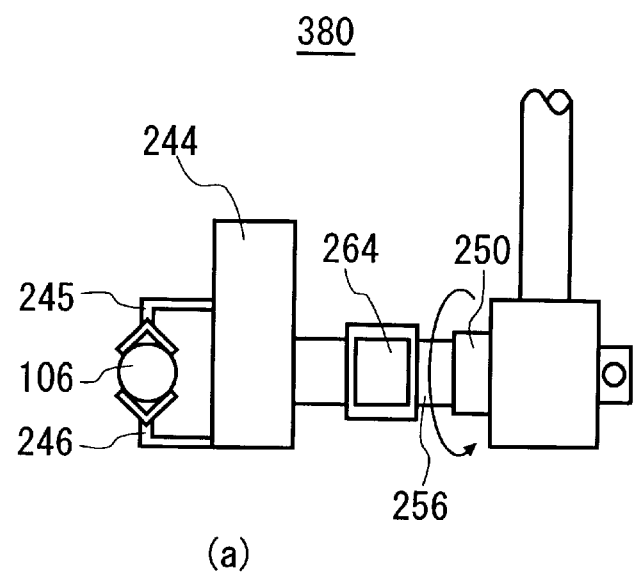
(a)
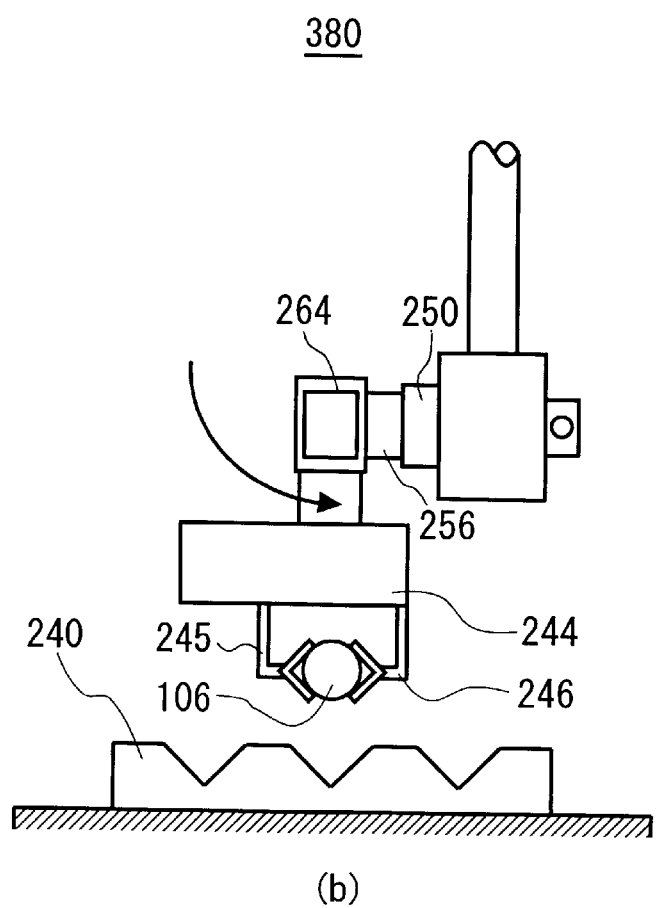
(b)
*FIG. 24*

|  | DISTANCE BETWEEN HEATING SOURCE AND DIAMETER MEASUREMENT DEVICE | FLOW RATE OF GAS | | HEATING SOURCE MOVING SPEED (mm/min) | PERCENTAGE OF FLUCTUATION OF DIAMETER OF GLASS ROD (%) |
|---|---|---|---|---|---|
|  |  | HYDROGEN (l/min) | RATIO OF FLOW RATE OF HYDROGEN TO OXYGEN |  |  |
| EXAMPLE1 | 15 | 224 | 2.5 | 11 | 0.9 |
| EXAMPLE2 | 40 | 199 | 2.5 | 13 | 0.6 |
| COMPARATIVE EXAMPLE1 | 5 | 209 | 2.5 | 12 | 3.7 |
| COMPARATIVE EXAMPLE2 | 60 | 237 | 2.5 | 10 | 2.5 |
| COMPARATIVE EXAMPLE3 | 15 | 215 | 1.0 | 12 | COULD NOT DRAW |
| COMPARATIVE EXAMPLE4 | 15 | 195 | 4.0 | 13 | COULD NOT DRAW |
| COMPARATIVE EXAMPLE5 | 15 | 204 | 2.5 | 70 | COULD NOT DRAW |

FIG. 29

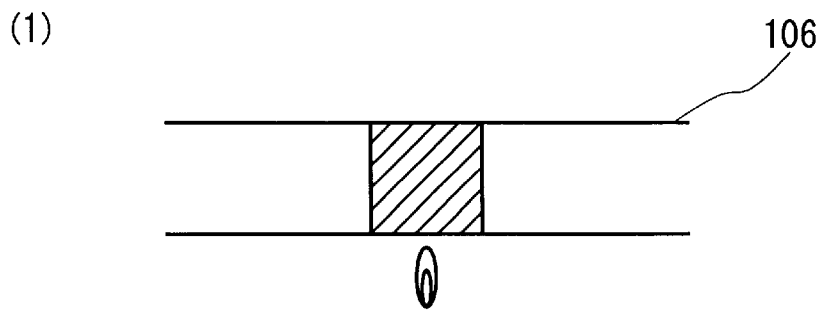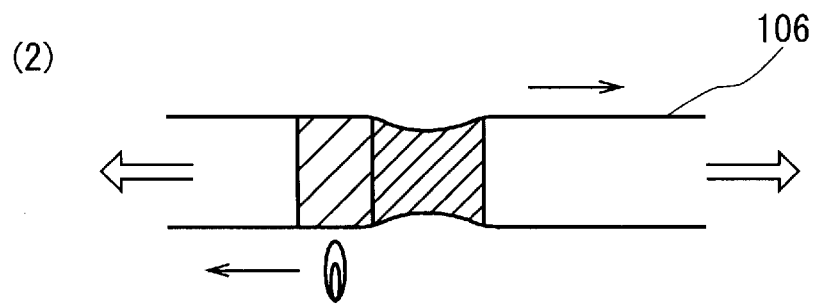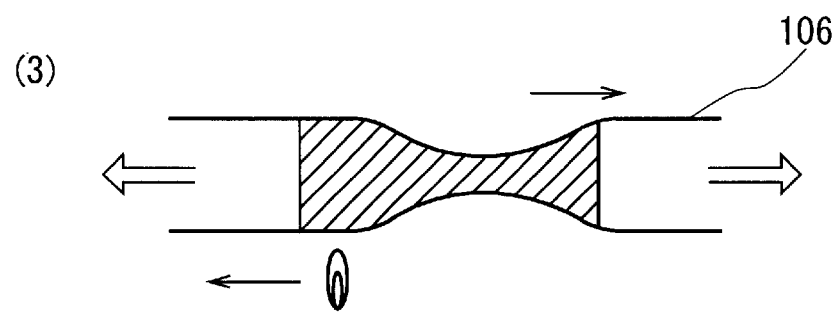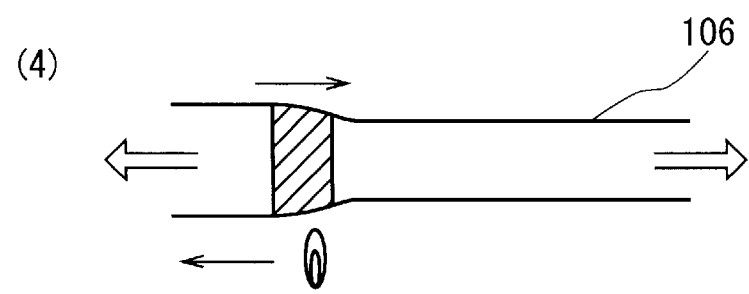
FIG. 32

① PRE-HEATING FOR END DRAWING
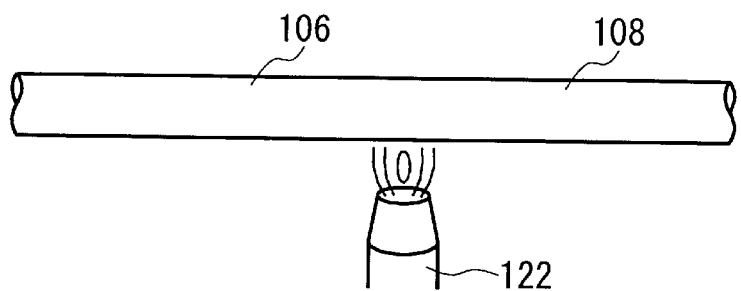
② ELONGATING FOR END DRAWING
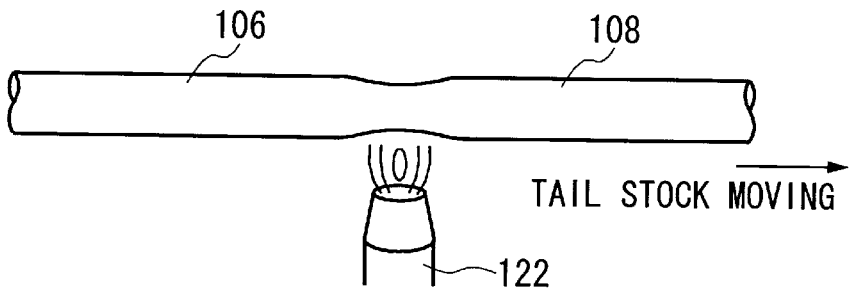
③ SECOND HEATING
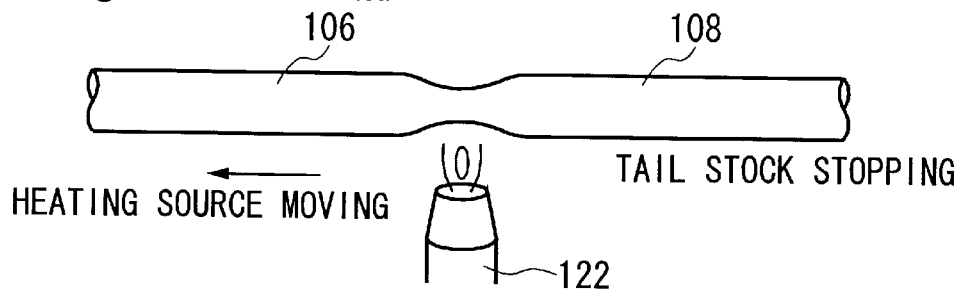
④ SECOND ELONGATING FOR END DRAWING
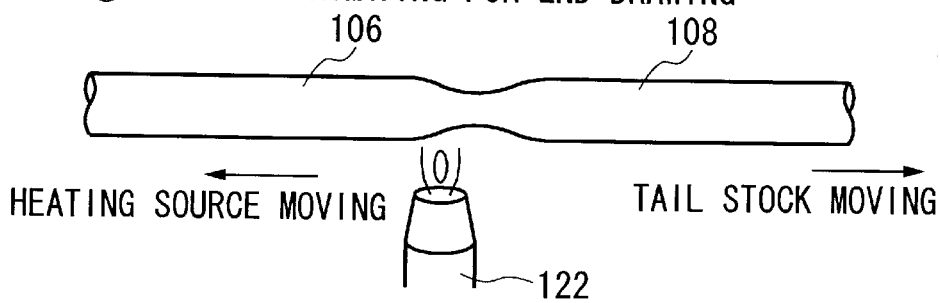
⑤ FUSING FOR END DRAWING
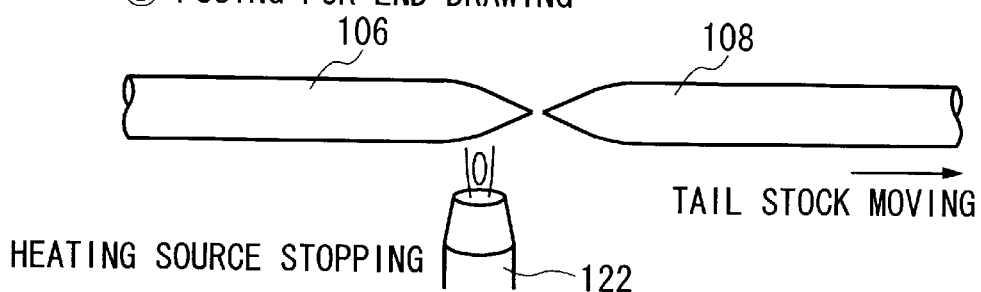
*FIG. 41*

FIG. 42

| PROCESS | PROGRESS TIME (second) | HEATING SOURCE GAS AMOUNT (cc/minute) | | | HEATING SOURCE MOVING DISTANCE (mm) | TAIL STOCK MOVING SPEED (mm/minute) |
| --- | --- | --- | --- | --- | --- | --- |
| | | $H_2$ | $O_2$ (INSIDE) | $O_2$ (OUTSIDE) | | |
| ① PRE-HEATING FOR END DRAWING | 300 | 250 | 30 | 100 | 0 | 0 |
| ② ELONGATING FOR END DRAWING | 60 | 250 | 30 | 100 | 0 | 10 |
| ③ SECOND HEATING | 20 | 130 | 15 | 50 | 15 | 0 |
| ④ SECOND ELONGATING FOR END DRAWING | 180 | 130 | 15 | 50 | 15→25 | 10 |
| ⑤ FUSING FOR END DRAWING | 30 | 130 | 30 | 20 | 25 | 120 |

| PROCESS | TAIL STOCK MOVING DISTANCE | HEATING SOURCE GAS AMOUNT (cc/minute) | | | HEATING SOURCE MOVING DISTANCE (mm) | TAIL STOCK MOVING SPEED (mm/minute) |
| --- | --- | --- | --- | --- | --- | --- |
| | | H₂ | O₂ (INSIDE) | O₂ (OUTSIDE) | | |
| ① PRE-HEATING FOR END DRAWING | 0 (300 seconds) | 250 | 30 | 100 | 0 | 0 |
| ② ELONGATING FOR END DRAWING | 0 → 30 | 250 | 30 | 100 | 0 | 10 |
| ③ SECOND HEATING | 30 → 30 | 130 | 15 | 50 | 15 | 0 |
| ④ SECOND ELONGATING FOR END DRAWING | 30 → 55 | 130 | 15 | 50 | 15 → 25 | 10 |
| ⑤ FUSING FOR END DRAWING | 55 → 100 | 130 | 30 | 20 | 25 | 120 |

FIG. 43

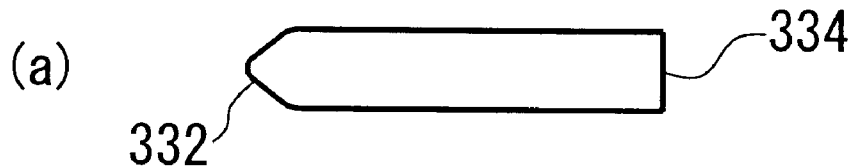
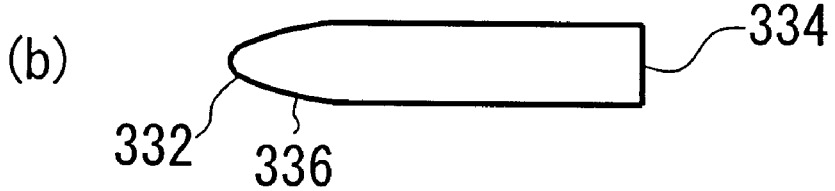
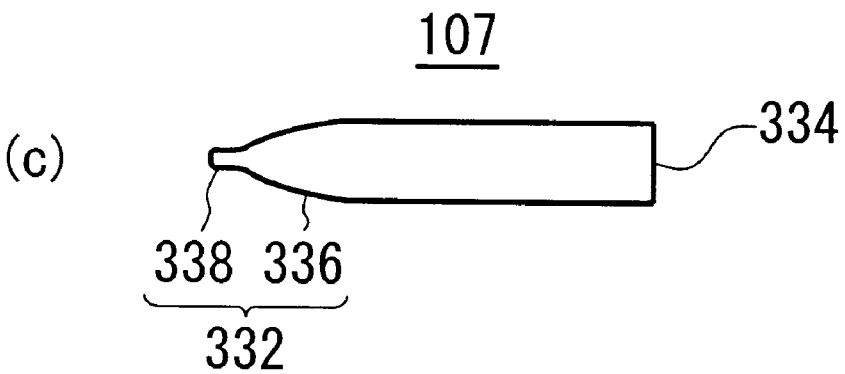
FIG. 48

FIG. 51

NUMBER OF HYDROFLUORIC CONCAVES
GENERATED BY HYDROFLUORIC ACID ETCHING

| PRE-TREATING | ETCHING THICKNESS OF HYDROFLUORIC ACID ETCHING (mm) | NUMBER OF HYDROFLUORIC CONCAVES GENERATED BY HYDROFLUORIC ACID ETCHING (INSPECTION POINT:30) :COUNTED BY VISUAL INSPECTION | |
|---|---|---|---|
| | | EXAMPLE | COMPARATIVE EXAMPLE |
| PRE-TREATING1 | 0.2 | 0 | 4 |
| | 1.2 | 2 | 9 |
| | 2.2 | 3 | 14 |
| | 3.2 | 5 | 19 |
| PRE-TREATING2 | 0.2 | 1 | 7 |
| | 1.2 | 2 | 11 |
| | 2.2 | 4 | 19 |
| | 3.2 | 7 | 27 |

UNEVENNESS OF SURFACE

| | QUANTITIES OF HYDROFLUORIC ACID ETCHING | DIAMETER OF UNDAMAGED POINT − DIAMETER OF DAMAGED POINT (mm) | |
|---|---|---|---|
| | | EXAMPLE | COMPARATIVE EXAMPLE |
| PRE-TREATING | 0.2 | 0.07 | 0.13 |
| | 1.2 | 0.07 | 0.28 |
| | 2.2 | 0.09 | 0.65 |
| | 3.2 | 0.09 | 0.94 |
| PRE-TREATING1 | | | |
| PRE-TREATING2 | 0.2 | 0.09 | 0.21 |
| | 1.2 | 0.10 | 0.35 |
| | 2.2 | 0.17 | 0.87 |
| | 3.2 | 0.18 | 1.24 |

FIG. 52

OPTICAL FIBER MANUFACTURE METHOD INCLUDING ELONGATING A PREFORM IN A VERTICAL DIRECTION AND A HORIZONTAL DIRECTION

This patent application claims priority based on Japanese patent applications, H11-067366 filed on Mar. 12, 1999, H11-075129 filed on Mar. 19, 1999, H10-315856 filed on Nov. 06, 1998, H10-314564 filed on Nov. 5, 1998, H11-015293 filed on Jan. 25, 1999, H11-16840 filed on Jan. 26, 1999, H10-314574 filed on Nov. 5, 1998, H11-067199 filed on Mar. 12, 1999, H10-315849 filed on Nov. 6, 1998, H11-010197 filed on Jan. 19, 1999, H11-112354 filed on Apr. 20, 1999, H11-046141 filed on Feb. 24, 1999, H10-314553 filed on Nov. 5, 1998, H11-065819 filed on Mar. 12, 1999, H11-118094 filed on Apr. 26, 1999, H11-044902 filed on Feb. 23, 1999, and H11-064994 filed on Mar. 11, 1999, the contents of which are incorporated herein by reference.

BACKGROUND OF THE INVENTION

1. Field of Invention

The present invention relates to an optical fiber manufacture method, a preform manufacture method and a preform manufacture apparatus that can manufacture a preform and an optical fiber with reduced variation in their diameters.

2. Description of Related Art

FIG. 1 shows a conventional glass base material first elongating apparatus 400. A glass base material 102, which is a base material of an optical fiber, is usually elongated by the glass base material first elongating apparatus 400. This reduces the diameter of the glass base material 102, to produce a glass rod 106. The glass rod 106 has a diameter from 3 mm to 5 mm larger than the most convenient diameter to draw an optical fiber. The most convenient diameter for drawing an optical fiber is 30 mm to 80 mm.

A glass base material first elongating apparatus 400 comprises a heating furnace 100 that heats the glass base material 102 and a drawing chuck 104 that holds and elongates the heated glass base material 102. To elongate the glass base material 102, the glass base material first elongating apparatus 400 supplies the glass base material 102 to the heating furnace 100. Here the glass base material 102 is heated to approximately 2000° C. The first elongating apparatus 400 then holds the glass base material 102 by the drawing chuck 104, and draws the glass base material 102 from the heating furnace 100 downward continuously to form a glass rod 106.

FIG. 2 shows a configuration of a conventional glass lathe 110. The glass rod 106 made by the glass base material first elongating apparatus 400 undergoes secondary elongation by the lass lathe 110 to produce a preform 107. At this time, the diameter of the glass rod 106 is reduced to prescribed diameter. The glass lathe 110 comprises chucks 118 and 119 that hold the glass rod 106, a tail stock 116 which moves the chuck 119, and a heating source 122 which heats the glass rod 106. One side of the chuck 118 is fixed, and the other side of the chuck 119 movable. A traction force can be applied to the chuck 119. The glass rod 106, which is held by the chucks 118 and 119, is heated by the heating source 122. The heated glass rod 106 is elongated by moving the tail stock 116 which pulls the glass rod 106. The result is, the diameter of the glass rod 106 reduces to become the prescribed diameter.

There was the possibility of manufacturing bent glass rods 106 when using a conventional glass base material first elongating apparatus 400 to elongate the glass base material 102. Also, when using a conventional glass lathe 110 to elongate the glass rod 106 to manufacture the preform 107 further problems often arose. These problems included variation in the diameter of the preform 107 because the amount of gas provided to the heating source 122 and the speed of moving the tail-stock 116 differed for each preform 107 produced.

When elongating a bent glass rod 106, which is made by a conventional glass base material first elongating apparatus 400, to make a preform 107 by the glass lathe 110, the diameter of the preform 107 varied. When manufacturing optical fibers by drawing a preform 107 with a varying diameter, the diameter of the optical fibers produced also varies. This makes it difficult to manufacture an optical fiber of high quality.

SUMMARY OF THE INVENTION

As stated, it is an object of the present invention to provide an optical fiber manufacture method, a preform manufacture method and a preform manufacture equipment that can solve the problems outlined above. The object of the present invention can be achieved by the combinations of features described in the independent claims of the present invention. The dependent claims define further advantageous embodiments of the present invention.

According to the first aspect of the present invention, a method for manufacturing an optical fiber can be provided which comprises setting a heating condition for heating a glass rod, which is a parent material of the optical fiber, and an elongating speed of the glass rod based on a prescribed numerical value which changes with a progress of elongation of the glass rod; heating and elongating the glass rod to generate a preform based on the heating condition and the elongating speed which are set by the setting; and drawing the preform to a filament-like form by further heating the preform to generate the optical fiber.

A method for manufacturing an optical fiber can be provided such that the setting sets the heating condition and the elongating speed based on a progress time of the elongation as the numerical value. The heating and elongating may include end drawing for reducing a diameter of an end of the glass rod, and the end drawing end-draws the end of the glass rod with heat and elongation based on the progress time of the end drawing.

A method for manufacturing an optical fiber can be provided such that the setting sets a location of a burner, which heats the glass rod, and an amount of gas supplied to the burner as the heating condition based on the progress time of the elongation. The setting may set a moving speed of a chuck, which holds the glass rod, as the elongating speed based on the progress time of the elongation.

A method for manufacturing an optical fiber can be provided such that the setting sets the heating condition and the elongating speed based on an elongation length of the glass rod in the elongation as the numerical value.

A method for manufacturing an optical fiber can be provided such that the heating and elongating includes end drawing for reducing a diameter of an end of the glass rod, and the end drawing end-draws the end of the glass rod with heat and elongation based on the elongation length of the glass rod. The setting may set a moving distance of a burner, which heats the glass rod, and an amount of gas supplied to the burner as the heating condition based on the elongation length of the glass rod. The setting can further set a moving speed of a chuck, which holds the glass rod, as the elongating speed based on the elongation length of the glass rod.

A method for manufacturing an optical fiber can be provided such that the setting uses a encoder, which is provided on a motor that drives the chuck, to measure a moving distance of the chuck by measuring a rotation angle of the motor.

A method for manufacturing an optical fiber can be provided such that the setting sets the heating condition and the elongating speed based on a tensile stress generated on the glass rod in the elongation as the numerical value.

A method for manufacturing an optical fiber can be provided such that a heating source, which heats the glass rod, moves along a longitudinal direction of the glass rod with a progress of the elongation, and the heating and elongating controls the elongating speed so that the tensile stress before the heating source moves prescribed distance becomes substantially 110 percent or below an average value of the tensile stress after the heating source moves the prescribed distance.

A method for manufacturing an optical fiber can be provided such that the heating and elongating controls the tensile stress so that the tensile stress before the heating source moves the prescribed distance become substantially from 80 to 110 percent of an average value of the tensile stress after the heating source moves the prescribed distance.

The prescribed distance can be substantially between 50 mm to 150 mm. The heating and elongating may control the elongating speed to be a constant speed when the heating source moves the prescribed distance. The setting may set a moving speed of a chuck, which holds the glass rod, as the elongating speed based on the tensile stress.

A method for manufacturing an optical fiber can be provided such that the setting sets the heating condition and the elongating speed based on a location of a mark provided on a connection between the glass rod and each of dummy rods, which are welded to each of ends of the glass rod, as the numerical value.

A method for manufacturing an optical fiber can be provided such that the heating and elongating includes end drawing for reducing a diameter of an end of the glass rod, and the end drawing end-draws the end of the glass rod with heat and elongation based on the location of a mark. The setting can set the heating condition and the elongating speed based on a location of a cut provided on a connection between the glass rod and each of the dummy rods as the location of a mark.

A method for manufacturing an optical fiber can be provided such that the setting sets the heating condition and the elongating speed based on a location of a fluorescent paint applied on a connection between the glass rod and each of the dummy rods as the location of a mark.

A method for manufacturing an optical fiber can be provided such that the setting sets the elongating speed at a plurality of locations along axial direction of the glass rod based on a diameter at the plurality of locations along axial direction of the glass rod as the numerical value and the heating condition based on an average value of a diameter at the plurality of locations of the glass rod.

A method for manufacturing an optical fiber can be provided such that a end of the glass rod is end-drawn of which diameter is reduced, and the setting has detecting a location of an end-drawn region where the glass rod is end-drawn based on a diameter at a plurality of locations along axial direction of the glass rod and a change of a length of the glass rod along axial direction of the glass rod by the elongation as the numerical value, and setting a polishing range where the glass rod is polished by a flame based on the location of the end-drawn region and also setting a heating power condition of the flame based on a diameter of the end-drawn region, and the heating and elongating polishes the polishing range of the glass rod by the flame of the heating power condition.

According to the other aspect of the present invention, a method for manufacturing an optical fiber can be provided which comprises heating and elongating a glass rod, which is a parent material of an optical fiber, to generate a preform, drawing the preform with further heating to a filament-like form to generate an optical fiber, and the heating and elongating has pre-heating the glass rod until prescribed region of the glass rod softens, and end drawing the prescribed region for reducing a diameter of the prescribed region and for making an end of the glass rod by further heating and elongating the prescribed region.

A method for manufacturing an optical fiber can be provided such that the end drawing further includes second heating which heats by a flame a region which is more towards a middle side of the glass rod than a center of the prescribed region, a thickness of the flame being smaller than a thickness of the flame of the pre-heating.

According to the first aspect of the present invention, a method for manufacturing a preform, which is a parent material of an optical fiber, can be provided which comprises setting a heating condition for heating a glass rod, which is a parent material of the optical fiber, and an elongating speed of the glass rod based on a prescribed numerical value which changes with a progress of elongation of the glass rod, heating and elongating the glass rod to generate a preform based on the heating condition and the elongating speed which are set by the setting.

A method for manufacturing a preform can be provided such that the setting sets the heating condition and the elongating speed based on a progress time of the elongation as the numerical value.

A method for manufacturing a preform can be provided such that the heating and elongating includes end drawing for reducing a diameter of an end of the glass rod, and the end drawing end-draws the end of the glass rod with heat and elongation based on the progress time of the end drawing. The setting may set the heating condition and the elongating speed based on an elongation length of the glass rod in the elongation as the numerical value. The heating and elongating can include end drawing for reducing a diameter of an end of the glass rod, and the end drawing end-draws the end of the glass rod with heat and elongation based on the elongation length of the glass rod.

A method for manufacturing a preform can be provided such that the setting sets the heating condition and the elongating speed based on a tensile stress generated on the glass rod in the elongation as the numerical value.

A method for manufacturing a preform can be provided such that a heating source, which heats the glass rod, moves along a longitudinal direction of the glass rod with a progress of the elongation, and the heating and elongating controls the elongating speed so that the tensile stress before the heating source moves prescribed distance becomes substantially 110 percent or below an average value of the tensile stress after the heating source moves the prescribed distance.

A method for manufacturing a preform can be provided such that the heating and elongating controls the tensile stress so that the tensile stress before the heating source moves the prescribed distance become substantially from 80 to 110 percent of an average value of the tensile stress after the heating source moves the prescribed distance. The prescribed distance can be substantially between 50 mm to 150 mm. The heating and elongating may control the elongating speed to be a constant speed when the heating source moves the prescribed distance.

A method for manufacturing a preform can be provided such that the setting sets the heating condition and the elongating speed based on a location of a mark provided on a connection between the glass rod and each of dummy rods, which are welded to each of ends of the glass rod, as the numerical value. The heating and elongating can include end drawing for reducing a diameter of an end of the glass rod, and the end drawing end-draws the end of the glass rod with heat and elongation based on the location of a mark.

A method for manufacturing a preform can be provided such that the setting sets the elongating speed at a plurality of locations along axial direction of the glass rod based on a diameter at the plurality of locations along axial direction of the glass rod as the numerical value and the heating condition based on an average value of a diameter at the plurality of locations of the glass rod.

A method for manufacturing a preform can be provided such that an end of the glass rod is end-drawn of which diameter is reduced, and the setting has detecting a location of an end-drawn region where the glass rod is end-drawn based on a diameter at a plurality of locations along axial direction of the glass rod and a change of a length of the glass rod along axial direction of the glass rod by the elongation as the numerical value, and setting a polishing range where the glass rod is polished by a flame based on the location of the end-drawn region and also setting a heating power condition of the flame based on a diameter of the end-drawn region, and the heating and elongating polishes the polishing range of the glass rod by the flame of the heating power condition.

According to the other aspect of the present invention, a method for manufacturing a preform, which is a parent material of an optical fiber, can be provided which comprises pre-heating the glass rod until a prescribed region of the glass rod softens, and end drawing the prescribed region for reducing a diameter of the prescribed region and for making an end of the glass rod by further heating and elongating the prescribed region. The end drawing may further include second heating which heats by a flame a region which is more towards a middle side of the glass rod than a center of the prescribed region, a thickness of the flame being smaller than a thickness of the flame of the pre-heating.

According to the first aspect of the present invention, an apparatus for manufacturing a preform, which is a parent material of an optical fiber, can be provided which comprises a heating source which heats a glass rod, which is a parent material of the preform, an elongating unit which elongates the glass rod, a measurement device for measuring a numerical value which changes with a progress of elongation of the glass rod, and a control unit which controls a heating condition of the heating source and a elongating speed of the elongating unit based on the numerical value measured by the measurement device.

An apparatus for manufacturing a preform can be provided such that the measurement device measures a progress time of the elongation as the numerical value, and the control unit controls the heating condition and the elongating speed based on the progress time of the elongation measured by the measurement device.

An apparatus for manufacturing a preform can be provided such that the measurement device measures a moving distance of the elongating unit which changes with a progress of the elongation as the numerical value, and the control unit controls the heating condition and the elongating speed based on the moving distance of the elongating unit measured by the measurement device.

An apparatus for manufacturing a preform can be provided such that the measurement device measures a tensile stress generated on the glass rod by the elongation as the numerical value, and the control unit controls the heating condition and the elongating speed based on the tensile stress generated on the glass rod measured by the measurement device.

An apparatus for manufacturing a preform can be provided such that the heating source moves along a longitudinal direction of the glass rod with a progress of the elongation, and the control unit controls the elongating speed so that the tensile stress before the heating source moves prescribed distance becomes substantially 110 percent or below an average value of the tensile stress after the heating source moves the prescribed distance.

An apparatus for manufacturing a preform can be provided such that the control unit controls the tensile stress so that the tensile stress before the heating source moves the prescribed distance becomes substantially from 80 to 110 percent of an average value of the tensile stress after the heating source moves the prescribed distance. The prescribed distance can be substantially between 50 mm to 150 mm. The control unit may control the elongating speed to be a constant speed when the heating source moves the prescribed distance.

An apparatus for manufacturing a preform can be provided such that the measurement device measures a location of a mark provided on a connection between the glass rod and each of dummy rods, which are welded to each of ends of the glass rod, as the numerical value, and the control unit controls the heating condition and the elongating speed based on the location of a mark measured by the measurement device.

An apparatus for manufacturing a preform can be provided such that the measurement device measures a diameter at a plurality of locations along axial direction of the glass rod as the numerical value, and the control unit controls the elongating speed at the plurality of locations along axial direction of the glass rod based on a diameter at the plurality of locations along axial direction of the glass rod, and the heating condition based on an average value of a diameter at the plurality of locations.

BRIEF DESCRIPTION OF THE ELONGATINGS

Figure 6:
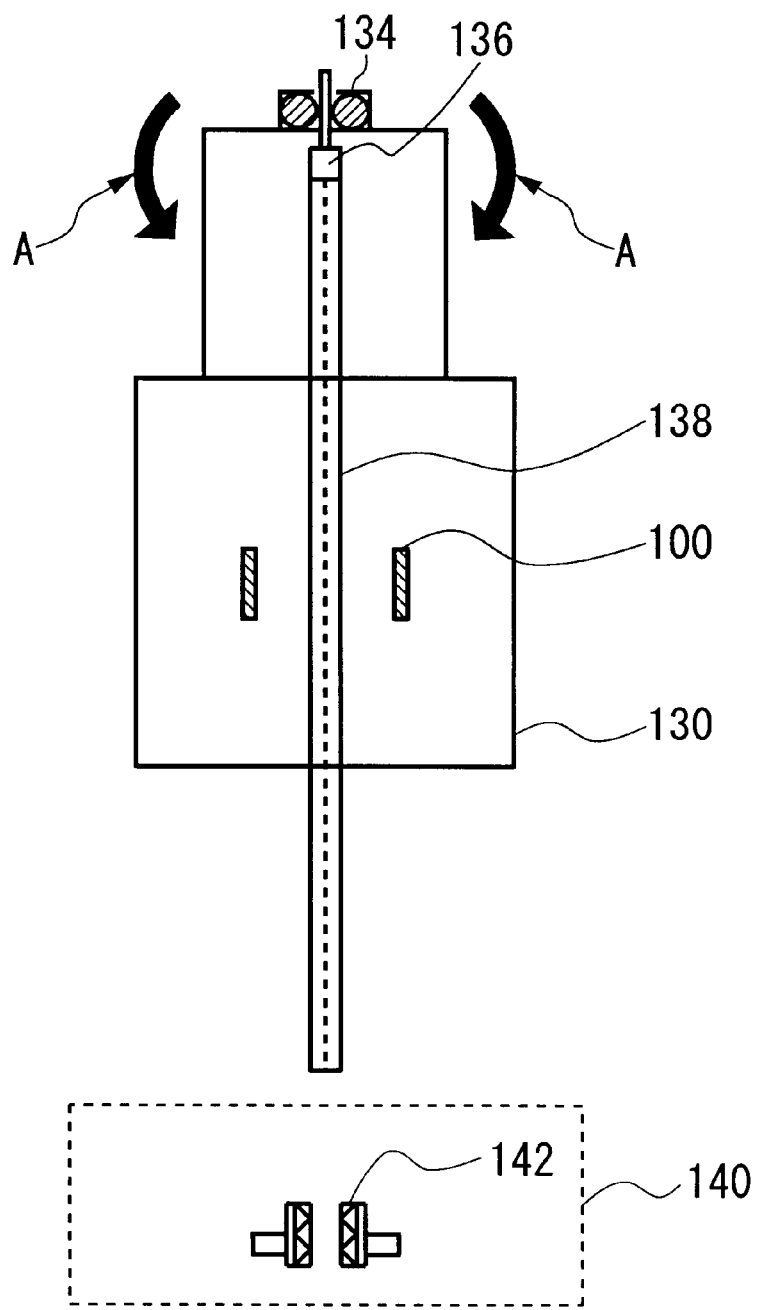

FIG. 6 shows a first elongating device 402 that holds a standard rod 138 by a base material fix unit 136 to adjust the axis for elongating a glass base material 102.

Figure 4:
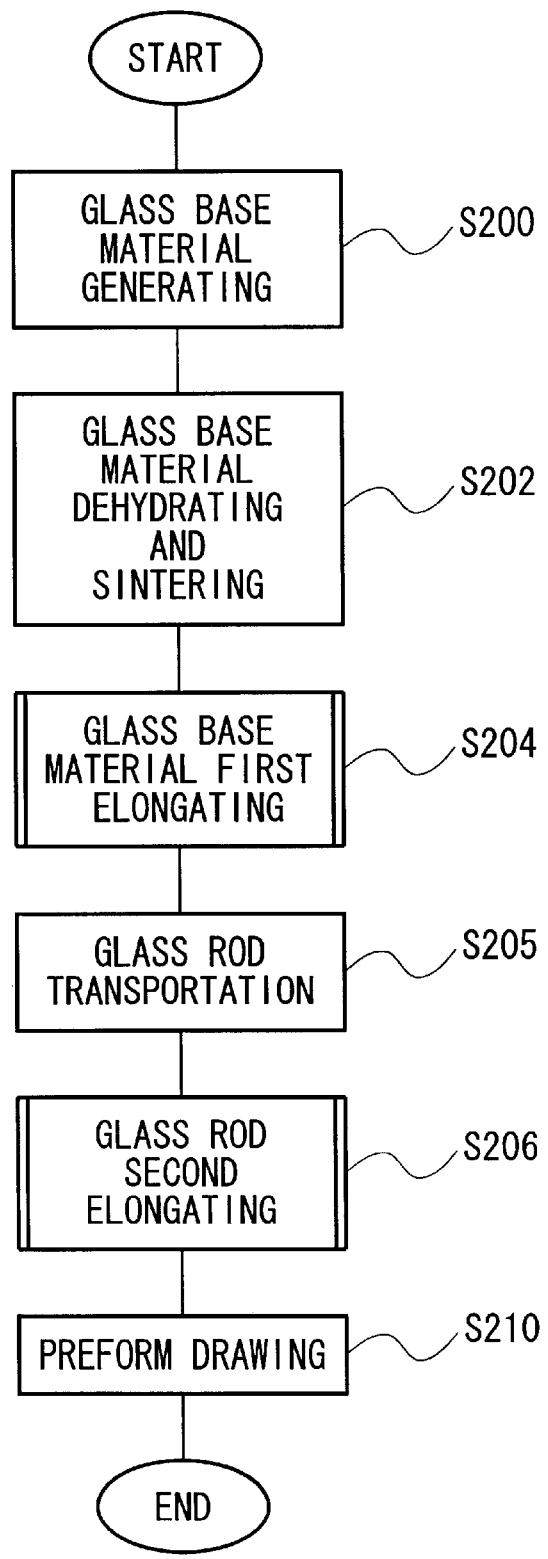
FIG. 4 shows an optical fiber manufacturing method of the present invention.
Figure 7:
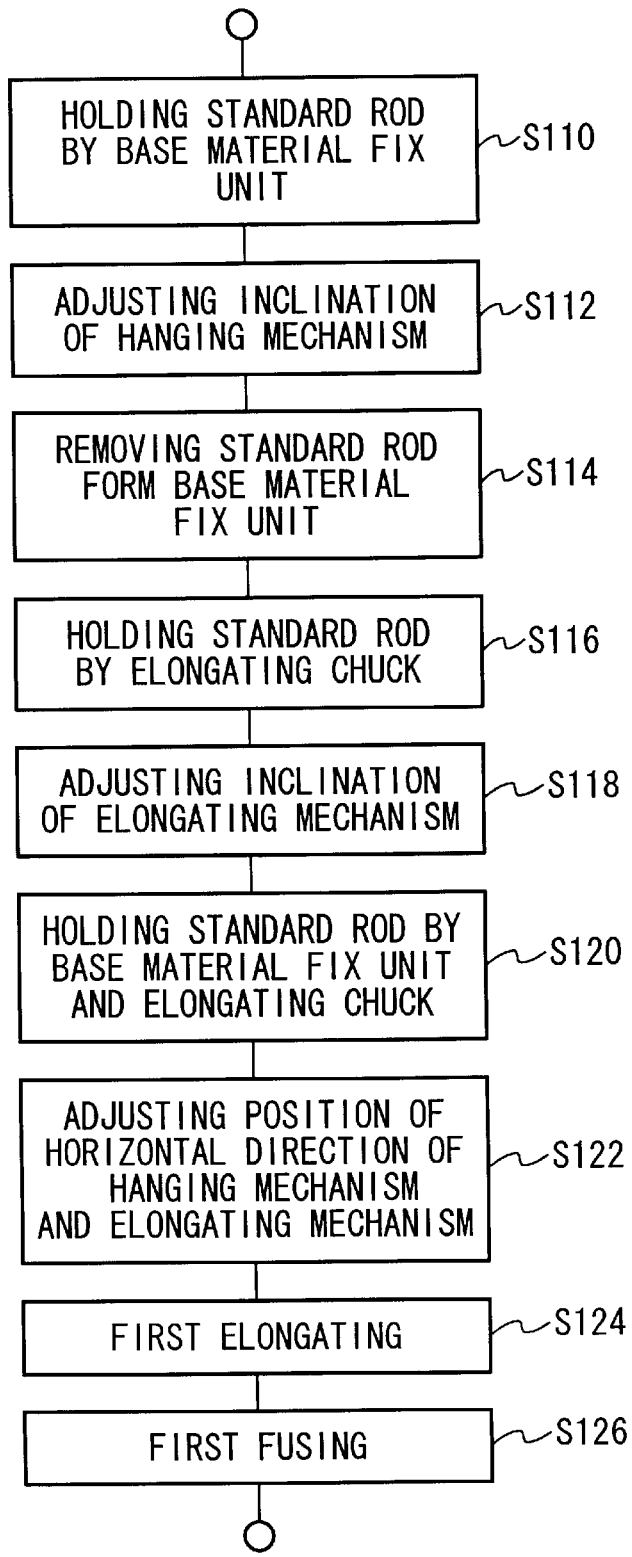

FIG. 7 shows a detailed flow chart of a glass base material first elongating (S204) shown in FIG. 4.

Figure 8:
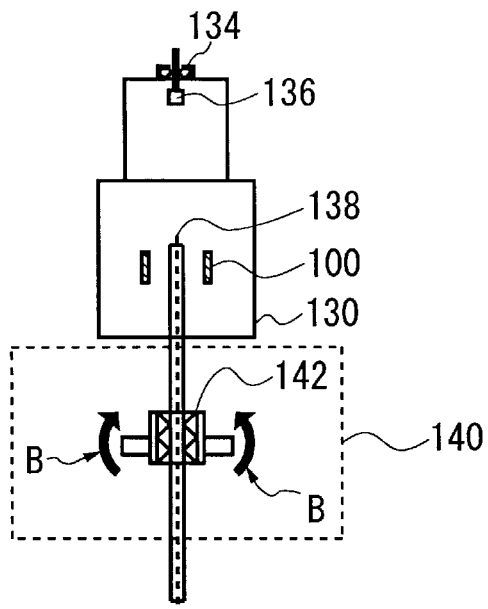

FIG. 8 shows the first elongating device 402 that holds the standard rod 138 by the elongating chuck 142.

Figure 9:
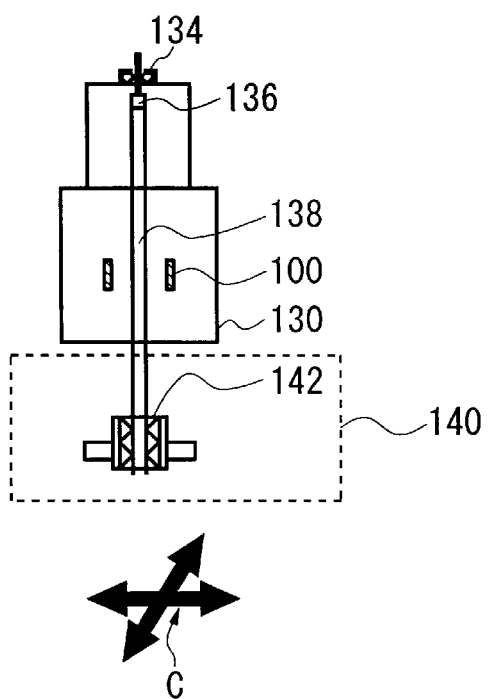

FIG. 9 shows the first elongating device 402, which holds the standard rod 138 by both of the hanging mechanism 134 and the elongating mechanism 140.

Figure 10:
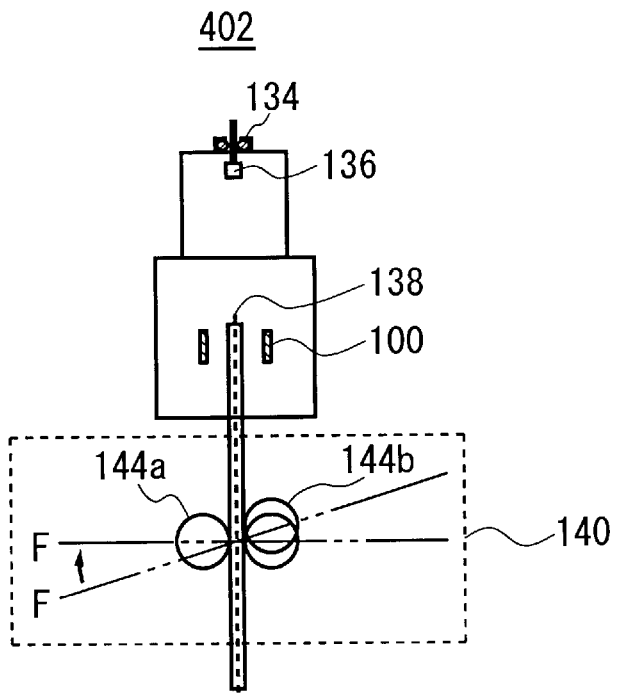

FIG. 10 shows an example using elongating rollers 144a and 144b instead of the elongating chuck 142 on the elongating mechanism 140.

Figure 11:
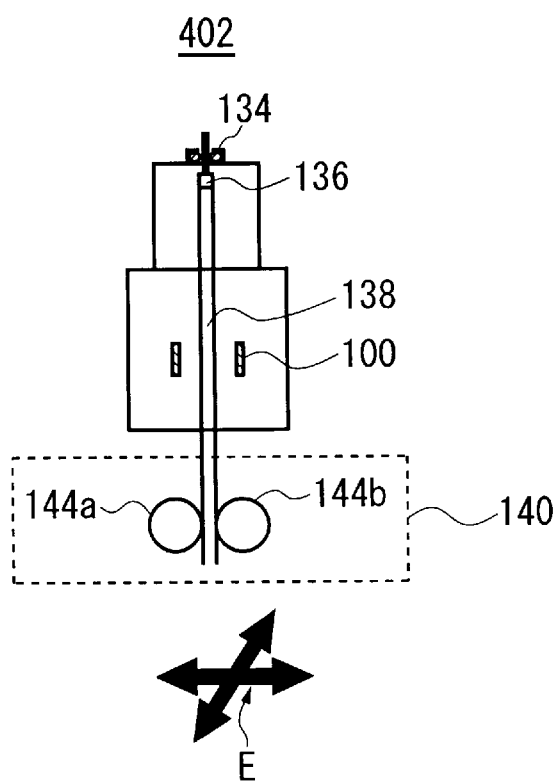

FIG. 11 shows an example using elongating rollers 144a and 144b instead of the elongating chuck 142 on the elongating mechanism 140.

Figure 12:
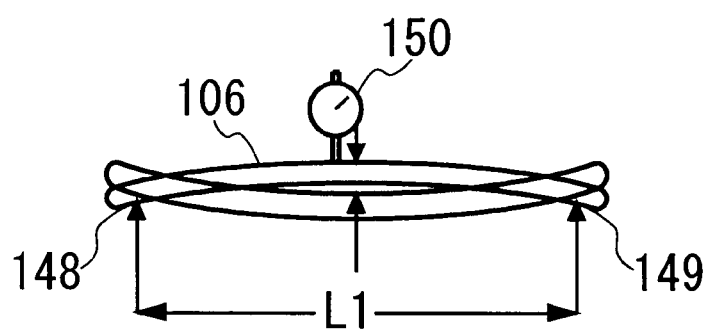

FIG. 12 shows the glass base material 102, the bending degree of which is measured.

Figure 13:
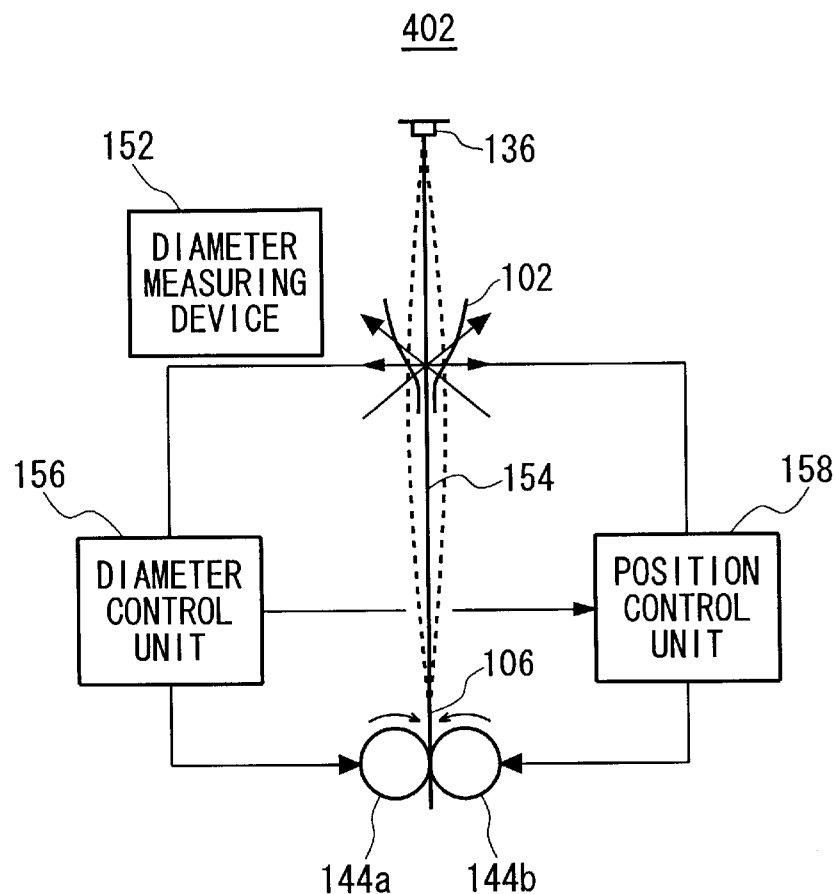

FIG. 13 shows a mechanism by which the first elongating device 402 controls the speed of rotation of the elongating roller 144a and 144b.

Figure 14:
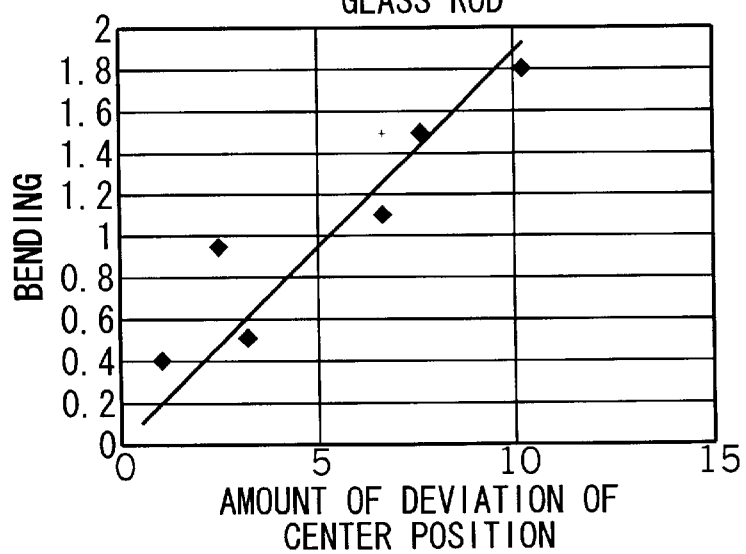

FIG. 14 shows a relationship between the amount of deviation between the center position of the heat softened region of the glass base material 102 and elongating axis 154, and the degree of bend of the glass rod 106.

Figure 15:
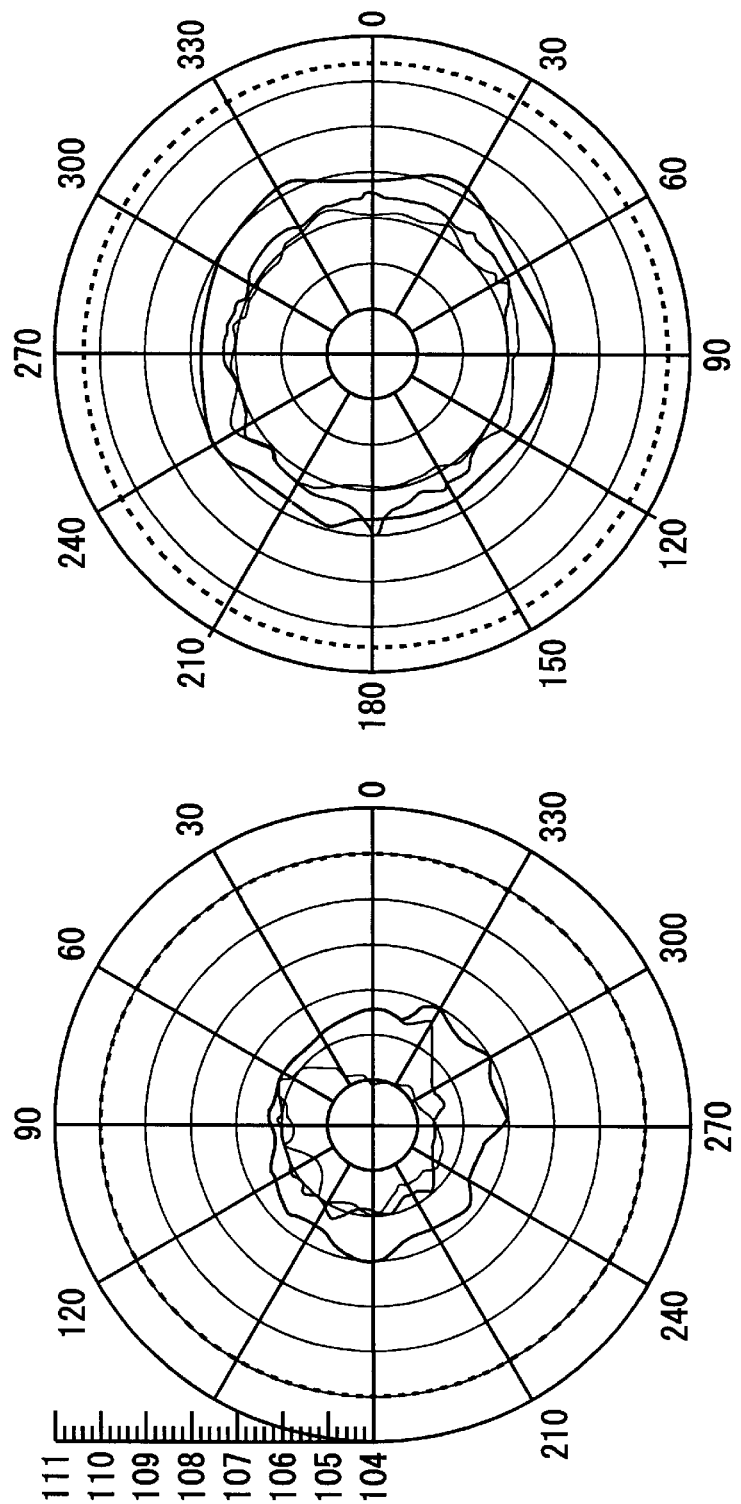

FIG. 15 shows a deformation of the surface of the elongating rollers 144a and 144b.

Figure 16:
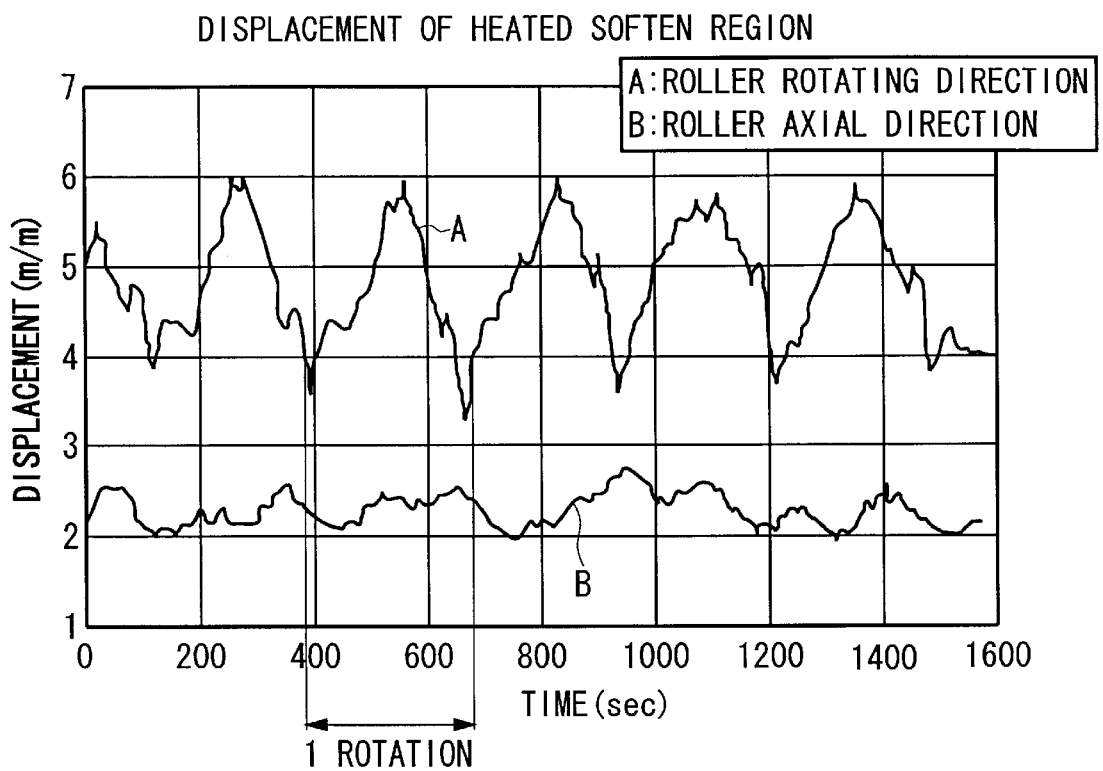

FIG. 16 shows displacement of the metal pipe when the metal pipe is carried by the elongating rollers 144a and 144b of batch number 300 shown in FIG. 15.

Figure 17:
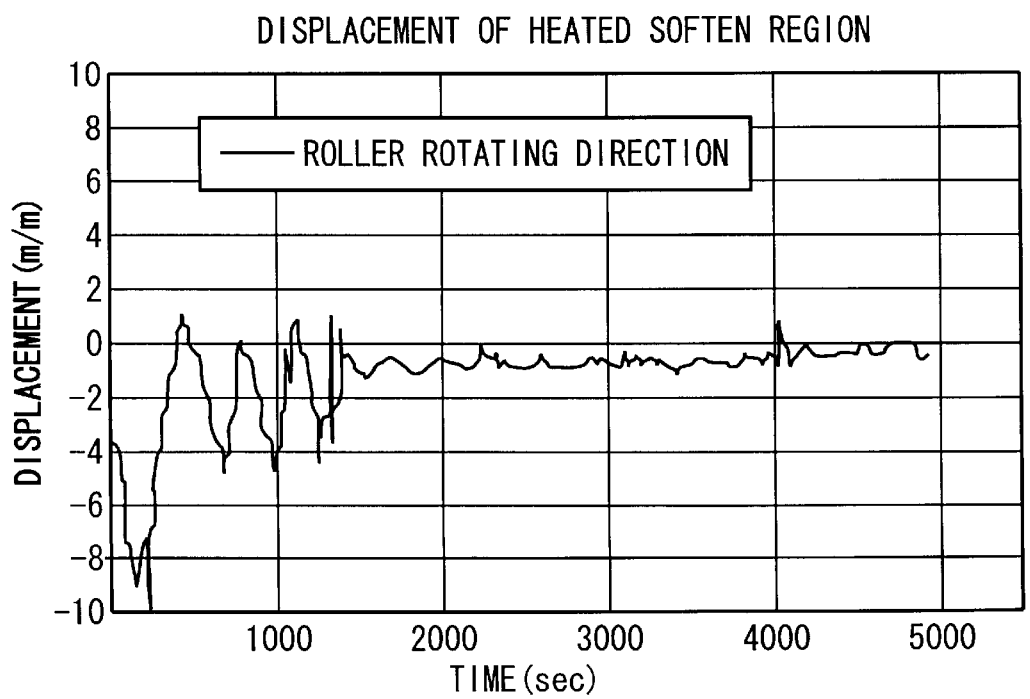

FIG. 17 shows the displacement of the center position of the heat softened region by the first elongating device 402 of the embodiment.

Figure 18:
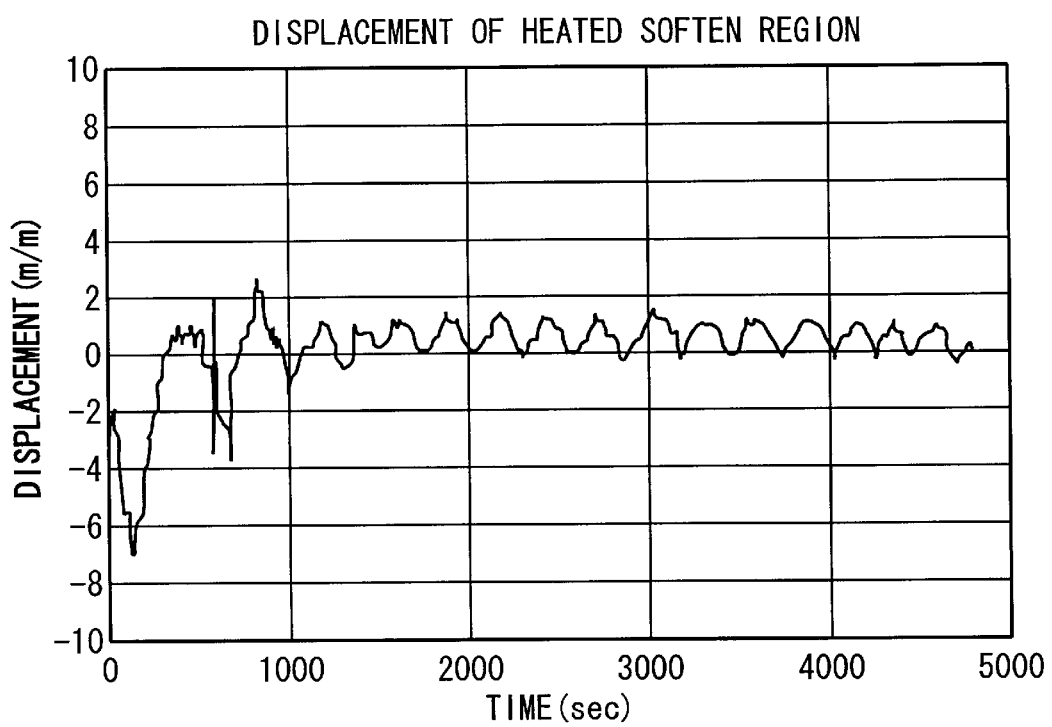

FIG. 18 shows a fluctuation of the center position of the heat softened region when the rotation speed of the elongating rollers 144a and 144b are controlled at the same rotation speed.

Figure 5:
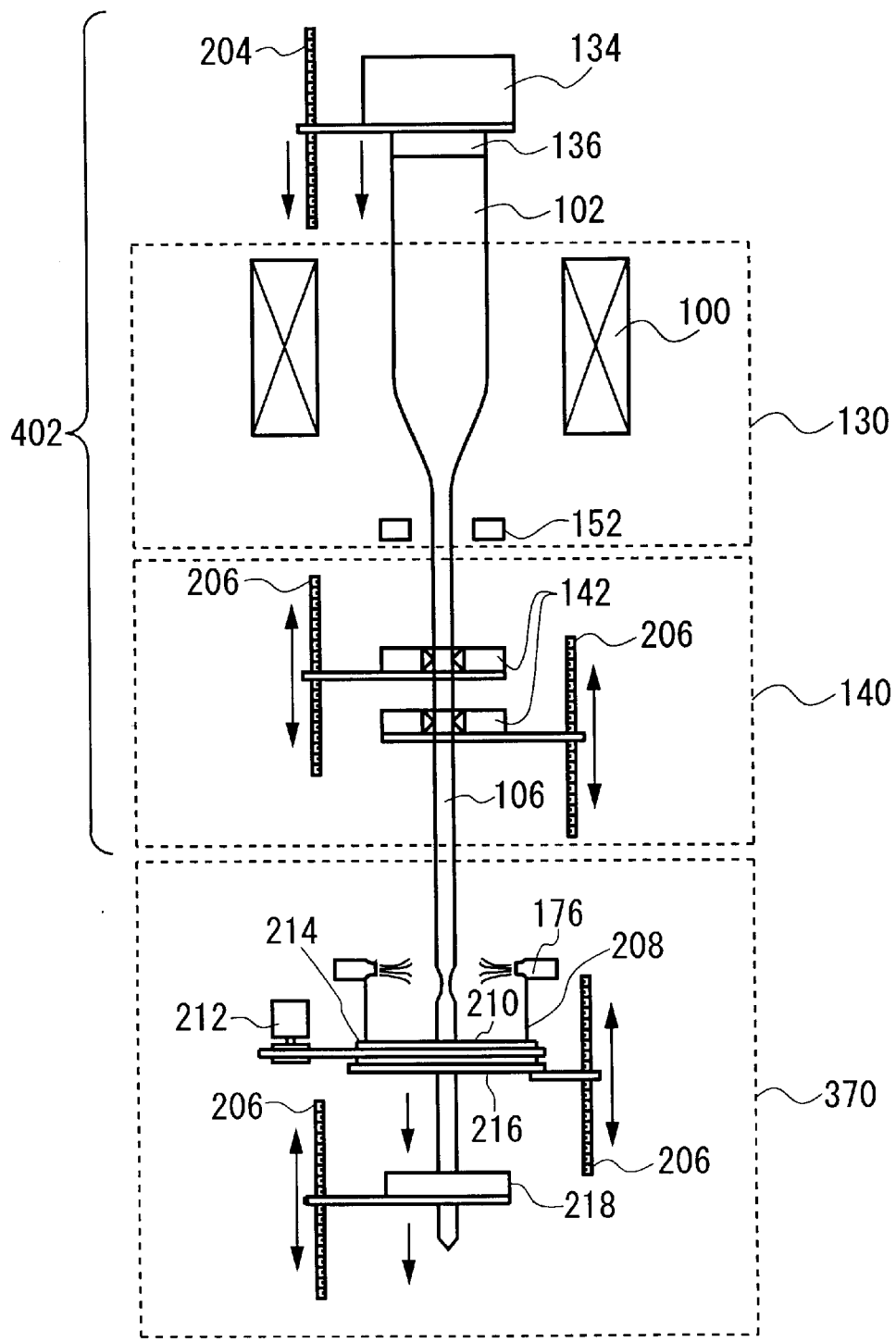
FIG. 5 shows a configuration of a glass base material first elongating apparatus 900.
Figure 19:
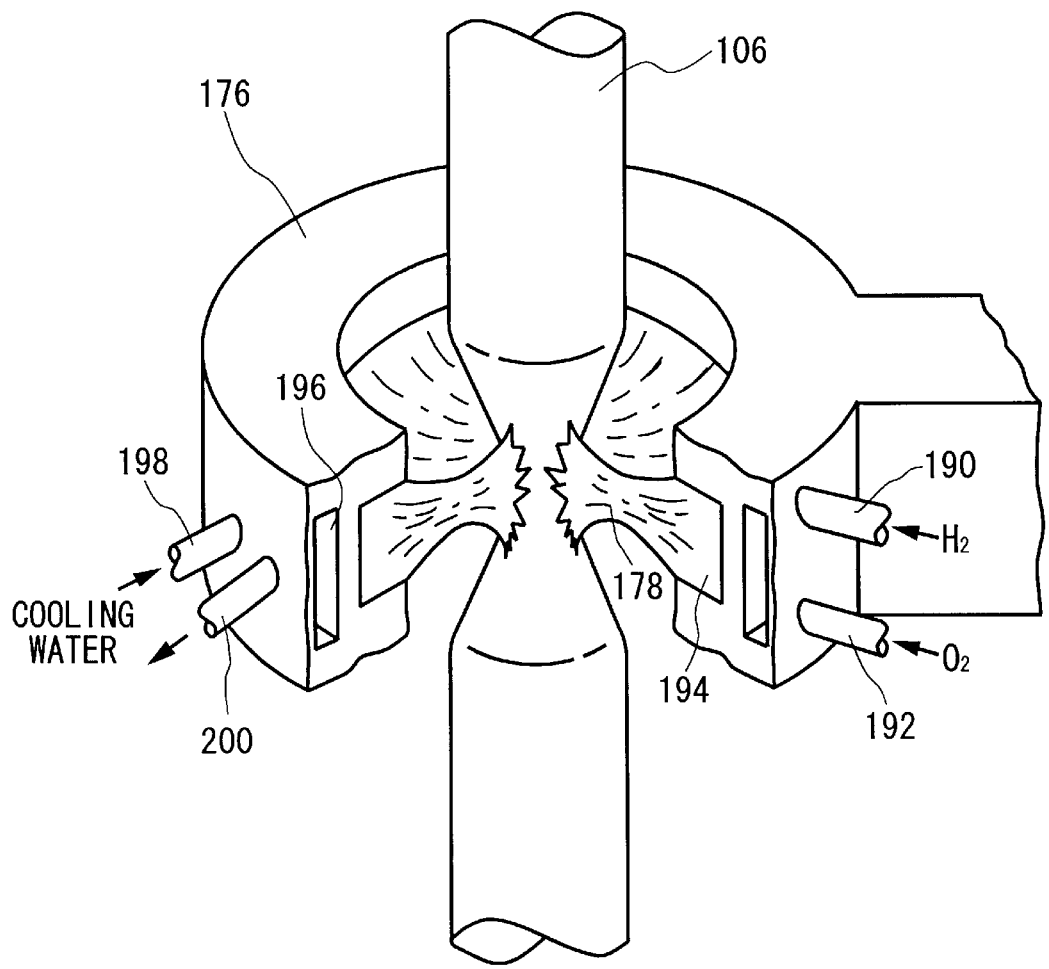

FIG. 19 shows an another embodiment of the burner 176 used in the glass rod fusing apparatus 370 shown in FIG. 5.

FIG. 20 shows a configuration of a glass rod transportation device 380.

FIG. 21 shows a storage container 224 of the first elongating device 402.

Figure 22:
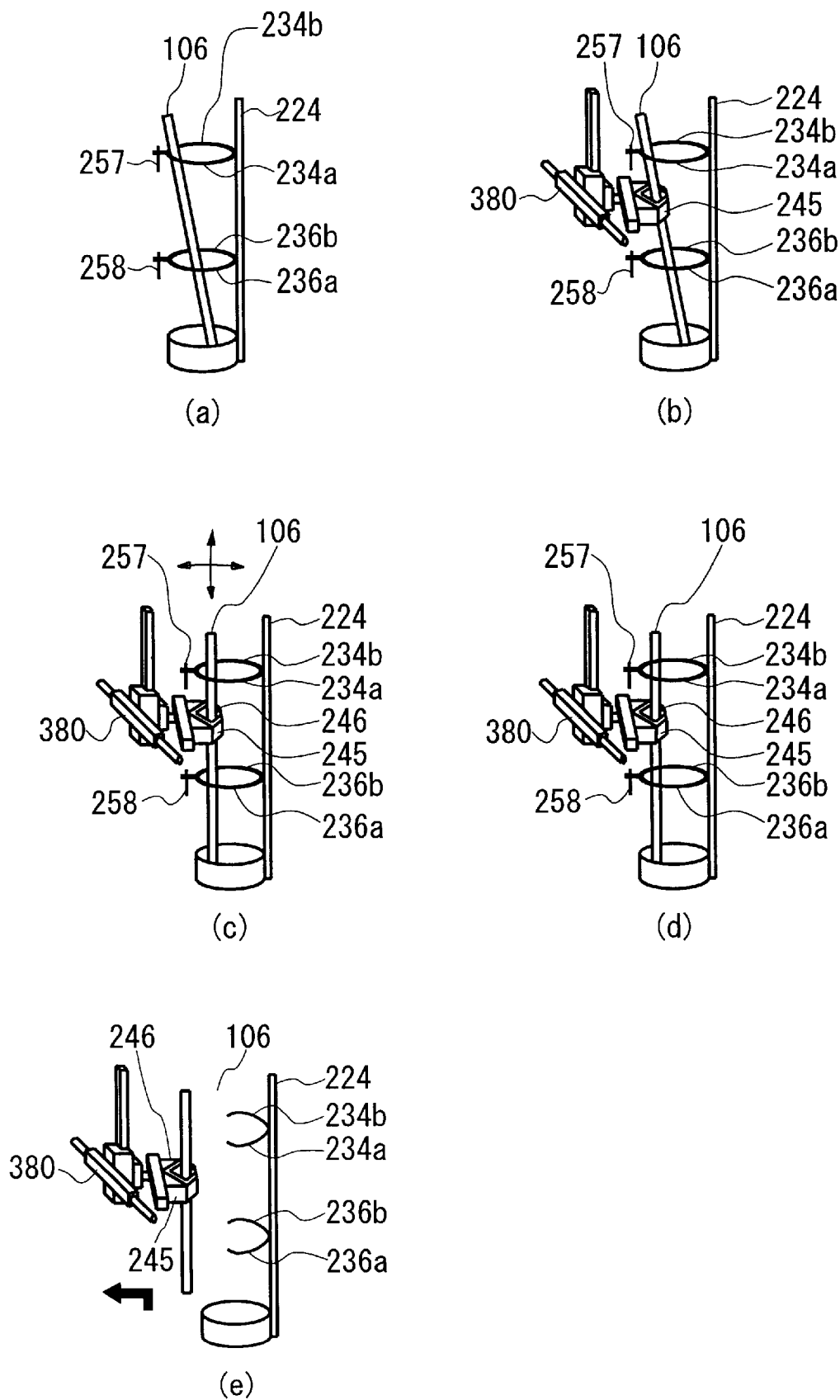

FIG. 22 shows a movement of the glass rod transportation device 380 when transporting the glass rod 106.

FIG. 23 shows an another embodiment of the glass rod transportation device 380.

FIG. 24 shows a movement of the glass rod transportation device 380 shown in FIG. 23 when the glass rod transportation device 380 transports the glass rod 106.

Figure 25:
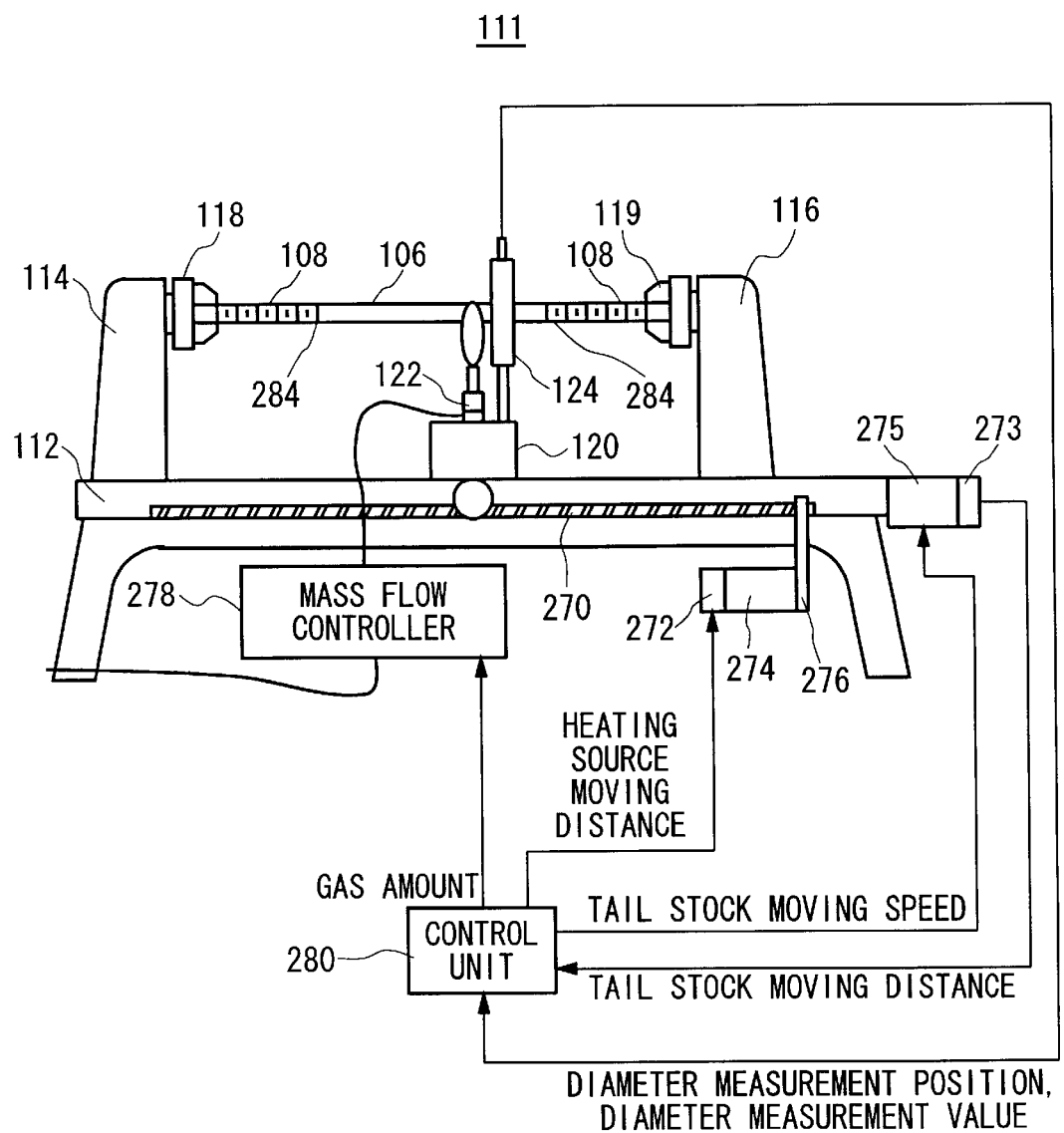

FIG. 25 shows a configuration of a glass rod second elongating apparatus 111 of the present invention.

Figure 26:
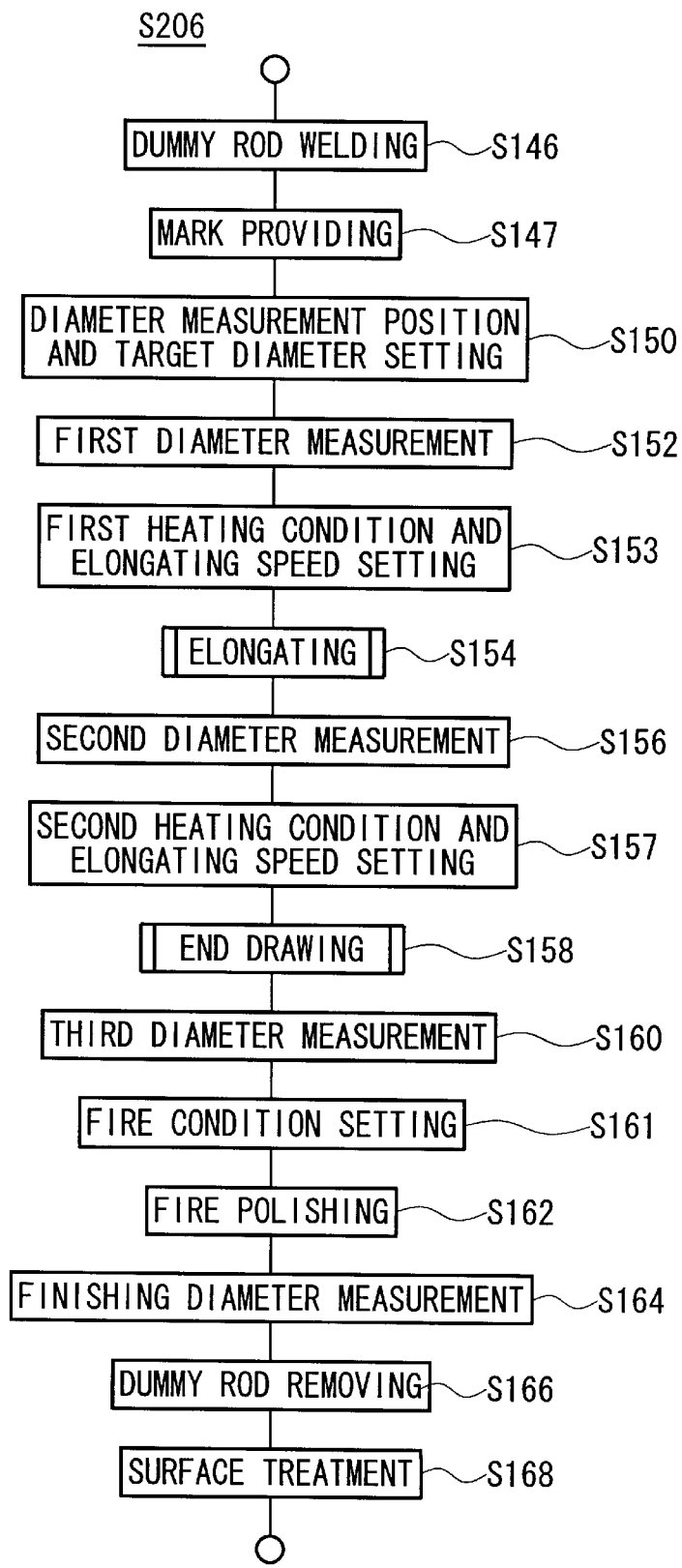

FIG. 26 shows a detailed flow chart of the glass rod second elongating (S206) shown in FIG. 4.

Figure 27:
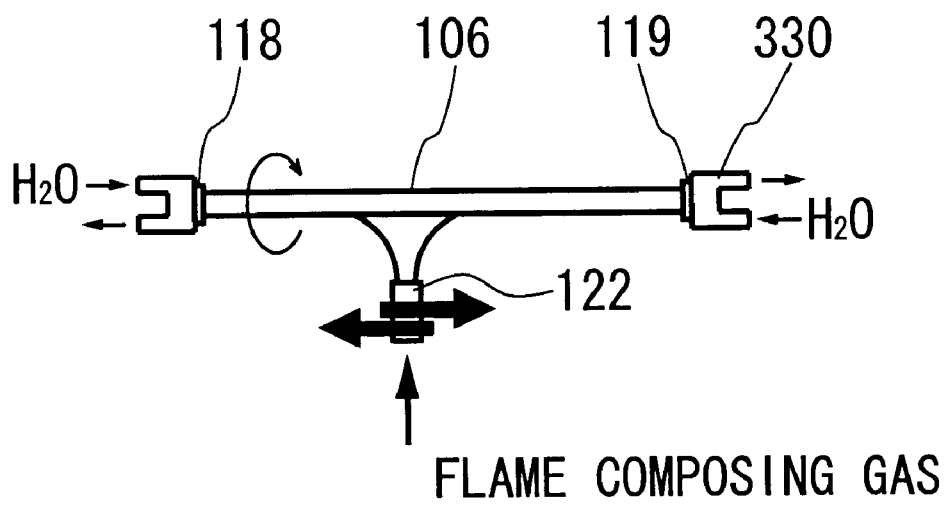

FIG. 27 shows an example where a cooling device 330 is provided on the fixed chuck 118 and the movable chuck 119 of the glass rod second elongating apparatus 111.

Figure 28:
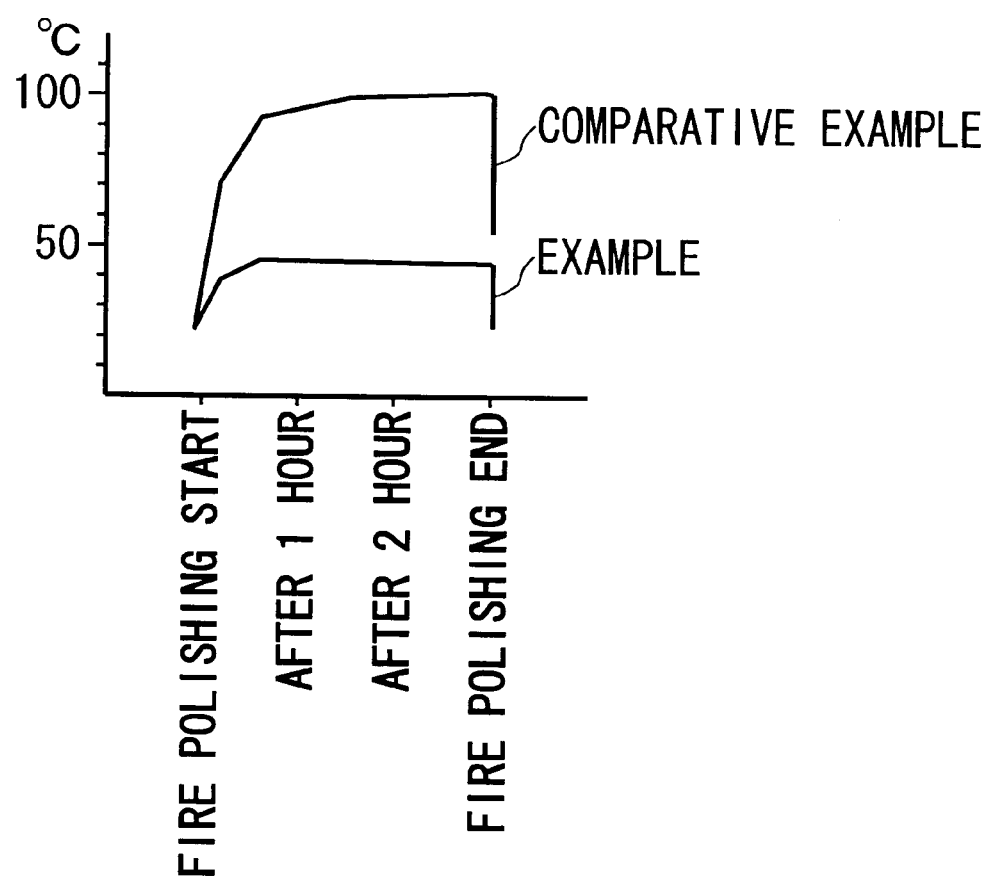

FIG. 28 shows the temperature of the fixed chuck 118 and the movable chuck 119 of the example and the comparative example.

FIG. 29 shows a relationship between the distance between the heating source 122 and the diameter measurement device 124, and the percentage of the fluctuation of the diameter of the glass rod 106.

Figure 30:
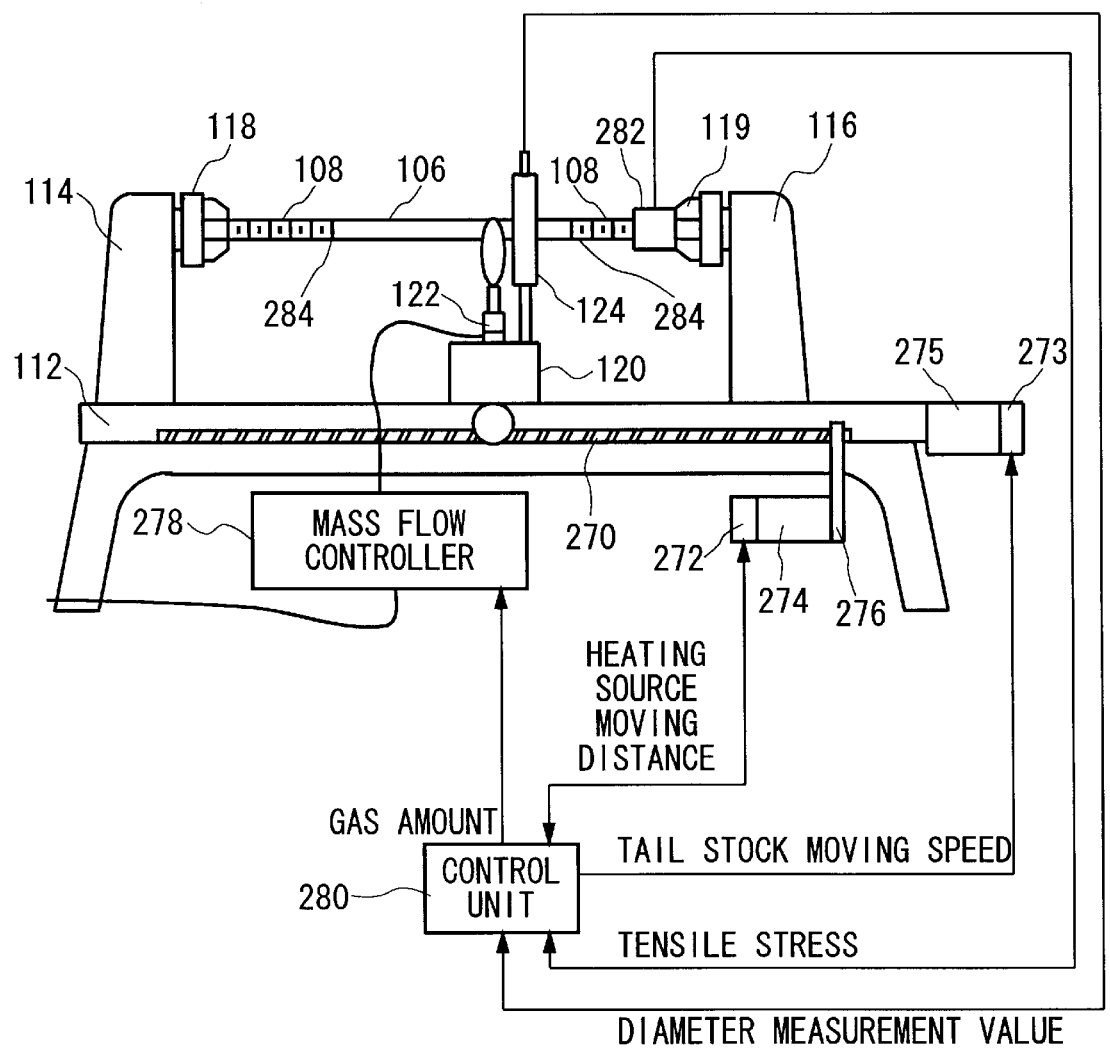

FIG. 30 shows a glass rod second elongating apparatus 111 that has a tensile stress measurement device 282.

Figure 31:
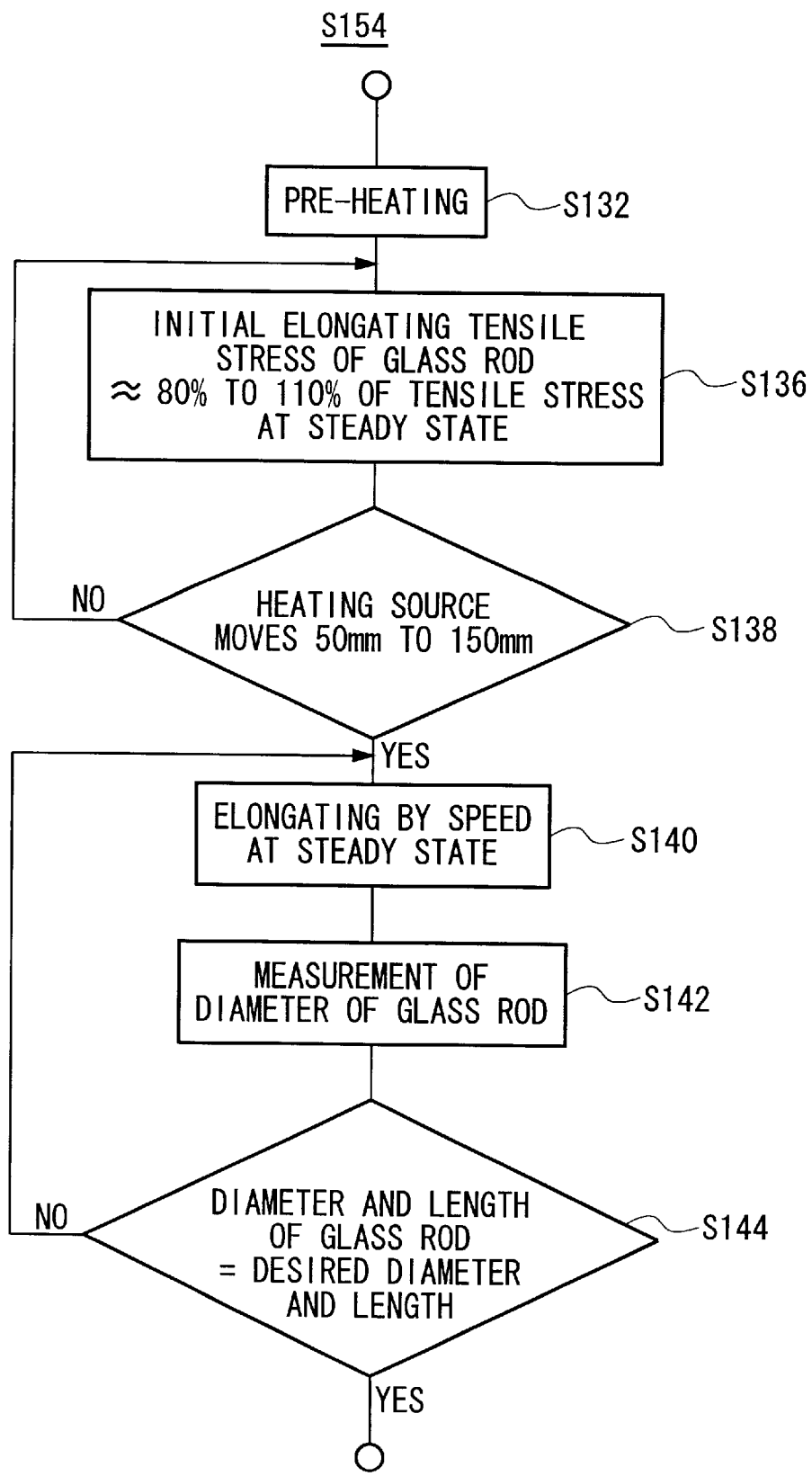

FIG. 31 shows a detailed flow chart of the elongating (S154) shown in the FIG. 26.

FIG. 32 shows the process of diameter fluctuation during the elongation of the glass rod 106.

Figure 33:
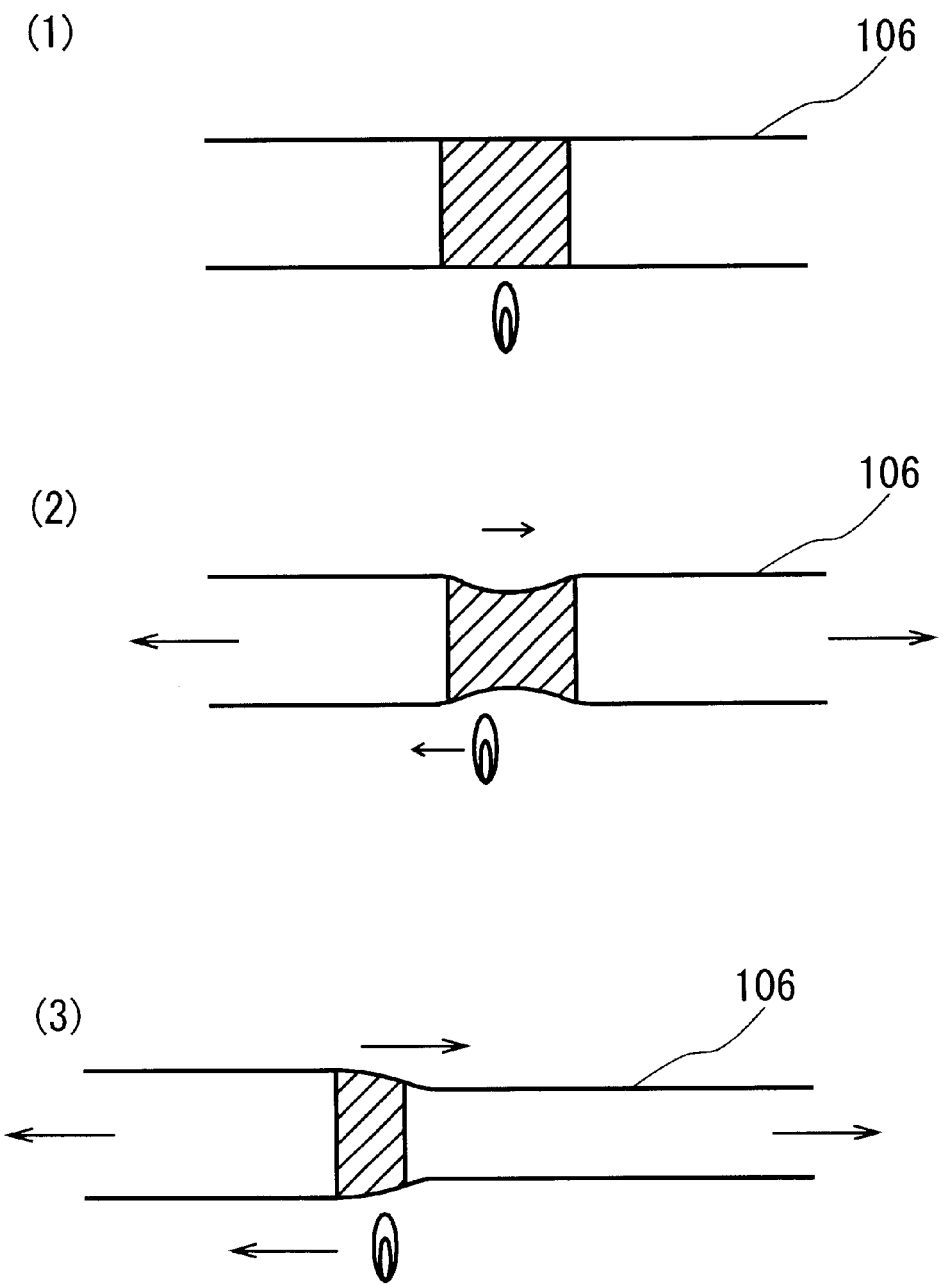

FIG. 33 shows a glass rod 106 that is elongated according to the elongating (S154) shown in FIG. 31.

Figure 34:
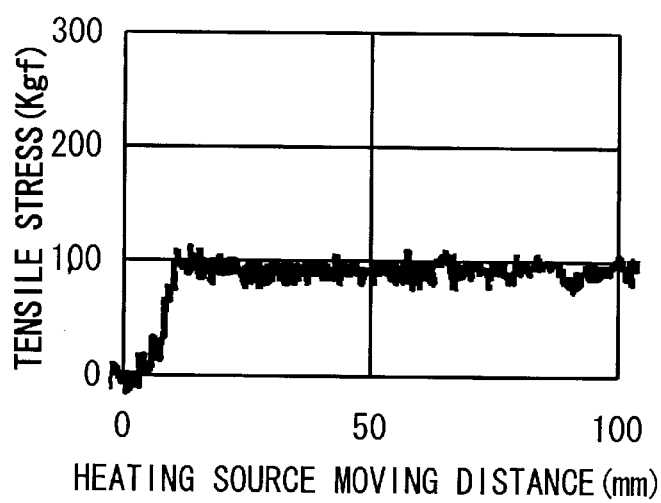

FIG. 34 shows the tensile stress of the glass rod 106 at the early stage of the elongation of the example.

Figure 35:
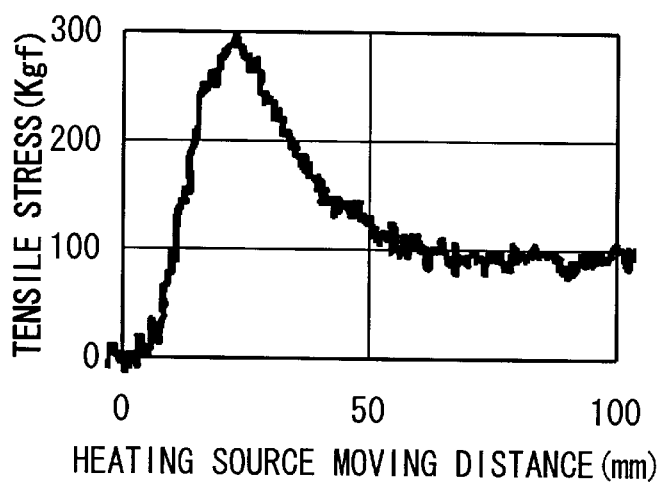

FIG. 35 shows the fluctuation of the tensile stress of the glass rod 106 at an early stage of the elongation of the comparative example.

Figure 36:
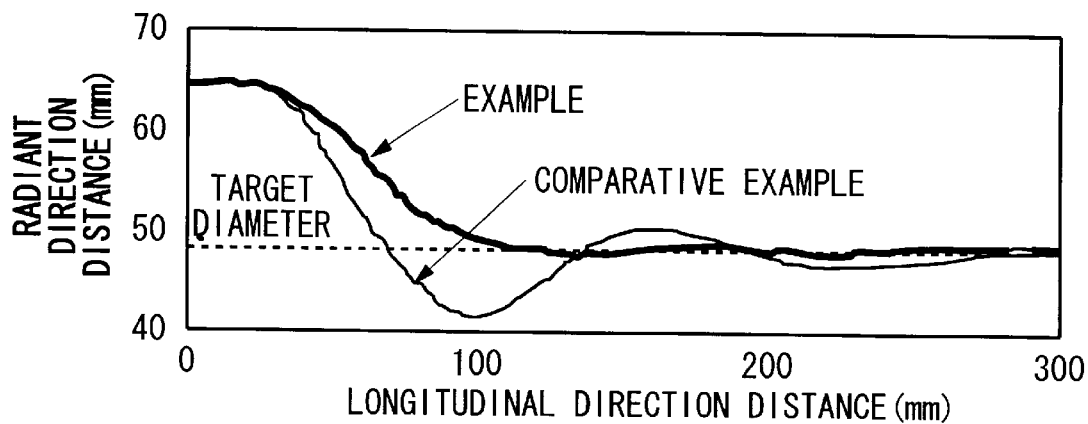

FIG. 36 shows fluctuation of the diameter of the glass rod 106 after the elongation of the glass rod 106.

Figure 37:
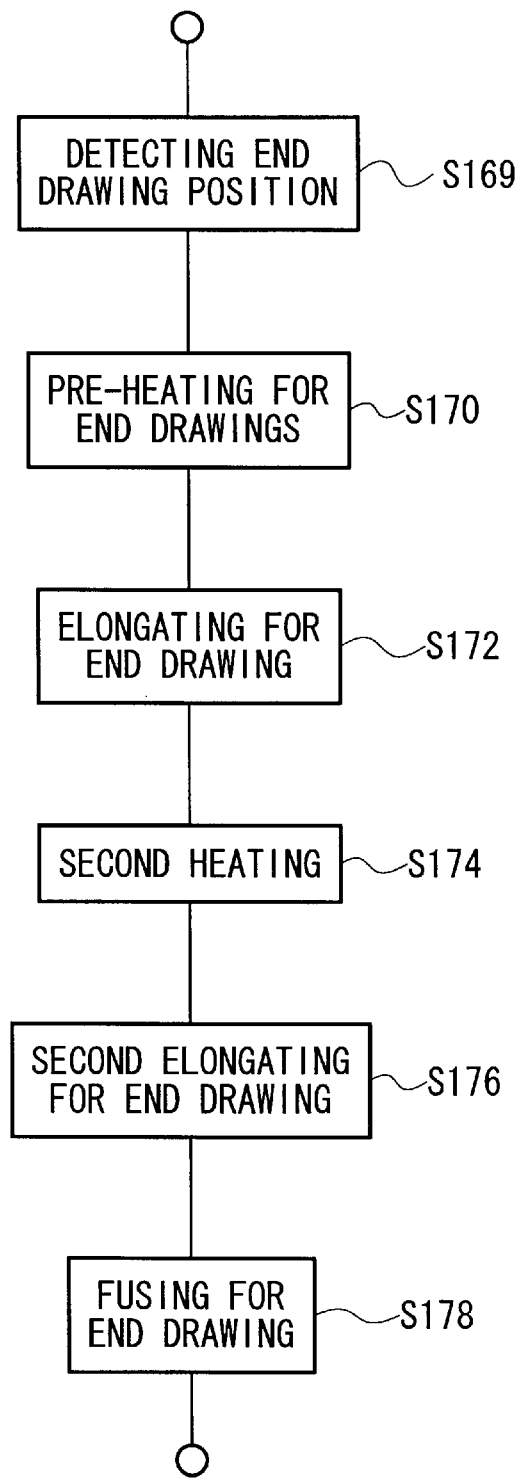

FIG. 37 shows a detailed flowchart of the end drawing (S158) shown in FIG. 26.

Figure 38:
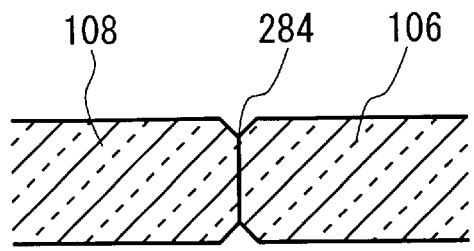

FIG. 38 shows a cut 284 which is provided on the connection between the glass rod 106 and the dummy rod 108 at the end drawing position detecting (S169) shown in FIG. 37.

Figure 39:
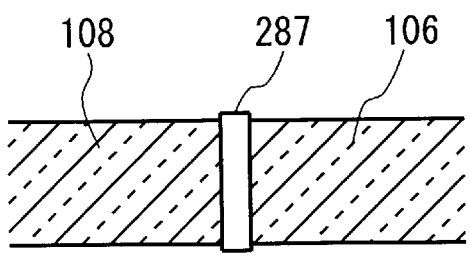

FIG. 39 shows a marking 287 that is applied on the connection between the glass rod 106 and the dummy rod 108 as another example of a mark.

Figure 40:
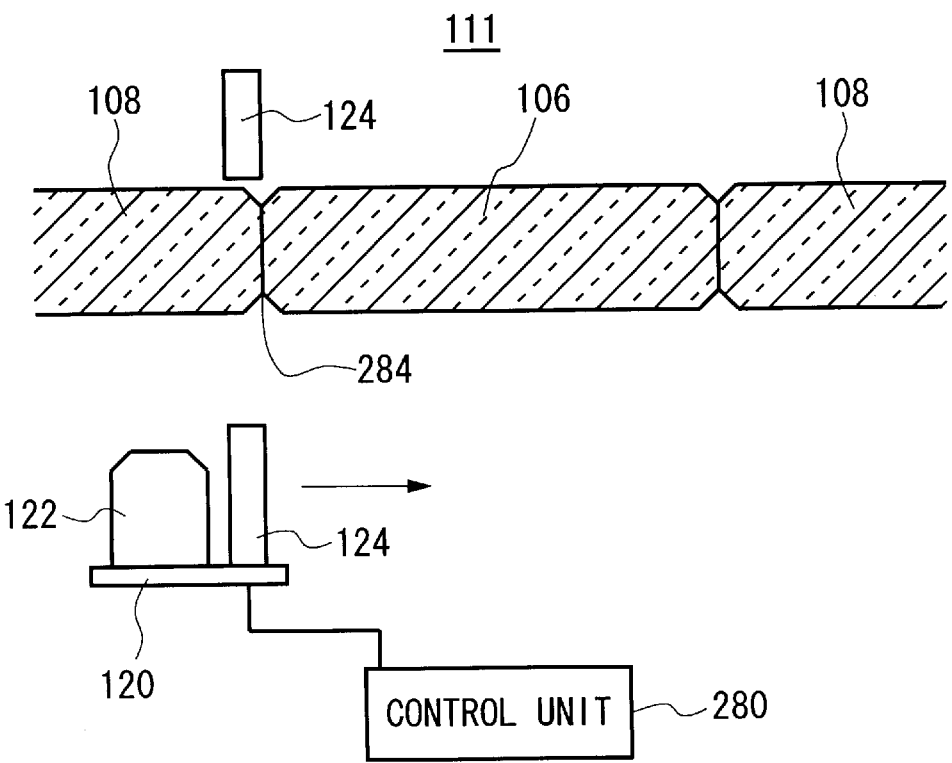

FIG. 40 shows the glass rod second elongating apparatus 111 that detects the cut 284 at end drawing position detecting (S169).

FIG. 41 shows the movements of the heating source 122 and the tail stock 116 during the end drawing process of the glass rod 106 shown in flow chart of FIG. 37.

FIG. 42 shows an example of the settings of an another method of the end drawing process at the end drawing (S158) shown in FIG. 37.

FIG. 43 shows another example of the settings of another method of the end drawing process at the end drawing (S158) shown in FIG. 37.

Figure 44:
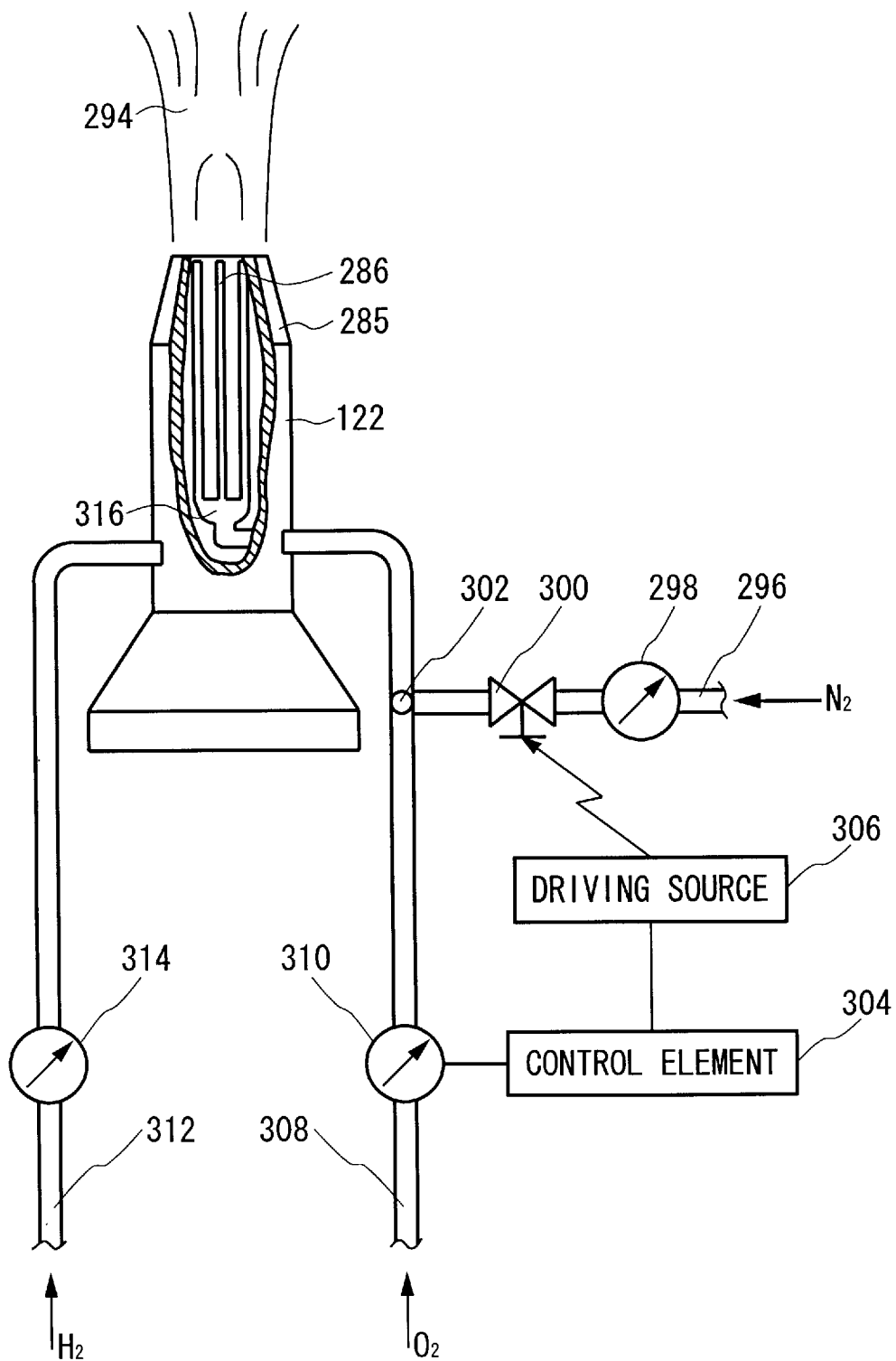

FIG. 44 shows a configuration of the heating source 122 of the glass rod second elongating apparatus 111.

Figure 45:
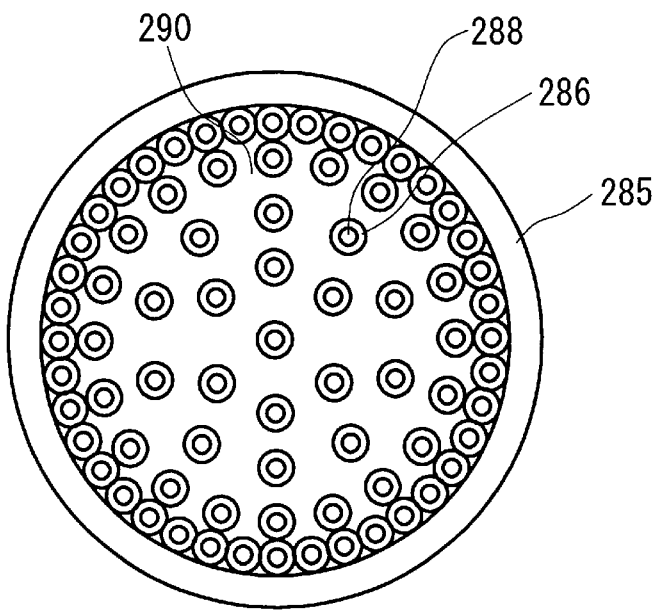

FIG. 45 shows a plan view of the top of the heating source 122.

Figure 46:
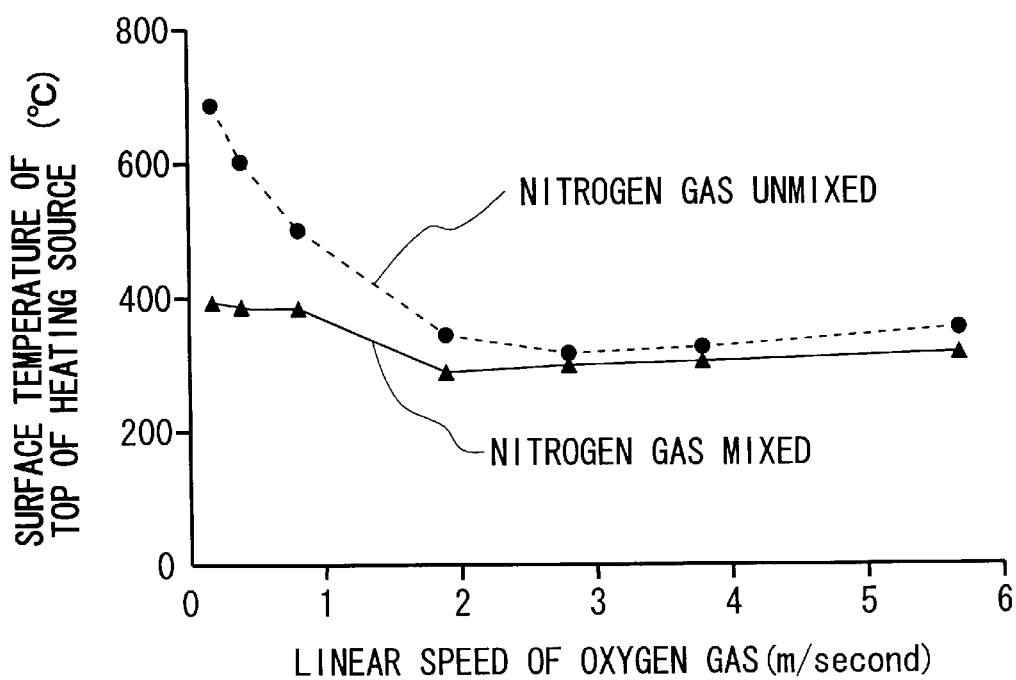

FIG. 46 shows a relationship between the linear speed of the oxygen gas and the temperature of the top of the heating source 122.

Figure 47:
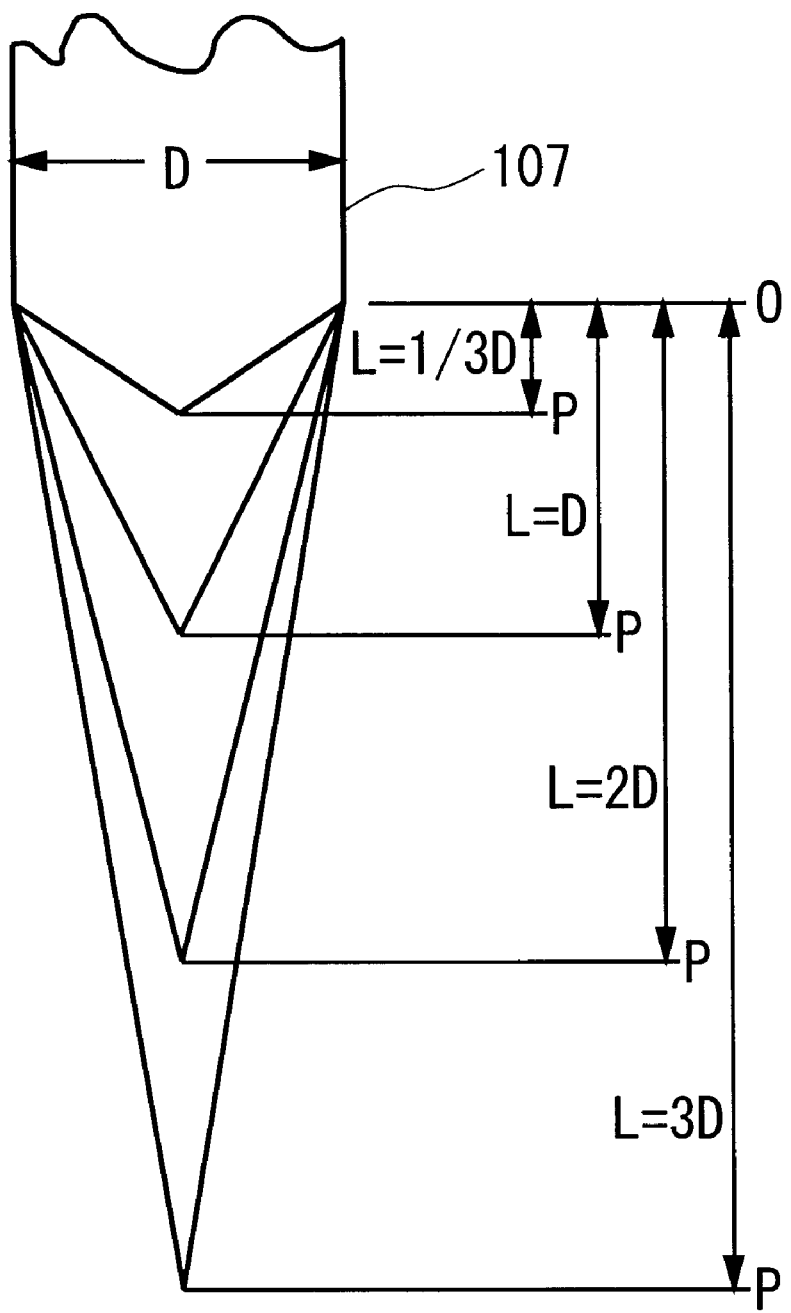

FIG. 47 shows a shape of a tip of the preform 107, the diameter of which is reduced and fused at the end drawing (S158).

FIG. 48 shows another shape of the tip of the preform 107 that was end elongated.

Figure 49:
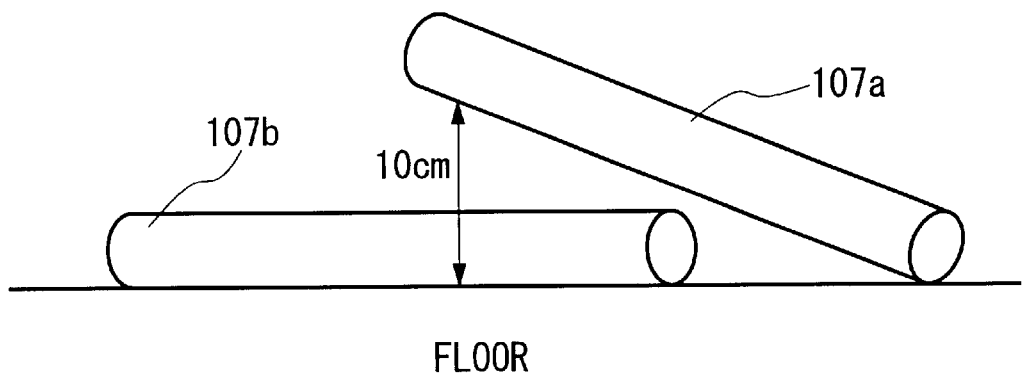

FIG. 49 shows damage of the preform 107 before the preform 107 is surface treated in the surface treatment (S168) shown in the FIG. 26.

Figure 50:
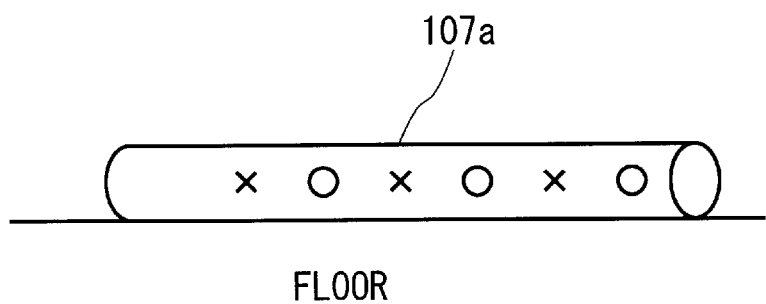

FIG. 50 shows the preform 107a, which was treated by the hydrofluoric acid etching on the example shown in FIGS. 51 and FIG. 52.

FIG. 51 shows the number of hydrofluoric concaves generated on the preform 107 counted by visual inspection of the example and the comparative example.

FIG. 52 shows the unevenness of the surface of the preform 107 after treatment of the hydrofluoric acid etching of the example and the comparative example.

Figure 53:
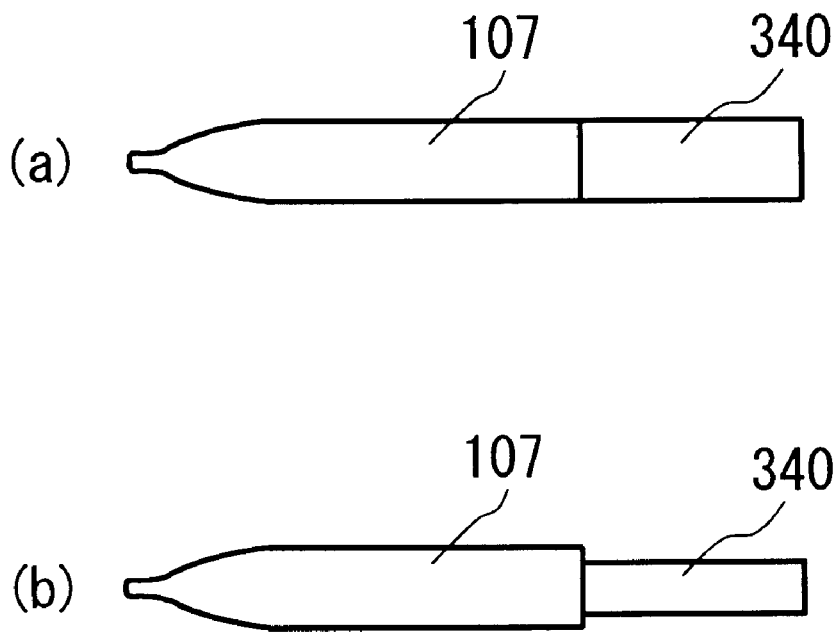

FIG. 53 shows another shape of the preform 107 which is surface treated.

Figure 54:
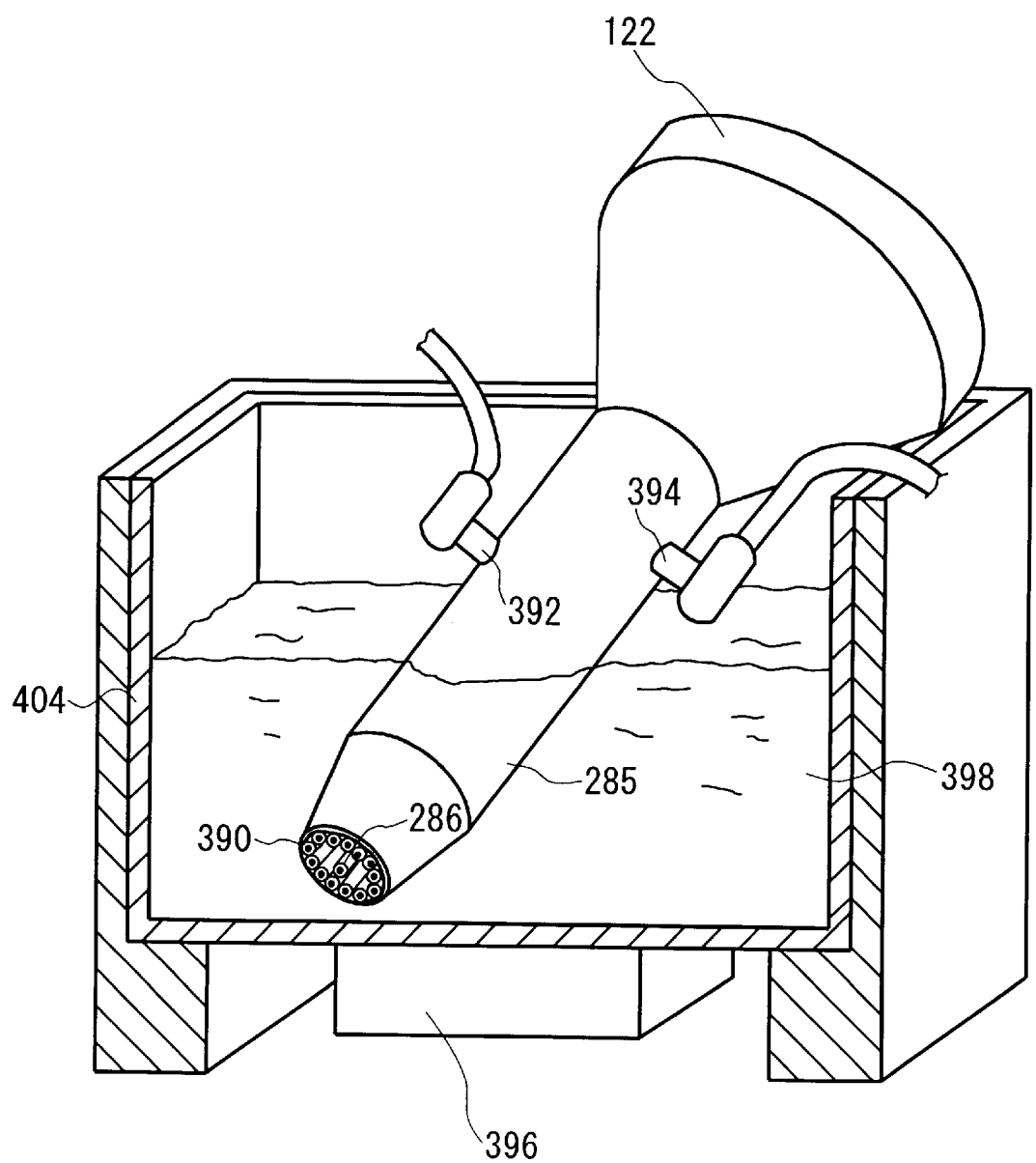

FIG. 54 shows an ultrasonic cleaning apparatus 404, which cleans the heating source 122.

Figure 55:
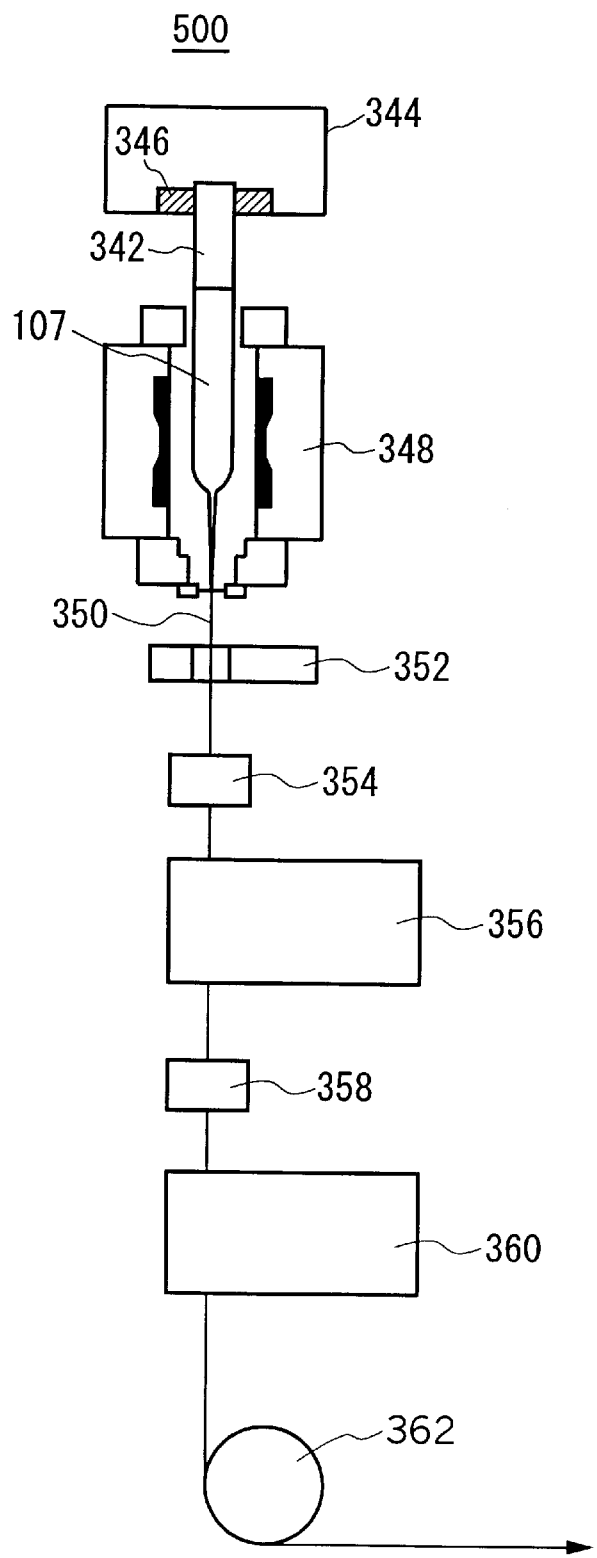

FIG. 55 shows a configuration of the preform drawing apparatus 500 that elongates the preform 107 to produce an optical fiber.

DETAILED DESCRIPTION OF THE INVENTION

The present invention will be explained using embodiments of the present invention. The following embodiments however, do not limit the scope of the present invention described in the claims. Moreover, not all the features or their combinations described in the embodiments are necessarily essential for the present invention.

Although the present invention has been described with reference to specific embodiments, the scope of the present invention is not limited to these embodiments. Those skilled in the art can make various modifications and improvements to the embodiments of the present invention. It is clear from the appended claims that such modifications or improvements are also covered by the scope of the present invention.

Figure 1:
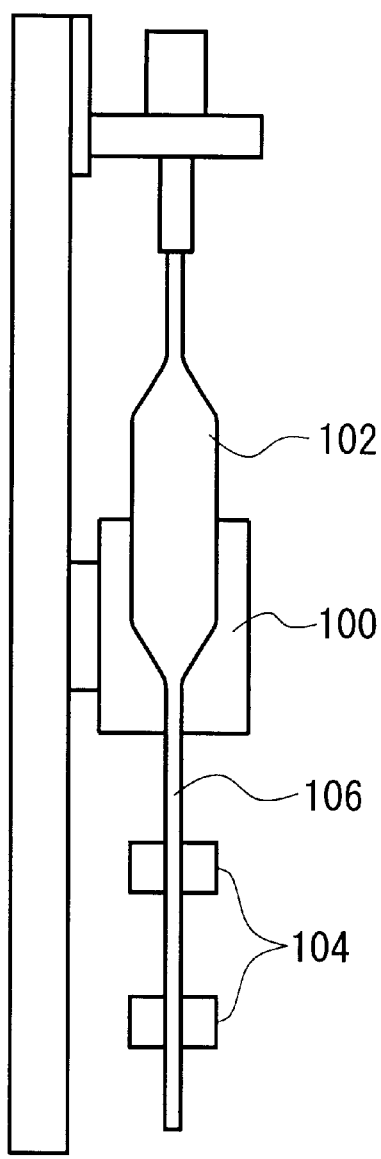
FIG. 1 shows a conventional glass base material first elongating apparatus 400.
Figure 2:
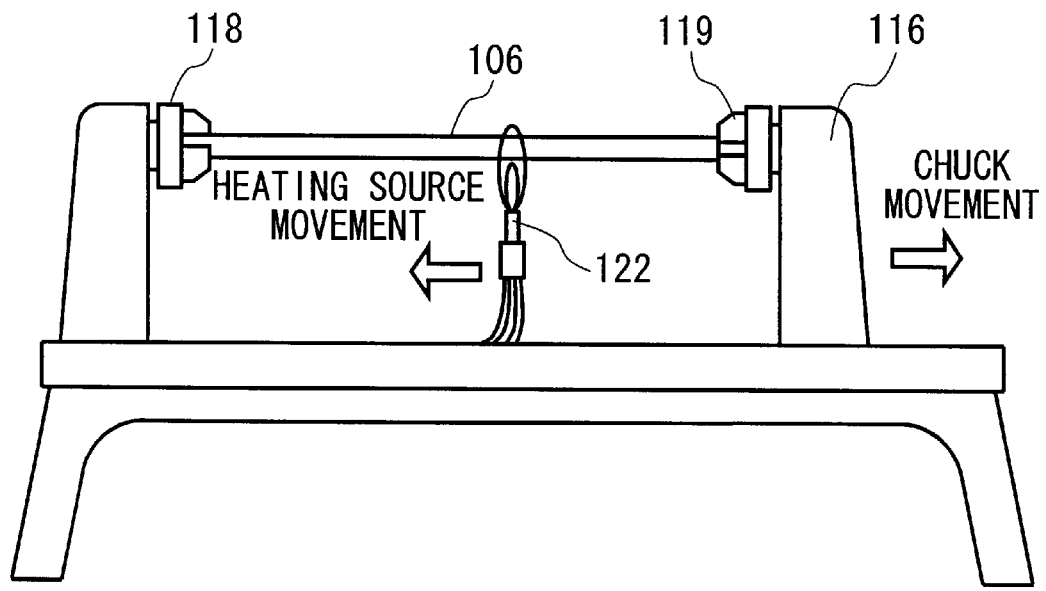
FIG. 2 shows a configuration of a conventional glass lathe 110.
Figure 3:
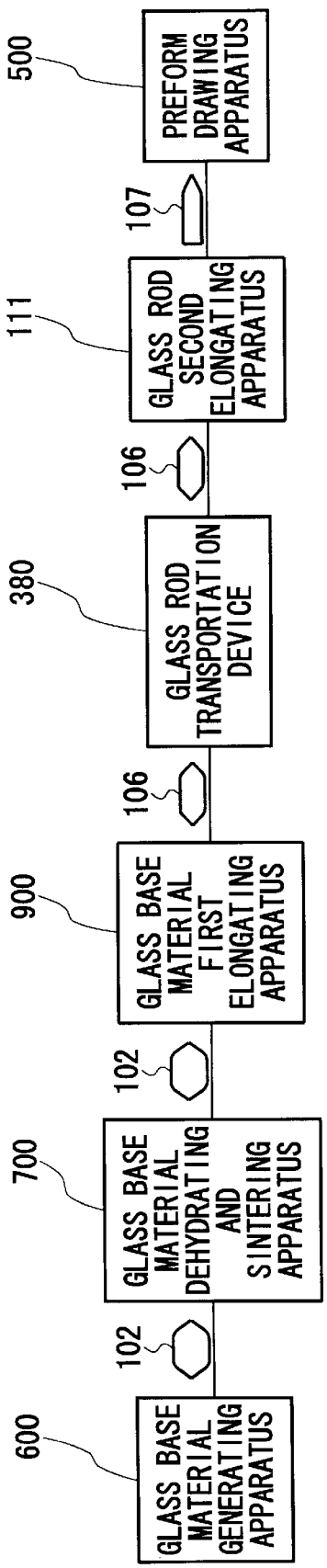
FIG. 3 shows a system of an optical fiber manufacturing apparatus of present invention.

FIG. 3 shows a system of an optical fiber manufacturing apparatus of the present invention. The system of the optical fiber manufacturing apparatus of present invention comprises a glass base material generating apparatus 600 which generates a glass base material 102 being a base material of an optical fiber; a glass base material dehydrating and sintering apparatus 700 which dehydrates and sinters the glass base material 102; a glass base material first elongating apparatus 900 which elongates the glass base material 102 to generate a glass rod 106; a glass rod transportation device 380 which transports the glass rod 106; a glass rod second elongating apparatus 111 which elongates the glass rod 106 a second time to generate a preform 107; and a preform drawing apparatus 500 which draws the preform 107 to generate an optical fiber.

FIG. 4 shows an optical fiber manufacturing method of the present invention. The glass base material 102 is generated by the glass base material generating apparatus 600 using the VAD method, vapor-phase axial deposition method, or the like (S200). The glass base material 102 is then dehydrated within a chlorine gas atmosphere and sintered within an inert-gas atmosphere by the glass base material dehydrating and sintering apparatus 700 (S202).

The diameter of the glass base material 102 is normally 110 mm to 200 mm, compared to a diameter of 30 mm to 80 mm which is most practical for drawing to an optical fiber. Therefore, the dehydrated and sintered glass base material 102 is elongated firstly by the glass base material first elongating apparatus 900 to produce a glass rod 106 (S204). The glass rod 106 has a diameter 3 mm to 5 mm larger than the diameter convenient for drawing to an optical fiber, which is from 30 mm to 80 mm.

The glass rod 106 is transported by the glass rod transportation device 380 (S205). The glass rod 106 is then heated and elongated by the glass rod second elongating apparatus 111 to a prescribed diameter, thus producing a preform 107 (S206). The preform 107 is heated and drawn to a filament-like form by the preform drawing apparatus 500 to produce an optical fiber (S210).

FIG. 5 shows a configuration of a glass base material first elongating apparatus 900. The glass base material first elongating apparatus 900 comprises a first elongating device 402 which heats and elongates the glass base material 102 and a glass rod fusing apparatus 370 which fusing the glass rod 106. The first elongating device 402 has a elongating furnace 130, which has a heating furnace 100, and a hanging mechanism 134 which is provided above the elongating furnace 130. The hanging mechanism 134 supplies the glass base material 102 to the inside of the elongating furnace 130 at a prescribed speed.

The first elongating device 402 further has an elongating mechanism 140 which is provided under the elongating furnace 130 to hold the glass rod 106 of reduced diameter and to pull the glass rod 106 at a prescribed speed. The hanging mechanism 134 has a base material fix unit 136 that holds the glass base material 102. The elongating mechanism 140 has an elongating chuck 142 that holds the glass rod 106. The glass rod fusing apparatus 370 has a burner 176, a rotating table 210, a timing belt 214, a motor 212, a supporting leg 208, a burner stand 216, an elongating device 206, and an elongating fusion chuck 218.

The glass base material 102 is installed on the base material fix unit 136, and sent into the heating furnace 100 at a prescribed speed. The glass base material 102 heated by the heating furnace 100 is held and pulled by the elongating chuck 142 to reduce the diameter thus producing a glass rod 106. The glass rod 106 is pulled by the elongating device 206 at a speed which is suitable for the diameter to be obtained, so that the glass base material 102 is elongated to the desired diameter. At this time, the diameter of the glass rod 106 is measured by a diameter measuring device 152. The feeder 204, heating furnace 100, and elongating device 206 are controlled based on this measurement in order to elongate the glass rod 106 to the desired diameter.

The glass rod 106, which has been elongated to a prescribed diameter and length, is fused by the burner 176 at the part that does not include the bubble or does not include the bubble of which diameter is substantially 0.3 mm or above. A flame of oxygen and hydrogen is a desirable heating means of the burner 176. A gas flame of based on hydrocarbon fuels such as propane and oxygen can also be used for the burner 176.

The burner 176 is installed on the rotating table 210 via the supporting leg 208. The rotating table is rotated by a driving device such as motor 212 via the timing belt 214. The rotating table 210 is installed on the burner stand 216. The glass rod fusing apparatus 370 fuses the glass rod 106 by heating the glass rod 106 with the rotating the burner 176 and elongates the glass rod 106 using the elongating fusion chuck 218 with a prescribed speed and pull strength.

FIG. 6 shows a first elongating device 402 which holds a standard rod 138 by a material fix unit 136 to adjust the axis for elongating a glass base material 102. The hanging mechanism 134 has a mechanism not shown in the figure, that adjusts the vertical inclination of the base material fix unit 136. The elongating mechanism 140 has a mechanism, also not shown in the figure, that adjusts the vertical inclination of the elongating chuck 142. The elongating mechanism 140 further has a mechanism, again not shown in the figure, that adjusts the position of the elongating mechanism 140 within the horizontal phase in the directions back and forth and left and right.

FIG. 7 shows a detailed flow chart of a glass base material first elongating (S204) shown in FIG. 4. The glass base material first elongating (S204) has a process to adjust the elongating axis of the first elongating device 402. First, a metal or ceramic rod is prepared as a standard rod 138. The straightness of the standard rod 138 should be guaranteed. The standard rod 138 usually has a length of a glass base material 102 and dummy rod that is welded onto the glass base material 102. The straightness of the axis of the standard rod 138 is guaranteed along the full length.

As shown in FIG. 6, the standard rod 138 is held by the base material fix unit 136 of the hanging mechanism 134 (S110). Then, the inclination A of the hanging mechanism 134 is adjusted so that the direction of the standard rod 138 matches with the vertical direction (S112). Following this, the standard rod 138 is removed from the base material fix unit 136 after finishing the adjustment (S114).

FIG. 8 shows the first elongating device 402 that holds the standard rod 138 by the elongating chuck 142. The standard rod 138 is held by the elongating chuck 142 of the elongating mechanism 140 (FIG. 7, S116), Then the inclination B of the elongating mechanism 140 is adjusted so that the direction of the standard rod 138 matches with the vertical direction (FIG. 7, S118). At this time, it is desirable that the elongating chuck 142 maintains the approximate center of longitudinal direction of the standard rod 138. The procedure for adjusting the hanging mechanism 134 and the elongating mechanism 140 can be reversible. The elongating mechanism 140 can be adjusted first, and then the hanging mechanism 134 can be adjusted.

FIG. 9 shows the first elongating device 402, which holds the standard rod 138 by both the hanging mechanism 134 and the elongating mechanism 140. After finishing the adjustment of the hanging mechanism 134 and the elongating mechanism 140, by holding the standard rod 138 by the base material fix unit 136, the lower end of the standard rod 138 is held by the elongating chuck 142 (FIG. 7, S120). Then, the horizontal direction position C of the elongating mechanism 140 or the horizontal direction position C of the hanging mechanism 134 is adjusted so that the difference in horizontal direction between the vertical axis and the standard rod 138 is less than 0.5 mm per 1 m length (FIG. 7, S122).

Following this, a glass rod 106 is generated by elongating the glass base material 102 using the first elongating device 402, the elongating axis of which is adjusted (FIG. 7, S124). Finally, the glass rod 106 is fused by the glass rod fusing apparatus 370 (FIG. 7, S126).

FIG. 10 and FIG. 11 show examples that use elongating rollers 144a and 144b on the elongating mechanism 140 instead of the elongating chuck 142. To adjust the vertical inclination of the axis connecting the hanging mechanism 134 and the elongating mechanism 140 in the case of using the elongating rollers 144a and 144b, the following method is adopted. The standard rod 138 is held by the elongating rollers 144a and 144b as opposed to the holding of the standard rod 138 by the elongating chuck 142 (FIG. 7, S116).

Following this, the inclination of the elongating mechanism 140 is adjusted by adjusting the horizontal inclination of the line F. The line F connects the two rotation axis between the elongating rollers 144a and 144b. After the adjustment of the inclination of the elongating mechanism 140 (FIG. 7, S118), the elongating rollers 144a and 144b can hold the standard rod 138 vertically.

Next, as shown in FIG. 11, the standard rod 138 is held by the base material fix unit 136 of the hanging mechanism 134 and the elongating rollers 144a and 144b of the elongating mechanism 140 at the step corresponding to holding the standard rod 138 by the base material fix unit 136 and the elongating chuck 142 (FIG. 7, S120). Then, the vertical inclination E of the axis which connects the hanging mechanism 134 and the elongating mechanism 140 is adjusted. This adjustment is made either by adjusting the position of the elongating mechanism 140 in the horizontal direction or adjusting the position of the hanging mechanism 134 in the horizontal direction at the step corresponding to adjustment of the horizontal direction position of the hanging mechanism 134 and the elongating mechanism 140 (FIG. 7, S122).

The vertical inclination of the axis connecting the hanging mechanism 134 and elongating mechanism 140 can be readily adjusted using the adjusting method shown above. This method is suitable not only for elongating the straight glass base material 102 without any gap between the dummy rod and the glass base material 102, but also for elongating a glass base material 102 with some bending, to obtain a glass rod 106 with reduced diameter within a desired range of straightness. This is possible, provided the glass base material 102 is welded onto the dummy rod without a gap between the axis of the glass base material 102 and the dummy rod.

The first elongating device 402 can adjust the vertical inclination of the elongating axis accurately for the methods of holding the glass base material 102 by either the hanging mechanism 134, the elongating mechanism 140 or by both the hanging mechanism 134 and the elongating mechanism 140. Therefore, the bending moment, which causes bending on the heat softened region of the glass base material 102 can be decreased. Bending is generated by the weight of the elongated glass base material 102 as it bears on the elongating mechanism 140. The glass base material 102 can therefore be elongated within a desired range of straightness without causing a gap between the axis of the glass base material 102 and the dummy rod.

FIG. 12 shows the glass base material 102, the bending degree of which is measured. The glass base material 102 is elongated by the first elongating device 402, the vertical inclination of which is adjusted by the adjusting method shown above. Then, the degree of bending of the glass rod 106 is measured. First, the glass rod 106 is placed on two bearings 148 and 149, which are installed horizontally so that the line connecting the top of bearings 148 and 149 can be a standard line. Next, the maximum or minimum value of the height from the standard line is measured by scanning the measuring device 150 along the glass rod 106 using a device such as a dial gauge.

Then, the glass rod 106 is rotated 180 degrees, and the maximum and minimum value of the height from the standard line is measured in the same way. The maximum value of the difference between the first measured maximum value and the next measured minimum value or the difference of the first measured minimum value and the next measured maximum value is set as "2h". The value that divides the "h" by the length L1, which is a distance between two bearings 148 and 149, represents the straightness of the glass rod 106 per unit of length.

5 pieces of the straight glass base material 102 without the gap of axis with dummy rod were elongated by the first elongating device 402 with an adjusted elongating axis to produce 5 of glass rod 106. The straightness of each of the glass rods 106 was measured by the method shown in FIG. 12. The "h" of the glass rods 106 were all within 0.5 mm. Next, the glass rods 106 were elongated by the first elongating device 402 without adjustment of the elongating axis. An average of 90 percent of the glass rods 106 were bent which indicates that the glass rod 106 should be corrected through adjustment of the elongating axis.

FIG. 13 shows a mechanism by which the first elongating device 402 controls the speed of rotation of the elongating rollers 144a and 144b. The first elongating device 402 controls the rotation speed of each of the elongating rollers 144a and 144b respectively. The glass base material 102 is hung by the base material fix unit 136 of the first elongating device 402 and sent to the heating furnace (not shown in the figure) at a prescribed speed. The glass rod 106, which is heated and softened by the heating furnace, is taken by the pair of elongating rollers 144a and 144b.

The center position of the heat softened region of the glass base material 102 is obtained by measuring the diameter of the heat softened region of the glass base material 102 using the diameter measuring device 152. At the same time the center position of the measured diameter is calculated. A laser beam transmission type diameter measuring device is used as the diameter measuring device 152. The laser beam is irradiated onto the heat softened region of the glass base material 102 through the window provided on the lower part of the heater in the heating furnace.

The measured diameter is input to the diameter control unit 156, and the difference between the target diameter value and the measured diameter is calculated. The rotation speed of the elongating roller 144a is controlled based on the calculated difference of the diameter. Then, the information on the center position of the heat softened region is input to the position control unit 158.

The position control unit 158 calculates the amount of deviation between the center position of the heat softened region and the elongating axis 154 of the first elongating device 402. The position control unit 158 further calculates the correction value of the rotation speed, which can reduce the deviation between the center position of heat softened region and the elongating axis 154 to virtually zero. Then, the position control unit 158 controls the rotation speed of the elongating roller 144b based on the addition of the correction value and the rotation speed of the elongating roller 144a.

FIG. 14 shows a relationship between the amount of deviation between the center position of the heat softened region of the glass base material 102 and the elongating axis 154, and the degree of bend caused in the glass rod 106. The larger the amount of deviation between the center position of the heat softened region of the glass base material 102 and elongated axis 154, the larger the resultant bend in the glass rod 106.

When the amount of deviation is large, the heat-resistant members on the surface of the elongating rollers 144a and 144b are deformed. The shapes of the elongating rollers 144a and 144b become slightly different to each other. The result is the rotation speeds of the surfaces of the elongating rollers 144a and 144b are different to each other. Since the deformation of the surface of the elongating rollers 144a and 144b is one of the causes of the bending of the glass rod 106, the bend of the glass rod 106 can be reduced by controlling the rotation speed of each of the elongating rollers 144a and 144b respectively.

The surfaces of the elongating rollers 144a and 144b are formed from a heat-resistant material such as non-asbestos or asbestos. These materials are heat resistant and flexible, so that the elongating rollers 144a and 144b can easily elongate the glass rod 106 at high temperatures. The surface of the elongating rollers 144a and 144b that come into contact with the glass rod 106 are gradually deformed by the high temperature and pinching force or friction force of the glass rod 106. Because the deformation of the elongating rollers 144a and 144b is slightly different to each other, the rotation speed of the surfaces of the elongating rollers 144a and 144b also differs.

FIG. 15 shows deformation of the surfaces of the elongating rollers 144a and 144b. The outside shape of the elongating roller 144a and the elongating roller 144b is different. The number of batches is the number of glass base materials 102 which were elongated. As the number of batches is increased, the deformation and abrasion is progressed. The result is, the amount of elongation becomes different between the elongating rollers 144a and 144b, which causes fluctuation in the position of the heat softened region of the glass base material 102 which in turn causes bending of the glass rod 106.

FIG. 16 shows displacement of the center position of the heated region of the metal pipe when the metal pipe is taken by the elongating rollers 144a and 144b at batch number 300 shown in FIG. 15. The vertical axis shows the displacement of the center position of the heated region of the metal pipe, and the horizontal axis shows time. The curve A shows the fluctuation of the amount of deviation in the direction of rotation of the elongating rollers 144a and 144b. The curve A shows that the displacement fluctuates largely during a single rotation of the elongating rollers 144a and 144b. The curve B shows that the fluctuation of displacement is quite small for the axis direction of the elongating rollers 144a and 144b.

FIG. 17 shows displacement of the center position of the heat softened region by the first elongating device 402 of the embodiment. The vertical axis shows the displacement of the center position of the heat softened region of the glass base material 102, and the horizontal axis shows the time from the start of the elongation. The displacement of the heat softened region is controlled and maintained at a small level after 1500 seconds from the start of the elongation. Therefore, a glass rod 106 without a substantial bend can be manufactured by controlling the rotation speed of the each of the elongating rollers 144a and 144b respectively. This allows the center position of the heat softened region to be maintained at a relatively constant point.

Comparative Example

FIG. 18 shows fluctuation of the center position of the heat softened region when the rotation speed of the elongating rollers 144a and 144b are controlled at the same rotation speed as each other. The vertical axis shows the displacement of the center position of the heat softened region of the glass base material 102, and the horizontal axis shows the time from the start of the elongation.

A glass rod 106 having a prescribed diameter was manufactured by measuring the diameter of the heat softened region of the glass base material 102 using the same diameter measuring device 152 in FIG. 17. The rotating speeds of the elongating rollers 144a and 144b were controlled at the same rotation speed as each other. The fluctuation of the center position of the heat softened region was large so that a bend requiring correction was caused on the elongated glass rod 106.

FIG. 19 shows another embodiment of the burner 176 used in the glass rod fusing apparatus 370 shown in FIG. 5. A ring burner 176 has a hydrogen gas supply pipe 190 and a ring-type gas inlet 194, which are connected to an oxygen gas supply pipe 192. The cooling pipe 196, which is connected to the cooling water supply pipe 198 and cooling water drainage pipe 200, is provided on the outer area of the ring burner 176. The ring-type gas inlet 194 can be a single layer that ejects a mix of hydrogen gas and oxygen gas. The ring-type gas inlet 194 can also be multiple or triple layered which eject the hydrogen gas from the upper and lower layers and oxygen gas from the middle layer.

The glass rod 106 is set inside the ring of the ring burner 176, after which the hydrogen and oxygen gases are supplied to the ring burner 176 and ignited. The surface of the glass rod 106 is fused by the flame 178. The ring burner 178 can heat the glass rod 106 efficiently so that it is unnecessary to over heat the glass rod 106. Therefore, the opaque region on the surface of the glass, generated when glass is heated to temperatures higher than 2000° C., cannot be seen on the fused surface of the glass rod 106.

According to the embodiments shown above, the glass rod 106 was fused. The glass base material 102 with a diameter of 120 mm was heated by the ring burner 176 for ten minutes. Hydrogen gas was supplied to the ring burner 176 at a rate of 300 L/minute and oxygen gas at 120 L/minute. The glass rod 106 was fused by elongation when the glass rod 106 was melted. The fused surface of the glass rod 106 was shaped into a circular cone. The color of the surface of the glass rod 106 was transparent.

FIG. 20 shows a configuration of a glass rod transportation device 380. The glass rod transportation device 380 is used for transporting the glass rod 106 generated by the first elongating device 402. The glass rod 106 is held by the movable holding element 245 and the fixed holding element 246 installed on the air cylinder storage box 244. When the air cylinder (not shown in the figure) provided inside the air cylinder storage box 244 is driven, the movable holding element 245 moves toward the fixed holding element 246 thereby holding the glass rod 106.

The force with which the movable holding element 245 pushes the fixed holding element 246 can be modified by modifying the air pressure which flows into the air cylinder. The air pressure of the air cylinder can be modified by operating a switch during the transportation of the glass rod 106. The switch is provided on the operating switch box 248.

The present embodiment has a second level of pushing force for pushing the movable holding element 245 to the fixed holding element 246. This is achieved by adjusting the air pressure which flows into the air cylinder to one of two possible levels. For example, the weak side of the pushing force, which pushes the movable holding element 245 to the fixed holding element 246, is the first holding force, and the strong side of the pushing force is second holding force. The first holding force is set to 0.5 kg, and the second holding force is set to 80 kg.

The air pressure adjustment of the air cylinder does not have to have only two levels of adjustment. The air pressure adjustment can be a multiple level adjusting type which adjusts to more than three levels of air pressure or the continuous adjustment type that provides a gradual rather than stepped level change. A rotary actuator 250 rotates the glass rod 106 from the vertical condition to the horizontal condition by rotating the movable holding element 245 and the fixed holding element 246 through the air cylinder storage box 244. A holding flame 252 holds the glass rod transportation device 380 by connecting the glass rod transportation device 380 to the first elongating device 402. A handle 254 is used for operating the glass rod transportation device 380. A rotation axis 256 rotates the air cylinder storage box 244.

FIG. 21 shows a storage container 224 of the first elongating device 402. The storage container 224 has a saucer 260, a strut 262, a pair of holding members 234a and 234b which hold the glass rod 106, and a pair of holding members 236a and 236b which are provided under the holding members 234a and 234b. The shapes of the holding members 234a, 234b, 236a, and 236b are substantially semicircle, which is desirable to securely hold the glass rod 106 inside the storage container 224. Together, each of the pair of holding members 234a and 234b and holding members 236a and 236b form circle shaped holding members.

One end of each of the holding members 234a and 234b and the holding member 236a and 236b is pin connected to strut 262. The other end of each is connected to the corresponding pair of holding members by a pin 257 or a pin 258. The holding members 234a and 234b are connected by the pin 257, and the holding members 236a and 236b are connected by the pin 258. The height of the strut 262 is 1,550 mm. The inside diameter of the saucer 260 is 300 mm. Each of the inside diameters of the holding members are 180 mm, formed by the pair of holding members 234a and 234b and the pair of holding members 236a and 236b.

In the case of receiving inside the storage container 224, a glass rod 106 with an outside diameter of 80 mm, 4, the angle of inclination α between the strut 262 and the glass rod 106 in the front and rear direction can range from −3.1° to +8.1°. The angle of inclination β between the glass rod 106 and the strut 262 in the left and right directions can range from −5.9° to +5.9°. Here, The angle of inclination is a limited value, and the glass rod 106 can be received inside the storage container 224 in various angles within this limited value. The glass rod 106 is in a various angles inside the storage container 224.

FIG. 22 shows a movement of the glass rod transportation device 380 when transporting the glass rod 106. The glass rod 106 inside of the storage container 224 is held by the movable holding element 245 and fixed holding element 246 with the first holding force (b). Then, the glass rod 106 is moved so that the glass rod 106 stands vertical to the ground within the holding member 234a and 234b (C). Because the first holding force is very weak, the movable holding element 245 will be opened when a force larger than the first holding force is applied to the movable holding element 245 during movement of the glass rod 106. Moreover, the friction force acted between the movable holding element 245 and glass rod 106 and between the fixed holding element 246 and glass rod 106 is very small compared to the weight of the glass rod 106. Therefore, glass rod cannot be lifted by raising the glass rod transportation device 380, which holds the glass rod 106 by the first holding force.

After confirming that the glass rod 106 stands vertical, the holding force of the glass rod transportation device 380 is changed to the second holding force (d). Following this, the pins 257 and 258 are removed, and each of the holding members 234a and 234b and the holding member 236a and 236b are opened. Next, the glass rod transportation device 380 takes the glass rod 106 out of the storage container 224 for transportation. The glass rod 106 taken from the storage container 224 is rotated to a horizontal position and placed on the keeping place. During horizontal placement of the glass rod 106 on the keeping place, air pressure larger than a constant value is applied to the air cylinder to raise and lower the glass rod transportation device 380. Therefore, the weight of the glass rod transportation device 380 is not applied to the glass rod 106 which prevents damage to the glass rod.

FIG. 23 shows an another embodiment of the glass rod transportation device 380. The glass rod transportation device 380 of this embodiment has two rotation mechanisms A and B. Each of the rotation mechanisms A and B has a rotary actuator. The rotation mechanism A rotates the glass rod 106 by rotating a rotation axis 256 through the rotary actuator 250. The rotation mechanism B moves the glass rod 106 up and down or left and right through the coupling axis 266 by rotating a rotation axis 268 through the rotary actuator 264. The rotation axis 268 lies at right angles to the rotation axis 256 horizontally or vertically.

FIG. 24 shows the movement of the glass rod transportation device 380 shown in FIG. 23 when the glass rod transportation device 380 transports the glass rod 106. FIG. 24(a) shows a plan view of the glass rod transportation device 380, which holds the glass rod 106. FIG. 24(b) shows the cross sectional view of the glass rod transportation device 380, which transports the glass rod 106 to the V block 240. As shown in FIG. 24(a), the movable holding elements 245 and 246, which hold the glass rod 106 vertically, are rotated from the vertical to horizontal position by operating the rotary actuator 250. Next, as shown in FIG. 24(b), the movable holding element 245 and the fixed holding element 246 are rotated downward by activating the rotary actuator 264.

The direction of opening and closing of the movable holding element 245 changes from a vertical direction to horizontal direction by activating the rotary actuator 264. Therefore, the movable holding element 245 and the fixed holding element 246 can release upward after placing the glass rod 106 on the V block 240 by opening the movable holding element 245. By including not only the rotation mechanism A, which rotates the glass rod 106 from a vertical to horizontal position, but also the rotation mechanism B, which has another rotation axis 268 that lies at right angles to the rotation axis 256, the transportation efficiency of the glass rod 106 is increased.

FIG. 25 shows a configuration of a glass rod second elongating apparatus 111 of the present invention. The glass rod second elongating apparatus 111 comprises a mounting 112, a fixed chuck 118, a movable chuck 119, a heating source 122, a mass flow controller 278, tail stocks 114 and 116, a tail stock driving motor 275, a tail stock driving encoder 273, a diameter measurement device 124, a moving stand 120, a sliding screw 270, a moving stand motor 274, a moving stand encoder 272, a chain 276, and a control unit 280.

The fixed chuck 118 and the movable chuck 119 hold the glass rod 106 which has been weld at both ends to a dummy rod 108. The heating source 122 heats the glass rod 106, which is held by the fixed chuck 118 and movable chuck 119. The mass flow controller 278 adjusts the amount of gas supplied to the heating source 122. The tail stock 116 elongates the glass rod 106 by moving the movable chuck 119. The tail stock driving motor 275 drives the tail stock 116. The tail stock driving encoder 273 detects the amount of the rotation and controls the speed of the tail stock driving motor 275. The moving distance of the tail stock 116 can be assessed from the amount of the rotation of the tail stock driving motor 275 detected by the tail stock driving encoder 273.

The diameter measurement device 124 measures the diameter of the glass rod 106 corresponding to the position along the axial direction of the glass rod 106. The heating source 122 and the diameter measurement device 124 are provided on the moving stand 120. The moving stand 120 moves the heating source 122 and diameter measurement device 124. The moving stand 120 is provided on the mounting 112. The moving stand 120 can move along the sliding screw 270, which is installed parallel to the axis that connects the fixed chuck 118 and movable chuck 119. The moving stand 120 is driven by the moving stand motor 274 through the sliding screw 270 and the chain 276. The moving stand encoder 272 controls the speed of the moving stand motor 274.

The control unit 280 controls the moving distance of the heating source 122 by controlling the moving stand encoder 272, the moving stand motor 274, the chain 276, the sliding screw 270 and the moving stand 120. The control unit 280 controls the amount of gas provided to the heating source 122 by controlling the mass flow controller 278. The control unit 280 controls the moving speed of the tail stock 116 by controlling the tail stock driving encoder 273 which controls the rotation speed of the tail stock driving motor 275. The control unit 280 controls the elongating speed of the glass rod 106 by controlling the moving speed of the tail stock rod 116.

The tail stock 114 and 116, fixed chuck 118, movable chuck 119, tail stock driving motor 275, and tail stock driving encoder 273 constitute an elongating unit which elongates the glass rod 106.

The data on the measured diameter and position of measurement as measured by the diameter measurement device 124, and the data on the changes in length of the glass rod 106 obtained from the moving distance of the tail stock 116 are input to control unit 280. The control unit 280 controls the heating condition based on input data by controlling factors such as moving distance of the heating source 122, the amount of gas provided to the heating source 122, and also controls the elongation speed of the tail stock 116 based on input data.

FIG. 26 shows a detailed flow chart of the glass rod second elongating (S206) shown in FIG. 4. First, the dummy rods 108 are held by the fixed chuck 118 and the movable chuck 119. Following this, both ends of the glass rod 106 are welded to the dummy rods 108 (S146) so that the glass rod 106 is set on the glass rod second elongating apparatus 111. Next, a cut 284 of 3 mm depth is made around the connection of the glass rod 106 and the dummy rods 108 as a marker.

The starting and finishing position of the diameter measurement of the glass rod 106 and the target diameter are then set (S150). The diameter of the glass rod 106 is measured corresponding to the location along the axial direction of the glass rod 106 (S152). The elongating speed at a plurality of locations along the axial direction of the glass rod 106 is set based on the measured diameter and the location corresponding to the measured diameter. The heating conditions including the amount of gas supplied to the heating source 122 and the moving distance of the heating source 122 are set based on the average value of the diameter of the glass rod (S153). The glass rod 106 is heated by the heating source 122 with a preset heating condition and elongated gradually by the tail stock 116, which moves with a preset elongating speed (S154).

The location of the cut 284, which is provided around the connection of the glass rod 106 and the dummy rods 108, are then detected by the diameter measurement device 124 in order to detect the location of both ends of the glass rod 106. The moving distance of the tail stock 116 is measured by the tail stock driving encoder 273 in order to measure changes in the length of the glass rod 106 along the axial direction.

The diameter of the glass rod 106 is then measured at a position approximately 50 mm away from the cut 284 towards the center of the glass rod 106 (S156). The heating position of the heating source 122 is set based on the position of the cut 284 and the changes in length of the glass rod 106 along the axial direction. The amount of gas supplied to the heating source 122 is set based on the measured diameter. The moving speed of the tail stock 116 is also set based on the measured diameter (S157). The glass rod 106 is end-drawn which heats and elongates the glass rod 106 with a preset heating condition and elongating speed. The shape of the end of the glass rod 106 therefore becomes similar to a circular cone shape so that the diameter of end of the glass rod 106 reduced (S158).

The position of the end-drawn part is then detected by measuring the diameter of the end-drawn part and the part elongated by the end drawing at the corresponding position. These measurements are undertaken by the diameter measurement device 124. The change in length of the glass rod 106 along the axial direction resulting from end drawing is measured by the tail stock driving encoder 273 (S160). The starting and finishing position of the fire polishing, which polishes the glass rod 106 with fire, and the heating power of the fire are then set. This setting is based on the detected position of the end-drawn part and the change in length of the glass rod 106 along the axial direction (S161).

The position of starting and finishing the fire polishing is set based on the position of the cloud on the glass rod 106. A cloud is generated in a region that is heated strongly during he end drawing process. The glass rod 106 is fire polished by he heating source 122 as per the preset fire condition from the set fire polishing starting position to the set fire polish finishing position (S162). After fire polishing, the shape of the glass rod 106 is checked by measuring the finished diameter and length of the glass rod 106 (S164). The dummy rod 108 is then removed from the glass rod 106 (S166). Finally, the glass rod 106 is surface treated to produce a preform 107 (S168).

As shown above, before each elongating (S154), end drawing (S158) and fire polishing (S162) process, the diameter is measured in the corresponding location along the axial direction of the glass rod 106. From this data, the heating condition and elongating speed for the next process can be accurately set. Therefore, a glass rod 106 of consistently high quality can be manufactured.

FIG. 27 shows an example which provides a cooling device 330 on the fixed chuck 118 and the movable chuck 119 of the glass rod second elongating apparatus 111. The cooling device 330 protects the fixed chuck 118 and movable chuck 119 from the radiant heat generated from the heating source 122. This is achieved by circulating cooling water around the fixed chuck 118 and the movable chuck 119. The cooling device 330 uses a gas or liquid as a cooling medium.

The deformation of the fixed chuck 118 and the movable chuck 119 can be controlled by providing the cooling device 330 on the fixed chuck 118 and the movable chuck 119. This allows control of the degree of temperature rise of the fixed chuck 118 and the movable chuck 119. Therefore, the accuracy of transfer of the driving force that rotates the glass rod 106 is maintained, and the heating of the glass rod 106 becomes more even. Therefore, fluctuation of the diameter of the glass rod 106 decreases.

EXAMPLE

A glass rod 106 of 50 mm diameter and 1000 mm length was fire polished by a fixed chuck 118 and movable chuck 119 that has a cooling device 330 and a heating source 122 shown in FIG. 27. Oxygen ($O_2$) of 150 SLM and hydrogen ($H_2$) of 300 SLM are supplied to the heating source 122 as combustion gas. The glass rod 106 is rotated at a speed of 15 rpm. The glass rod 106 is fire polished by moving the heating source 122 relative to the glass rod 106 at a speed of approximately 20 mm/min.

FIG. 28 shows the temperature of the fixed chuck 118 and movable chuck 119 of the above example and the comparative example shown below. The vertical axis shows the temperature of the fixed chuck 118 and movable chuck 119, and the horizontal axis shows the processing time of the fire polishing. The temperature of the fixed chuck 118 and movable chuck 119 of the example was maintained at a low temperature of about 45° C. The resultant fluctuation of the driving force that rotates the glass rod 106 caused by the deformation of the fixed chuck 118 and movable chuck 119 was small. Therefore the fluctuation of the diameter of the fire polished glass rod 106 was only 0.02%.

Comparative Example

The glass rod 106 was fire polished under the same conditions as the above example except for the removal of the cooling device 330 from the fixed chuck 118 and movable chuck 119 shown in FIG. 27. As shown in FIG. 28, the temperature of the fixed chuck 118 and movable chuck 119 reached approximately 100° C. The fixed chuck 118 and movable chuck 119 were deformed as a result, so the driving force that rotates the glass rod 106 fluctuates. The fluctuation of the diameter of the glass rod 106 after fire polishing increased to 1.0%, which is larger than the degree of fluctuation of the above example.

FIG. 29 shows a relationship between the distance between the heating source 122 and the diameter measurement device 124 and the percentage of the fluctuation of the diameter of the glass rod 106. The fluctuation rate (%) of the diameter of the glass rod 106 represents the (maximum value of the diameter of the glass rod 106−minimum value of the diameter of the glass rod 106)/(average diameter)× 100.

The diameter measurement device 124 of the glass rod second elongating apparatus 111 shown in FIG. 25 is provided on a location which is a constant distance, from 10 mm to 50 mm, away from the heating source 122. Therefore, the diameter of the glass rod 106 can be accurately measured allowing accurate control of the diameter of the glass rod 106.

When elongating the glass rod 106, the position of highest temperature in the glass rod 106 is slightly different to the position that the heating source 122 is heating because the heating source 122 is moving. The elongating speed per unit length becomes largest at the location where the temperature of the glass rod 106 is highest.

It is desirable to control the heating power of the heating source 122 and the moving speed of the movable chuck 119 based on the diameter at the position of the largest elongating speed and the target value of the diameter. The moving speed of the movable chuck 119 is controlled based on the difference between the target value of the diameter and the diameter that is measured at the position that the elongating speed of the glass rod 106 is largest. This can be done by providing the diameter measurement device 124 on a position that is a constant distance away from the heating source 122.

The position, which is a constant distance away from the heating source 122, ranges from 10 mm to 50 mm away from the position where the heating source 122 is provided in the opposite direction to the moving direction of the heating source 122. Therefore, the diameter measurement device 124 is provided on a position 10 mm to 50 mm away from the heating source 122 in the opposite direction of the moving direction of the heating source 122.

If the heating source 122 used to heat the glass rod 106 is an oxygen hydrogen burner, the flow rate of the hydrogen gas supplied to the heating source 122 is set from 30 liters/minute to 500 liters/minute. The ratio of the flow rate of the hydrogen gas to the oxygen gas is set from 1.5 to 3.0. The moving speed of the heating source 122 is controlled within the limits of 2 mm/minute and 65 mm/minute. The heat quantity will be insufficient if the flow rate of the hydrogen gas is less than 30 liters/minute, and the fuel will be wasted if the flow rate of the hydrogen gas is more than 500 liters/minute. It is difficult to elongate the glass rod 106 if the ratio of the flow rate of the hydrogen gas to the oxygen gas is out of the range shown above because the heat quantity becomes insufficient.

If the heating source 122 to heat the glass rod 106 is a propane gas burner, the flow rate of the propane gas supplied to the heating source 122 is set from 1 liter/minute to 15 liters/minute. The ratio of the flow rate of the propane gas to the oxygen gas is set from 0.1 to 0.3. The moving speed of the heating source 122 is controlled within the limits of 2 mm/minute and 65 mm/minute. The heat quantity will be insufficient if the flow rate of the propane gas is less than 1 liter/minute, and the fuel will be wasted if the flow rate of the propane gas is more than 15 liters/minute. Furthermore, it is difficult to elongate the glass rod 106 if the ratio of the flow rates of the propane gas to oxygen gas is out of the range shown above because the heat quantity becomes insufficient. The moving speed of the heating source 122 would preferably be controlled within the limit of 2 mm/minute and 65 mm/minute. It takes too much time elongating the glass rod 106 if the moving speed of the heating source 122 is below 2 mm/minute. Alternatively, it is difficult to elongate the glass rod 106 if the moving speed of the heating source 122 is more than 65 mm/minute because the speed is too fast to heat the glass rod 106 to its core.

Example 1

The elongation of the glass rod 106 was begun by setting the distance between the heating source 122 and the diameter measurement device 124 as 15 mm. During the elongation of the glass rod 106, the moving speed of the heating source 122 and the tail stock 116 were controlled based on the difference between the measured diameter of the glass rod 106 and the target diameter. The burning conditions of the heating source 122 were set including the flow rate of the hydrogen gas at 224 liters/minute, the ratio of the flow rate of the hydrogen to oxygen as 2.5, and the moving speed of the heating source 122 as 11 mm/minute. The fluctuation rate of the diameter of the glass rod 106 after the elongating process was 0.9%.

Example 2

The distance between the heating source 122 and the diameter measurement device 124 was set to 40 mm. The flow rate of the hydrogen gas was set to 199 liters/minute. The ratio of the flow rate of the hydrogen to oxygen was set to 2.5. The moving speed of the heating source 122 was set to 13 mm/minute. The fluctuation rate of the diameter of the glass rod 106 after the elongating process was 0.6%.

Comparative Example 1

The distance between the heating source 122 and the diameter measurement device 124 was set to 5 mm. The flow rate of the hydrogen gas was set to 209 liters/minute. The ratio of the flow rate of the hydrogen to oxygen was set to 2.5. The moving speed of the heating source 122 was set to 12 mm/minute. Because the distance between the heating source 122 and the diameter measurement device 124 was too close, the fluctuation rate of the diameter of the glass rod 106 after the elongating process was 3.7%. This is larger than the fluctuation rate of example 1 and example 2 above.

Comparative Example 2

The distance between the heating source 122 and the diameter measurement device 124 was set to 60 mm. The flow rate of the hydrogen gas was set to 237 liters/minute. The ratio of the flow rate of the hydrogen to oxygen was set to 2.5. The moving speed of the heating source 122 was set to 10 mm/minute. Because the distance between the heating source 122 and the diameter measurement device 124 was too far, the fluctuation rate of the diameter of the glass rod 106 after the elongating process was 2.5%. This fluctuation rate is larger than the fluctuation rate of example 1 and example 2 above.

Comparative Example 3

The distance between the heating source 122 and the diameter measurement device 124 was set to 15 mm. The flow rate of the hydrogen gas was set to 215 liters/minute. The ratio of the flow rate of the hydrogen to oxygen was set to 1.0. The moving speed of the heating source 122 was set to 12 mm/minute. Because the ratio of the flow rate of the hydrogen to oxygen was 1.0, which was smaller than the recommended 1.5 minimum, the glass rod 106 could not be elongated.

Comparative Example 4

The distance between the heating source 122 and the diameter measurement device 124 was set to 15 mm. The flow rate of the hydrogen gas was set to 195 liters/minute. The ratio of the flow rate of the hydrogen to oxygen was set to 4.0. The moving speed of the heating source 122 was set to 13 mm/minute. Because the ratio of the flow rate of the hydrogen to oxygen was 4.0, which was larger than the recommended 3.0 maximum, the glass rod 106 could not be elongated.

Comparative Example 5

The distance between the heating source 122 and the diameter measurement device 124 was set to 15 mm. The flow rate of the hydrogen gas was set to 204 liters/minute. The ratio of the flow rate of the hydrogen to oxygen was set to 2.5. The moving speed of the heating source 122 was set to 70 mm/minute. Because the moving speed of the heating source 122 was 70 mm/minute, which was larger than the 65 mm/minute recommended maximum speed, the glass rod 106 could not be elongated.

FIG. 30 shows a glass rod second elongating apparatus 111 which has a configuration providing a tensile stress measurement device 282 on the glass rod second elongating apparatus 111 shown in FIG. 25. The glass rod second elongating apparatus 111 has a tensile stress measurement device 282, which measures the tensile stress applied to the glass rod 106, on the movable chuck 119.

The glass rod second elongating apparatus 111 can detect the position of the heating source 122 on the moving stand 120 using the moving stand encoder 272. The tensile stress measurement device 282 is connected to a control unit 280. The control unit 280 controls the moving speed of the tail stock 116 based on the tensile stress of the glass rod 106, provided from the tensile stress measurement device 282. This is undertaken until the moving distance of the heating source 122 reaches a prescribed distance.

FIG. 31 shows a detailed flow chart of the elongating (S154) shown in the FIG. 26. First, the glass rod 106 is pre-heated until the prescribed region of the glass rod 106 is melted and softened by the heating source 122. This will allow elongation of the glass rod 106 (s132). Next, the heating source 122, which is provided on the moving stand 120, is moved via the moving stand 120. The moving speed of the heating source 122 would ideally be as slow as possible at the early stage of the elongation so that the fluctuation of the diameter of the glass rod 106 can be reduced. The movement of the heating source 122 would also be a constant speed. The amount of gas supplied to the heating source 122 can be constant.

Next, the moving speed of the tail stock 116 is controlled so that the tensile stress of the glass rod 106 measured by the tensile stress measurement device 282 lies within substantially 80% to 110% of the average value of the tensile stress at the steady state (S136). The steady state will be explained below. The moving speed of the tail stock 116, which was originally set based on the diameter at a plurality of locations of the glass rod 106 along the axial direction, is re-set based on the tensile stress of the glass rod 106. The glass rod 106 is elongated by the tensile stress load shown above until the heating source moves substantially 50 mm to 150 mm (S138).

If the control unit 280 detects that the heating source 122 has moved substantially from 50 mm to 150 mm (S138), the moving speed of the tail stock 116 changes to the speed at the steady state, which will be explained below. This is done by controlling the tail stock driving encoder 273 (S140). The diameter measurement device 124 measures the diameter of the glass rod 106 during the elongation of the glass rod 106 (S142). The elongation of the glass rod 106 is finished when the glass rod 106 is elongated to the desired diameter and length (S144).

The speed at the steady state is the speed where the material balance before the elongation and after the elongation is balanced. Here, the original diameter of the glass rod 106 before the elongation is represented as $D_1$, the target diameter to be obtained as $D_2$, the moving speed of the heating source 122 as $V_1$, and the speed of the elongation of the glass rod 106 as $V_2$.

For example, assume that the elongation takes place only at the region heated at that time, so the region heated and elongated is quite small. The $V_2$ is equal to the speed at the steady state when the following equation is valid.

$$D_1^2 V_1 = D_2^2 (V_1 + V_2)$$

Therefore, the $V_2$ can be set by adjusting the $V_1$ and the moving speed of the tail stock 116 based on the $D_1$ and the $D_2$. The tensile stress of the glass rod 106 at the steady state is the tensile stress when the glass rod 106 is elongated with the tail stock 116 moving speed at the steady state.

FIG. 32 shows a process where the diameter fluctuates during the elongation of the glass rod 106. The glass rod 106 softens when heated. As shown in FIG. 32(1), it may happen that the glass rod 106 cannot be softened enough by the pre-heating only to be elongated. The tensile stress generated on the glass rod 106 increases from twice to triple the normal tensile stress when the heating source 122 and the tail stock 116 start to move at the prescribed speed. Then, the region which is pre-heated is elongated rapidly, and the diameter of the pre-heated region is reduced as shown in shaded portion of FIG. 32(2). The elongation of the glass rod 106 occurs almost entirely in the pre-heated region, and the region which is heated newly by the heating source 122, is less elongated. Therefore, necking of the diameter has occurred on the glass rod 106 as shown in FIG. 32(3).

The fluctuation of the diameter of the glass rod 106 tends to occur at the region from the starting place of the elongation of the glass rod 106 to the place 50 mm away from the starting place. If the elongation is progressed further than this place, the speed of providing the heat to the glass rod 106, the speed that the glass rod 106 softens, and the elongation speed of the glass rod 106 are balanced to be a steady state. Therefore, the fluctuation of the diameter of the glass rod 106 will not occur as shown in FIG. 32(4).

The glass rod 106 is elongated by controlling the moving speed of the tail stock 116. The aim is to keep the tensile stress of the glass rod 106 at the early stage of the elongation at substantially 110% or less of the average value of the tensile tension at the steady state. The fluctuation of the diameter at the early stage of the elongation of the glass rod 106 can thus be decreased. This is because the heat supply to the glass rod 106, the soften speed of the glass rod 106, and the elongation speed of the glass rod 106 can be balanced.

If the tensile stress of the glass rod 106 at the early stage is lower than 80% of the steady state, the distance required for the diameter of the glass rod 106 to reach the target value becomes long. Therefore, the region of the elongated glass rod 106 that can be used as product becomes short. This decreases the yield factor of the process and increases the time taken for the glass rod 106 to reach the target diameter. Therefore, it is desirable to control the tensile stress of the glass rod 106 at the early stage of the elongation in the range of substantially from 80% to 110% of the average value of the tensile stress at the steady state.

FIG. 33 shows a glass rod 106 that is elongated according to the elongating (S154) shown in FIG. 31. First, as shown in FIG. 33(1) and (2), the heating source 122 and the tail stock 116 start to move after the pre-heating of the glass rod 106 to start the elongation of the glass rod 106. Because the tensile stress of the glass rod 106 is controlled to be 110% or less of the tensile stress at the steady state, excessive tensile stress is not applied to the glass rod 106. No necking therefore occurs on the glass rod 106 due to rapid elongation. If the heating source 122 moves the prescribed distance under this balanced condition, the heat supplied to the glass rod 106, the soften speed of the glass rod 106, and the elongation speed of the glass rod 106 are balanced. Thus the fluctuation of the diameter of the glass rod 106 can be prevented.

Fluctuation of the diameter may occur if the moving speed of the tail stock 116 continues to be controlled based on the tensile stress. The tensile stress of the glass rod 106 will change with small changes in the heat quantity provided by the heating source 122. The moving speed of the tail stock 116 then fluctuates to maintain the tensile stress of the glass rod 106 at a constant, resulting in fluctuation of the diameter of the elongated glass rod 106. Therefore, fluctuations in the diameter of the glass rod 106 caused by subtle fluctuations of the tensile stress can be prevented by changing the moving speed of the tail stock 116 to the speed at the steady state after the heating source 122 moves a prescribed distance on commencement of elongation.

The change in moving speed of the tail stock 116 to the speed of the steady state is made when the heating source 122 has moved substantially from 50 mm to 150 mm from the point of the start of the elongation. Until the heating source 122 moves 50 mm from the point of commencement of elongation, the heat supplied to the glass rod 106, the soften speed of the glass rod 106, and the elongation speed of the glass rod 106 are not balanced. The result is, necking of the glass rod 106 will occur due to the fluctuation of the diameter if the elongation speed is changed to the speed of the steady state before the heating source 122 has moved 50 mm. The tensile stress of the glass rod 106 should thus be controlled to be substantially 110% or less of the steady state until the heating source 122 moves substantially 50 mm. It is desirable to change the moving speed of the tail stock 116 to the speed of the steady state before the heating source 122 moves more than substantially 150 mm.

EXAMPLE

The glass rod 106 was elongated by the glass rod second elongating apparatus 111. The glass rod 106 had an outside diameter of 65 mm and length of 980 mm. The dummy rods 108, which had outside diameters of 60 mm and lengths of 250 mm, were welded on both ends of the glass rod 106. The rotation speed around the axis during the welding of the glass rod 106 and the dummy rod 108 was 30 rpm. An oxygen hydrogen burner was used for the heating source 122. The oxygen gas and hydrogen gas provided to the heating source 122 was 96 liters/minute and 240 liters/minute respectively.

After pre-heating of the glass rod 106, the elongation of the glass rod was started by moving the heating source 122 at a moving speed of 12.4 mm/min. When elongating the glass rod 106 to reduce the diameter of the glass rod 106 from 65 mm to 50 mm, the tensile stress at the steady state was about 100 kgf/cm$^2$, and the moving speed of the tail stock 116 at the steady state was 8.6 mm/min. The moving speed of the tail stock 116 was controlled so that the tensile stress did not exceed 110 kgf/cm$^2$ until the heating source 122 had moved 100 mm from the starting point of the elongation. After the heating source 122 moved 100 mm, the glass rod 106 was elongated by controlling the moving speed of the tail stock 116 to 8.6 mm/min, which is the speed at the steady state.

FIG. 34 shows the tensile stress of the glass rod 106 at the early stage of the elongation of the example. The vertical axis shows the tensile stress generated in the glass rod 106 and the horizontal axis shows the moving distance of the heating source 122 after the start of elongation. The tensile stress of the glass rod 106 was 110 kgf/cm$^2$ or less at the early stage of the elongation while the heating source 122 moved forward 100 mm.

FIG. 36 shows the fluctuation of the diameter of the glass rod 106 after the elongation of the glass rod 106. The vertical axis shows the distance along the radiant direction of the glass rod 106, and the horizontal axis shows the distance along the longitudinal direction of the glass rod 106. The glass rod 106 elongated by the method according to the example had few diameter fluctuations such as necking, and the diameter of the glass rod 106 could be reduced to the target diameter at about 100 mm of the longitudinal distance after the elongation started. The accuracy of the diameter of the glass rod 106 at the region which was elongated at the speed of the steady state by the method according to the example was about the same accuracy as the diameter of the glass rod 106 which was elongated by the conventional elongating method.

Comparative Example

A glass rod 106 with a diameter of 65 mm was elongated to a diameter of 50 mm. The conditions of the moving speed and the amount of gas to the heating source 122 were the same as the above example. The glass rod 106 was elongated by controlling the moving speed of the tail stock 116 to 8.6 mm/min from the start of the elongation. This is the speed at the steady state.

FIG. 35 shows a fluctuation of the tensile stress of the glass rod 106 at the early stage of the elongation of the comparative example. The vertical axis shows the tensile stress generated in the glass rod 106, and the horizontal axis shows the moving distance of the heating source 122 after commencement of elongation. The tensile stress of the glass rod 106 increased to 300 kgf/cm$^2$ at the early stage of the elongating, which is 3 times greater than the tensile stress of the steady state. This occurred whilst the heating source 122 was moving the initial 100 mm.

As shown in FIG. 36, the glass rod 106 after the elongation of the comparative example had large necking at about 100 mm from the start of the elongation. Because the undulation continues until about 300 mm from the start of the elongation, this region cannot be used as product, and the yield rates decreased.

FIG. 37 shows a detailed flow chart of the end drawing (S158) shown in FIG. 26. First, the position, of the glass rod 106 which has been end-drawn is detected (S169). Next, the prescribed region of the glass rod 106 is pre-heated by the flame of the heating source 122 (S170) until the prescribed region nearly softens. Then, the glass rod 106 is elongated by heating the prescribed region of the glass rod 106 with the heating source 122 and moving the tail stock 116 so that the diameter of the prescribed region is reduced (S172).

The heating source 122 is moved from the center of the prescribed region to a region towards the middle side of the glass rod 106. Then, the heating source 122 heats the glass rod 106 secondly (S174) with a flame. The thickness of this flame is smaller than the thickness of the flame of the pre-heating (S170). The prescribed region of the glass rod 106 is further elongated by moving the tail stock 116 so that the diameter of the prescribed region is reduced (S176). Then, the prescribed region of the glass rod 106 is fused by the flame. Again the thickness of this flame is smaller than the thickness of the flame of the pre-heating (S170).

FIG. 38 shows a cut 284 that is provided as a mark on the connection between the glass rod 106 and the dummy rod 108. This allows the detection of the position of the end drawing at the end drawing position detecting (S169) shown in FIG. 37. A mark is provided on the connection between the glass rod 106 and the dummy rod 108. The device that recognizes the mark is installed on the glass rod second elongating apparatus 111 to detect the location of the mark.

The position of the start of the end drawing process is set based on the detected mark location. The elongation process of the glass rod 106 finishes at the set end drawing starting position, and the end drawing process of the glass rod 106 starts at the same time. The method shown in FIG. 38 is used when the device that recognizes the mark is a device that measures the diameter. An example of such a device would be a diameter measurement device 124.

FIG. 39 shows a fluorescent paint 287 that is applied on the connection between the glass rod 106 and the dummy rod 108 as another example of a mark. The method shown in FIG. 39 is used when the device that recognizes the mark is an image processing apparatus.

FIG. 40 shows the glass rod second elongating apparatus 111 that detects the cut 284 at end drawing position detecting (S169). First, the dummy rod 108 is welded on both ends of the glass rod 106. The glass rod 106, which has the dummy rod 108 on both sides, is fixed on the fixed chuck 118 and movable chuck 119, not shown in the figure. The cut 284 having depth of 3 mm is provided all around the welded position. The welded position results from the connection between the glass rod 106 and the dummy rod 108.

During the elongation of the glass rod 106, the diameter measurement device 124 measures the diameter of the glass rod 106. When the diameter measurement device 124 detects the position of the cut 284 by detecting a change in diameter of the glass rod 106, the glass rod second elongating apparatus 111 starts the end drawing. The position of commencement of the end drawing is slightly towards the middle direction of the glass rod 106 from the connection between the glass rod 106 and the dummy rod 108. Also, the position of commencement of the end drawing does not have a bubble or bubbles with a diameter of 0.3 mm or above. Then, the process is shifted from elongation to end drawing.

When a mark is the marking 287, fluorescent paint is applied on the connection between the glass rod 106 and the dummy rod 108. The camera of the image processing apparatus, which can detect the fluorescent paint, is installed on the position of the diameter measurement device 124, which is provided on the moving stand 120. The camera processes the picture of the glass rod 106 during the elongation of the glass rod 106. If the camera detects the fluorescent paint, the glass rod second elongating apparatus 111 starts the end drawing. The position of commencement of the end drawing is slightly towards the middle direction of the glass rod 106 from the connection between the glass rod 106 and the dummy rod 108. Also, the position of starting the end drawing does not have a bubble or bubbles with a diameter of 0.3 mm or above. Then, the process is shifted from elongation to end drawing.

FIG. 41 shows the movements of the heating source 122 and the tail stock 116 after detecting the position of the end drawing (S169) during the end drawing process of the glass rod 106 shown in flow chart of FIG. 37. At the pre-heating for end drawing (S170), the flame of the heating source 122 heats the glass rod 106 at the prescribed region until the glass rod 106 nearly softens. At elongating for end drawing (S172), the heating source 122 heats the prescribed region of the glass rod 106, and the tail stock 116 elongates the prescribed region of the glass rod 106. This therefore reduces the diameter of the prescribed region.

At second heating (S174), the tail stock 116 stops, and the heating source 122 moves in the direction towards the middle side of the region of the glass rod 106 (to the left in the figure), from the center of the prescribed region. Then, the heating source 122 heats the glass rod 106 by flame, the thickness of which is smaller than the thickness of the flame of the pre-heating (S170). At the second elongating for end drawing (S176), the heating source 122 moves further to the left side in the figure and heats the glass rod 106. The tail stock 116 also moves to elongate the prescribed region of the glass rod 106. At fusing for end drawing (S178), the heating source 122 heats the glass rod 106 by flame, the thickness of which is smaller than the thickness of the flame of the pre-heating (S170). The position of the heating source 122 is at the same position as the second elongating for end drawing (S176). The tail stock 116 moves to fuse the glass rod 106.

FIG. 42 shows an example of the settings of another method of the end drawing process at the end drawing (S158) shown in FIG. 37. This method controls the gas amount, the moving distance of the heating source 122, and the moving speed of the tail stock 116 based on the progress time of the end drawing process of the glass rod 106.

The gas amount, the moving distance of the heating source 122, and the moving speed of the tail stock 116 are set once. This setting is based on the location of the cut 284, the changes of the length and the diameter of the glass rod 106 along the axial direction at the second heating condition and elongating speed setting (S157). The glass rod second elongating apparatus 111 then resets the gas amount, the moving distance of the heating source 122, and the moving speed of the tail stock 116 based on the progress time of the end drawing process of the glass rod 106 at the end drawing (S158).

For example, at the pre-heating for the end drawing (S170), which is undertaken for 300 seconds, the moving distance of the heating source 122 is set to 0 mm. The moving speed of the tail stock 116 is set to 0 mm/minute. The amount of hydrogen ($H_2$) gas for the heating source 122 is set to 250 cc/minute. The amount oxygen ($O_2$) gas (inside) that is output from the inside nozzle of the heating source 122 is set to 30 cc/minute. The amount of oxygen ($O_2$) gas (outside) that is output from the outside nozzle of the heating source 122 is set to 100 cc/minute. The glass rod 106 is heated by the heating source 122, which is set according to the above conditions.

At the elongating for end drawing (S172), which is undertaken for 60 seconds, the amount of hydrogen ($H_2$) gas for the heating source 122 is set to 250 cc/minute. The amount of the oxygen ($O_2$) gas (inside) that is output from the inside nozzle of the heating source 122 is set to 30 cc/minute. The amount of oxygen ($O_2$) gas (outside) that is output from the outside nozzle of the heating source 122 is set to 100 cc/minute. The glass rod 106 is heated by the heating source 122, which is set according to the above conditions. With the moving distance of the heating source 122 at 0 mm, the tail stock 116 is moved at the speed of 10 mm/minute to elongate the glass rod 106.

At the second heating (S174), which is undertaken for 20 seconds, the moving speed of the tail stock 116 is set to 0 mm/minute. The moving distance of the heating source 122 is set to 15 mm. The amount of hydrogen ($H_2$) gas for the heating source 122 is set to 130 cc/minute. The amount of oxygen ($O_2$) gas (inside) that is output from the inside nozzle of the heating source 122 is set to 15 cc/minute. The amount oxygen ($O_2$) gas (outside) that is output from the outside nozzle of the heating source 122 is set to 50 cc/minute. The glass rod 106 is heated by the heating source 122, which is set according to the above conditions.

At the second elongating for end drawing (S176), which is undertaken for 180 seconds, the moving distance of the heating source 122 is increased from 15 mm to 25 mm. The amount of hydrogen ($H_2$) gas for the heating source 122 is set to 130 cc/minute. The amount oxygen ($O_2$) gas (inside) that is output from the inside nozzle of the heating source 122 is set to 15 cc/minute. The amount of oxygen ($O_2$) gas (outside) that is output from the outside nozzle of the heating source 122 is set to 50 cc/minute. The glass rod 106 is heated by the heating source 122, which is set according to the above conditions. The tail stock 116 is moved at a speed of 10 mm/minute to elongate the glass rod 106.

Finally, at the fusing for end drawing (S178), which is undertaken for 30 seconds, the heating source 122 does not move from the position at the second elongating for end drawing (S176), so the moving distance remains at 25 mm. The amount of hydrogen ($H_2$) gas for the heating source 122 is set to 130 cc/minute. The amount of oxygen ($O_2$) gas (inside) that is output from the inside nozzle of the heating source 122 is set to 30 cc/minute. The amount oxygen ($O_2$) gas (outside) that is output from the outside nozzle of the heating source 122 is set to 20 cc/minute. The glass rod 106 is heated by the heating source 122, which is set according to the above conditions. The tail stock 116 is moved at a speed of 120 mm/minute to fuse the glass rod 106.

The glass rod 106 with a diameter of 60 mm was end-drawn by the glass rod second elongating apparatus 111 according to the setting condition shown in FIG. 42. The shape of the preform at the region that was end-drawn, was a well formed circular cone shape. The length and the diameter of the region were 61 mm and 60 mm respectively. The time that was required for the end drawing process was 12 minutes.

FIG. 43 shows another example of the settings of other method of the end drawing process at the end drawing (S158) shown in FIG. 37. This method controls the gas amount, the moving speed of the heating source 122, and the moving speed of the tail stock 116 based on the moving distance of the tail stock 116.

The glass rod second elongating apparatus 111 detects the moving distance of the tail stock 116. The moving distance of the heating source 122, and the moving speed of the tail stock 116 are set once based on the location of the cut 284, the change of the length of the glass rod 106 along the axial direction, and the diameter of the glass rod 106 at the second heating condition and elongating speed setting (S157). The glass rod second elongating apparatus 111 resets the gas amount, the moving distance of the heating source 122, and the moving speed of the tail stock 116 based on the detected moving distance of the tail stock 116 at the end drawing (S158).

There is a case where the moving distance of the tail stock cannot be measured because the tail stock does not move. This might occur from lack of power of the tail stock driving motor 275 when the glass rod 106 is not heated sufficiently during the end drawing process. When the output of the tail stock driving motor 275 is not large enough, the AC servomotor, which can detect the torque of the output shaft, can be used for driving the tail stock 116. A threshold value can be set for the torque generated in the tail stock driving motor 275. When the torque exceeds the threshold value, the glass rod second elongating apparatus 111 can judge that the heating is insufficient. Then, the glass rod second elongating apparatus 111 can stop the driving of the tail stock 116 for a period of time and increase the gas amount supplied to the heating source 122.

The settings shown in FIG. 43 are the same as the settings shown in FIG. 42 except that the "Progress Time" setting changes to the "Tail Stock 116 Moving Distance" setting. The end drawing method shown in FIG. 43 also has the processes of pre-heating for end drawing (S170), elongating for end drawing (S172), the second heating (S174), second elongating for end drawing (S176), and fusing for end drawing (S178). The gas amount and moving distance of the heating source 122, and the moving speed of the tail stock 116 are set based on the moving distance of the tail stock 116 at each stage of the process.

For example, at the pre-heating for the end drawing (S170), because the moving speed of the tail stock 116 is set to 0 mm/minute, the time after the commencement of the pre-heating for end drawing is measured for 300 seconds. That is, for 300 seconds the moving distance of the heating source 122 is set to 0 mm. The amount hydrogen ($H_2$) gas for the heating source 122 is set to 250 cc/minute. The amount of oxygen ($O_2$) gas (inside) that is output from the inside nozzle of the heating source 122 is set to 30 cc/minute. The amount of oxygen ($O_2$) gas that is output from the outside nozzle of the heating source 122 is set to 100 cc/minute. The glass rod 106 is heated by the heating source 122, which is set according to the above conditions. When the time after the commencement of the pre-heating for end drawing passes 300 seconds, the process is shifted to next step.

At the elongating for end drawing (S172), whilst the moving distance is changed from 0 mm to 30 mm, the amount hydrogen ($H_2$) gas for the heating source 122 is set to 250 cc/minute. The amount of oxygen ($O_2$) gas (inside) that is output from the inside nozzle of the heating source 122 is set to 30 cc/minute. The amount oxygen ($O_2$) gas (outside) that is output from the outside nozzle of the heating source 122 is set to 100 cc/minute. The glass rod 106 is heated by the heating source 122, which is set according to the above conditions. With the moving distance of the heating source 122 as 0 mm, the tail stock 116 is moved at a speed of 10 mm/minute to elongate the glass rod 106.

At the second heating (S174), the moving speed of the tail stock 116 is set to 0 mm/minute so that the moving distance of the tail stock 116 remains at 30 mm. The moving distance of the heating source 122 is set to 15 mm. The amount of hydrogen ($H_2$) gas for the heating source 122 is set to 130 cc/minute. The amount of oxygen ($O_2$) gas (inside) that is output from the inside nozzle of the heating source 122 is set to 15 cc/minute. The amount of oxygen ($O_2$) gas (outside) that is output from the outside nozzle of the heating source 122 is set to 50 cc/minute. The glass rod 106 is heated by the heating source 122, which is set according to the above conditions. After the heating source 122 has moved 15 mm, the process is shifted to next step.

Then, at the second elongating for end drawing (S176), whilst the moving distance of the tail stock 116 is increased from 30 mm to 55 mm, the moving distance of the heating source 122 is increased from 15 mm to 25 mm. The amount hydrogen ($H_2$) gas for the heating source 122 is set to 130 cc/minute. The amount of oxygen ($O_2$) gas (inside) that is output from the inside nozzle of the heating source 122 is set to 15 cc/minute. The amount of oxygen ($O_2$) gas (outside) that is output from the outside nozzle of the heating source 122 is set to 50 cc/minute. The glass rod 106 is heated by the heating source 122, which is set according to the above conditions. The tail stock 116 is moved at a speed of 10 mm/minute to elongate the glass rod 106.

Finally, at the fusing for end drawing (S178), whilst the moving distance of the tail stock 116 increased from 55 mm to 100 mm, the heating source 122 did not move from the position at the second elongating for end drawing (S176). The moving distance therefore remains at 25 mm. The amount hydrogen ($H_2$) gas for the heating source 122 is set to 130 cc/minute. The amount of oxygen ($O_2$) gas (inside) that is output from the inside nozzle of the heating source 122 is set to 30 cc/minute. The amount of oxygen ($O_2$) gas (outside) that is output from the outside nozzle of the heating source 122 is set to 20 cc/minute. The glass rod 106 is heated by the heating source 122, which is set according to the above conditions. The tail stock 116 is moved at a speed of 120 mm/minute to fuse the glass rod 106.

Example 1

A glass rod 106 having a diameter of 60 mm was end-drawn according to the setting values shown in FIG. 43. An AC servomotor of 200 W was used for the tail stock driving motor 275. A rotary encoder that can detect the amount of rotation of the tail stock driving motor 275 was used as the tail stock driving encoder 273. The rotation speed of the tail stock driving motor 275 was controlled by the output of the tail stock driving encoder 273. The moving distance of the tail stock 116 was obtained by measuring the output of the tail stock driving encoder 273. The time required for the end drawing was 15 minutes. The shape of the processed glass rod 106 at the region which was end-drawn was a well formed circular cone shape. The length and the diameter of the region were 61 mm and 60 mm respectively.

Example 2

A glass rod 106 having a diameter of 60 mm was end-drawn according to the setting values shown in FIG. 43. A linear encoder that can detect the moving distance of the tail stock 116 was provided on the tail stock 116. The gas amount and the moving distance of the heating source 122, and the moving speed of the tail stock 116 were controlled based on the moving distance of the tail stock 116 detected by the linear encoder. The shape of the processed glass rod 106 at the region that was end-drawn was a well formed circular cone. The length and the diameter of the region were 65 mm and 60 mm respectively.

FIG. 44 shows a configuration of the heating source 122 of the glass rod second elongating apparatus 111. The bottom end of the outside pipe 285 of the heating source 122 is closed. The outside pipe 285 is connected to a combustible gas channel 312. This is a channel for hydrogen gas which is an example of a suitable combustible gas. The heating source 122 has a combustible gas flow rate control unit 314 placed in the combustible gas channel 312. All of the inside pipes 286 are connected to an oxygen gas channel 308 through the branching tool 316. The oxygen channel 308 is a channel for oxygen gas. An inert-gas channel 296 is connected to the oxygen gas channel 308 by the connecting element 302. An oxygen gas flow rate control unit 310 is installed between the connecting element 302 and the entrance of the oxygen gas channel 308.

The inert-gas channel 296 has a valve 300 and an inert-gas flow rate control unit 298. The heating source 122 has a control element 304 which controls a driving source 306 based on the data of the flow rate that is output from the oxygen gas flow rate control unit 310. The driving source 306 is connected to the valve 300. The combustible gas flow rate control unit 314 and the oxygen gas flow rate control unit 310 control the flow rate of the hydrogen gas $H_2$ and oxygen gas $O_2$ shown in the FIG. 42 and FIG. 43. A valve such as an electric valve or electromagnetic valve can be used as the valve 300. A three directional pipe or a three directional valve can be used for the connecting element 302.

FIG. 45 shows a plan view of the top of the heating source 122. A plurality of the inside pipes 286, each of which has an inside diameter of 1 mm and an outside diameter of 3 mm, is inserted into the outside pipe 285, which has an inside diameter of 30 mm. The inside pipes 286 are placed around the center of the outside pipe 285 in a plurality of rows of concentric circles.

The inside pipes 286 are placed with regular spacing intervals for each row. The closer the rows are towards the outside of the outside pipe 285, the higher the density of the intervals of the inside pipe 286 for the each row becomes. The inside pipes 286 can be installed inside the outside pipe 285 with a homogeneous density. Oxygen gas flows inside the oxygen gas outlet 288, which is inside of the inside pipe 286. A combustible gas flows inside the combustible gas outlet 290, which is inside of the outside pipe 285.

The movement of the heating source 122 will be explained below. Hydrogen gas flows into the outside pipe 285 through the combustible gas channel 312 from a hydrogen gas supply source, not shown in the figure. Oxygen gas is distributed to the inside pipe 286 by the branching tool 316. Oxygen gas is supplied from an oxygen gas supply source (not shown in the figure) through the oxygen gas channel 308. The hydrogen and oxygen gas are mixed at the top of the outside pipe 285. A flame 294 can be obtained by igniting the mixed gas.

According to the purpose of the processing of the glass rod 106, the quantity of the hydrogen and oxygen gas were adjusted by using the oxygen gas flow rate control unit 310 and the combustible gas flow rate control unit 314 to obtain the optimum flame condition. At this time, the signal that shows the flow rate of the oxygen gas is output from the oxygen gas flow rate control unit 310 to the control element 304. The linear speed of the oxygen gas is a value derived by dividing the flow rate of the oxygen gas by the area of the inside of the inside pipe 286.

If the linear speed of the oxygen gas is 1.0 m/sec or under, the control element 304 drives the driving source 306 and opens the valve 300. Then, nitrogen gas, which is an inert gas, flows into the oxygen gas channel 308 with a linear speed of 0.5 m/sec and is mixed with the oxygen gas. When changing the flow rate of the oxygen, the control element 304 drives the driving source 306 and closes the valve 300 if the linear speed of the oxygen reaches 1.1 m/sec.

When reducing the flow rate of the combustible gas and oxygen gas to make the flame smaller, the region of high temperature near the top of the inside flame moves from the top of the heating source 122. This is because the flame 294 diffuses as a result of mixing the inert-gas with oxygen gas. Therefore, the surface temperature of the top of the heating source 122 is maintained below 400° C., so that e oxidation of the heating source 122 can be prevented.

When strong heating power is needed, the valve 300 for the inflow of the inert gas is closed because the combustion temperature drops if inert gas is mixed. At this time, because the flame 294 is large owing to the increase of the flow rate of the combustible gas and oxygen gas, the region of high temperature of the flame 294 is no longer at the top of the heating source 122. Therefore, the surface temperature of the top of the heating source 122 is maintained below 400° C. The generation of a pulse caused by the opening and closing of the valve 300 can be prevented by setting a different linear speed value for the oxygen gas at the time of opening and closing of the valve 300. This should be set to 1.0 m/sec or below for opening and 1.1 m/sec or above for closing.

It is desirable that the inert gas has a linear speed of between 0.5 m/sec to 2 m/sec as it flows by the opening of the valve 300. The linear speed of the inert gas is calculated by dividing the flow rate of the inert gas by the area inside the oxygen gas outlet 288 of the inside pipe 286. If the linear speed of the inert gas is 0.5 m/sec or below, it is difficult to control the temperature of the top of the heating source 122. On the other hand, if the linear speed of the inert gas is 2.0 m/sec or above, the hydrogen gas burns incompletely, and the temperature of the flame 294 decrease.

If using a heating source 122 to heat the glass rod 106 with the flame 294, a metal oxide will not usually be generated at the top of the heating source 122. This is because the temperature of the top of the heating source 122 is maintained at 400° C. or below. Therefore, a metal oxide does not attach to the glass rod 106, and a glass rod 106 of high quality can be manufactured.

A glass rod 106 having an average diameter of 65 mm was elongated by a glass rod second elongating apparatus 111 that has heating source 122 controlling the flow rate of the inert gas. The ratio of the number of glass rods 106 having foreign matter such as metal oxide to the total numbers of processed glass rod 106 was 0.2%. This is a low value compared to the ratio of glass rods made by the conventional heating source 122. For comparison, the ratio of the number of glass rods 106 having foreign matter such as metal oxide to the total numbers of the processed glass rods 106 became a high value of 15% when the glass rod 106 was elongated by always closing the valve 300.

FIG. 46 shows a relationship between the linear speed of the oxygen gas and the temperature of the top of the heating source 122. This is illustrated for the case of always mixing oxygen gas with nitrogen gas having linear speed of 0.5 m/sec and of not mixing the oxygen gas with the nitrogen gas. The temperature of the top of the heating source 122 does not exceed 400° C. when mixing the nitrogen gas. The temperature reached 400° C. to 700° C. at the region where the linear speed of the oxygen gas was 1 m/sec or under when the nitrogen gas was not mixed. Therefore, the surface temperature of the heating source 122 can be controlled by mixing the oxygen gas with nitrogen gas when the linear speed of the oxygen gas is 1 m/sec or below.

FIG. 47 shows the shape of a tip of the preform 107, the diameter of which is reduced and which is fused at the end drawing (S158). The D represents the diameter of the preform 107. The O represents the location where the diameter of the preform 107 starts to be reduced. The P represents the location where the diameter D of the preform 107 is reduced to 1% or below the original diameter. The preform 107 has a taper shape, both ends of which can be shown by the equation $1/3D \leq L \leq 3D$. Here, L represents the length between the location O and the location P.

The time that the drawing reaches the steady state is the time from the setting of the preform 107 on the preform drawing apparatus 500 until the diameter and the drawn speed of the optical fiber reaches the prescribed value. When the preform 107 is drawn to an optical fiber, the original shape of the preform 107 influences the time it takes for the drawing to reach the steady state. This influence becomes larger as the diameter of the preform 107 becomes larger. Then, the time taken for the drawing to reach the steady state becomes longer.

The preform 107 having the shape of the equation $1/3D \leq L \leq 3D$ can reduce the time taken for the drawing to reach the steady state. If L<1/3D, the time taken for the diameter and the drawn speed of the optical fiber to reach the prescribed value increases because the time that the tip of the preform 107 drops down becomes longer. If L>3D, the time taken for the tip of the preform 107 to drop down can be decreased, but the time taken for the taper shape of the preform 107 to become the shape of the steady state of the drawing takes longer. Then, the time taken for the diameter and the drawn speed of the optical fiber to reach the prescribed value becomes longer. Therefore, it is best to make the shape of the taper of the preform 107 as L=D.

In the case of fusing the preform 107 by heating part of the preform 107 by a flame, a residual strain remains on both ends of the taper part of the preform 107. If the residual strain in the taper part is large, cracks can be generated on both ends of the preform 107 when a strong impact is applied on the preform 107. The cracks can also be generated on both ends of the preform 107 by a thermal impact generated by the welding of the preform 107 and the dummy rod. The quantity of the strain on both ends of the preform 107 would ideally be 40 kgf/cm$^2$ or below. The cracks generated on the preform 107 can be prevented by controlling the quantity of the residual strain remaining in the preform 107 at 40 kgf/cm$^2$ or below.

Example

A preform 107 with a diameter of 30 mm was drawn. The length L was set to 30 mm. The quantity of the strain remaining in the taper part of the preform 107 was 40 kgf/cm$^2$, and cracks were not generated during the welding of the preform 107 and the dummy rod. When the set diameter of the optical fiber was 125 μm and the speed of the drawing was 100 mm/min, the time that the drawing took to reach the steady state was a total of 20 minutes. The time from the setting of the preform 107 on the preform drawing apparatus 500 to the dropping of the tip of the preform 107 was 10 minutes. The time taken for the diameter and the drawn speed of the optical fiber to reach the prescribed value was 10 minutes.

Comparative Example 1

A preform 107 with a diameter of 30 mm was drawn. The length L was set to 5 mm. The quantity of the strain remaining in the taper part of the preform 107 was 40 kgf/cm$^2$, and cracks were not generated during the welding of the preform 107 and the dummy rod. When the set diameter of the optical fiber was 125 μm and the speed of the drawing was 100 mm/min, the time that the drawing reached d the steady state was a total of 50 minutes. The time from the setting of the preform 107 on the preform drawing apparatus 500 to the dropping of the tip of the preform 107 was 20 minutes. The time taken for the diameter and the drawn speed of the optical fiber to reach the prescribed value was 30 minutes.

Comparative Example 2

A preform 107 with a diameter of 30 mm was drawn. The length L was set to 100 mm. The quantity of the strain remaining in the taper part of the preform 107 was 40 kgf/cm,$_2$ and cracks were not generated during the welding of the preform 107 and the dummy rod. When the set diameter of the optical fiber was 125 μm and the speed of the drawing was 100 mm/min, the time taken for the drawing to reach the steady state was a total of 40 minutes. The time from the setting of the preform 107 on the preform drawing apparatus 500 to the dropping of the tip of the preform 107 was 10 minutes. The time taken for the diameter and the drawn speed of the optical fiber to reach the prescribed value was 30 minutes.

Comparative Example 3

A preform 107 with a diameter of 30 mm was drawn. The length L was set to be 30 mm. The quantity of the strain remaining in the taper part of the preform 107 was 60 kgf/cm$^2$. The preform 107 could not be drawn because cracks were generated during the welding of the preform 107 and the dummy rod.

As shown above, the time required for drawing the preform 107 to an optical fiber can be reduced by making the shape of the tip of the preform 107 as $1/3D \leq L \leq 3D$.

FIG. 48 shows another shape of the tip of the preform 107 that was end-drawn. The preform 107 shown in FIG. 48 has a fused part 332 on one end formed by a flame, and a cutting face 334 on the other end, which is cut mechanically. The fused part 332, which is shown in FIG. 48(*a*), is fused rapidly by a flame. The fused part 332, which is shown in FIG. 48(*b*), is fused gradually by reducing the diameter to form a taper part 336. A thin part 338 is provided on the tip of the fused part 332 shown in FIG. 48(*c*).

When drawing a preform 107 which has the taper part 336 as shown in FIG. 48(*b*), the time taken for the tip of the preform 107 to dropdown is short, and the quantity of preform 107 to be dropped is also small because the diameter of the fused part 332 is small. When drawing a preform 107 which has the taper part 336 and thin part 338 as shown in FIG. 48(c), the time taken for the tip of the preform 107 to drop down can be reduced to one third or less of the time required for the conventional shape of the preform 107. The loss in material caused by the dropping of the preform 107 can be limited to the small quantity of the thin part 338.

It is desirable that the shape of the thin part 338 occupies between 0.1 percent to 15 percent of the weight of the fused part 332. If the weight of the thin part 338 is smaller than 0.1 percent of the weight of the fused part 332, the effect produced by providing the thin part 338 cannot be obtained. On the other hand, if the weight of the thin part 338 is larger than 15 percent of the weight of the fused part 332, the time taken for the tip of the preform 107 to drop becomes long, and the loss of preform 107 increases during the drawing.

It is desirable that the diameter of the thin part 338 be between ½ to ¹/₁₀ of the diameter of the main body of the preform 107. If the diameter of the thin part 338 is within this range, the time required for the dropping of the tip of the preform 107 at the early stage of the drawing can be short. If the length of the thin part 338 is approximately one to five times this diameter, the loss of the preform 107 can be limited to a small quantity.

FIG. 49 shows a preform 107 that is damaged, before the preform 107 is surface treated at the surface treatment (S168) shown in the FIG. 26. The preform 107, which is elongated by the glass rod second elongating apparatus 111, is etched by hydrofluoric acid as a surface treatment. This cuts the cladding of the preform 107 chemically so that the preform 107 has the prescribed ratio of thickness of core to cladding.

The hydrofluoric acid etching treatment is a treatment that decomposes the bonds between the Silicon and oxygen of the glass. The hydrofluoric acid etching treatment cuts the surface of the preform 107 chemically at a speed of about 8 mm per one hour. However, if there is a crack or a concave on the surface of the preform 107, the place having the crack or concave is cut further to form a larger concave than the concave made on the other parts of the preform 107. This concave caused by the treatment of hydrofluoric acid etching is called a hydrofluoric concave. This hydrofluoric concave is the cause of the breaking of an optical fiber during the drawing of the preform 107 to an optical fiber.

A preform 107 without hydrofluoric concaves on its surface can be obtained by removing cracks and concaves on the preform 107 by polishing before the treatment of hydrofluoric acid etching. There is a method of fire polishing the preform 107 with the temperature above the strain point of the preform 107. During the fire polishing, the preform 107 is fire polished so that the unevenness of the surface will be within a 0.3 mm range. The generation of the hydrofluoric concave can be prevented by fire polishing the preform 107 before etching the preform 107 with hydrofluoric acid. This is possible because the quantity of the strain in the preform 107 can be decreased and a smooth surface without cracks can be obtained. Not only is fire polishing suitable, but also mechanical polishing can be used for polishing the preform 107.

FIG. 51 shows a number of hydrofluoric concaves generated in the preform 107 counted by visual inspection of the example and the comparative example. FIG. 52 shows the unevenness of the surface of the preform 107 after the treatment with the hydrofluoric acid etching of the example and the comparative example. In the pre-treating 1 shown in FIG. 51 and FIG. 52, the preform 107a having a diameter of 60 mm and a length of 1000 mm was damaged. First, the preform 107a and the other preform 107b, which had the same shape as the preform 107a, were placed on the floor.

Next, one end of the preform 107a was lifted to height of 10 cm while the other end remained on the floor. Then, the end of the preform 107 that was lifted was dropped onto the preform 107b so that the preform 107a had a crack. Each of a plurality of the preform 107a was damaged in 3 places at 20 cm intervals by the same method shown above. On the pre-treating 2 shown in FIG. 51 and FIG. 52, the preform 107a was lifted to a height of the 20 cm. The other procedure of damaging the preform 107 was same as pre-treating 1.

On the example shown in FIG. 51 and FIG. 52, each of the preform 107a was treated by the pre-treating 1 and pre-treating 2. Then, each of the preform 107a was fire polished with a burner that was provided with hydrogen gas at 250 ml/min and oxygen gas at 145 ml/min. Each of the fire polished preform 107a was treated by hydrofluoric acid etching at room temperature. The thickness of material etched from the exterior diameter of the preform 107 was one of 4 steps of 0.2 mm, 1.2 mm, 2.2 mm, and 3.2 mm. 10 pieces of the preform 107a were etched by hydrofluoric acid for each of the 4 steps of the etching thickness. The number of the hydrofluoric concaves was checked by visual inspection after the treatment by hydrofluoric acid etching.

FIG. 50 shows the preform 107a, which was treated by the hydrofluoric acid etching in the example shown in the FIG. 51 and FIG. 52. The unevenness of the surface of the preform 107a was obtained by measuring the difference of the diameter between the point which was shown by the mark X and the diameter of the point which was shown by the mark ○. The point which was shown by the mark X was the place damaged by contacting with preform 107b. The point which was shown by the mark ○ was a place 10 cm away from the point of the mark X, which was not damaged by contacting with preform 107b. The average value of the diameter of the 3 points shown by the mark X were used as the diameter of the each of the preform 107a.

In the comparative example shown in FIG. 51 and FIG. 52, each of the preform 107 treated by pre-treatment 1 and pre-treatment 2 were treated by hydrofluoric acid etching without fire polishing. The number of hydrofluoric concaves was assessed by visual inspection, and the unevenness of the surface was measured in the same way as the example. As shown in FIG. 52 and FIG. 53, the unevenness of the surface of the pre-treatment 2 was larger than the unevenness of the surface of the pre-treatment 1. This is because pretreatment 2 was lifted higher pre-treatment 1 in the damage process. Also, the number of hydrofluoric concaves generated by the hydrofluoric acid etching of the pre-treatment 2 was larger than the number of the hydrofluoric concaves of the pre-treatment 1.

The larger the quantity of the etching, the larger the unevenness of the surface of the preform 107. Also, the larger the quantity of the etching, the larger the number of hydrofluoric concaves generated by the hydrofluoric acid etching. The unevenness of the surface of the preform 107a of the example which was fire polished, was lower than the unevenness of the surface of the preform 107a of the comparative example, which was not fire polished.

The number of the hydrofluoric concave generated on the example is smaller than the number of the hydrofluoric concave generated on the comparative example as shown in FIG. 51. Therefore, the number of the hydrofluoric concave in the preform 107a and the unevenness of the surface of the preform 107a can be decreased by fire polishing the preform 107a before etching the preform 107a with hydrofluoric acid.

FIG. 53 shows another shape of the preform 107 which is surface treated. The preform 107 has a handle 340. The handle 340 is made of a silica glass and is installed on the cutting face 334 of the surface treated preform 107 shown in FIG. 48(c) by welding or mechanical processing. The preform 107 with a handle 340 can be installed onto the preform drawing apparatus 500 promptly when drawing the preform 107 to an optical fiber. The diameter of the handle 340, installed on the cutting face 334, can be smaller than the diameter of the preform 107 as shown in FIG. 53(b).

FIG. 54 shows an ultrasonic cleaning apparatus 404, which cleans the heating source 122. The ultrasonic cleaning apparatus 404 comprises an ultrasonic oscillator 396. A cleaning liquid 398 is contained inside of the ultrasonic cleaning apparatus 404. The cleaning liquid 398 contains 10 percent hydrofluoric acid and 3 percent nitric acid. The hydrofluoric acid dissolves the metal oxide generated on the surface of the outside pipe 285 and inside pipe 286 of the heating source 122. Oxidation of the surface of the outside pipe 285 and the inside pipe 286 does not readily occur if the outside pipe 285 and the inside pipe 286 are made of stainless steel. This is because iron, chromium, and nickel, which are contained in stainless steel, form a passive thin film on the surface of the stainless steel from the effect of the nitric acid, thus protecting the surfaces.

The cleaning liquid 398 can contain a soluble organic solvent. Examples of soluble organic solvents are alcohol, acetone, acetonitrile, and tetrahydrofuran. The heating source 122 can be soaked in the cleaning liquid 398 containing hydrofluoric acid and then soaked in the other cleaning liquid 398 which contains nitric acid. The ultrasonic oscillator 396 oscillates an ultrasonic wave of strength of 1 $W/cm^2$ to 2 $w/cm^2$.

The heating source 122 to be cleaned is made of stainless steel. The heating source 122 has a plurality of inside pipes 286, which have an internal diameter of 1 mm and an outside diameter of 3 mm. The inside pipes 286 are inside the outside pipe 285, which has an internal diameter of 30 mm. Hydrogen gas flows inside the outside pipe 285, and oxygen gas flows inside the inside pipe 286. The outside pipe 285 is connected to a hydrogen inlet pipe 392, and all the inside pipes 286 are connected to an oxygen inlet pipe 394.

When the glass rod 106 is heated by the flame of the heating source 122, the temperature of the top of the heating source 122 increases to a high temperature of between 400° C. to 700° C. Therefore, a metal oxide will be generated on the surface of the top of the heating source 122. The metal oxides gradually dislodges to become free floating particles if the heating source is used for a long time.

Particles of metal oxide or foreign matter impurities such as glass particles attached to the heating source 122 may be dislodged during the heat treatment of the glass rod 106. These particles can attach to the surface of the glass rod 106 in which case the surface layer of the glass rod 106 has to be polished. If the glass rod 106 is polished, the ratio of the diameter of the cladding and the core of the glass rod 106 will change. The characteristic of light transmission of an optical fiber made from the glass rod 106 will deteriorate as a result. Therefore, foreign matter impurities and metal oxides attached to the heating source 122 are removed from the heating source 122 by cleaning the heating source 122.

To clean the heating source 122 using the ultrasonic cleaning apparatus 404, first, the hydrogen inlet pipe 392 and oxygen inlet pipe 394 are opened to the outside. Then, the heating source 122 is soaked in the cleaning liquid 398 with the flame nozzle 390 directed downward. Any air remaining inside the outside pipe 285 and the inside pipe 286 is released through the hydrogen in let pipe 392 and oxygen inlet pipe 394. Following this, the outside pipe 285 and the inside pipe 286 are immersed and soaked in the cleaning liquid 398 to the top of the water level. The ultrasonic cleaning apparatus 404 then cleans the heating source 122 by oscillating the ultrasonic wave using the ultrasonic oscillator 396. The vibration frequency of the ultrasonic waves is 10 kHz to 100 kHz.

The heating source 122 was cleaned using the ultrasonic cleaning apparatus 404. Metal oxide was present around the stainless steel flame nozzle 390 of the heating source 122, which is used for heating the glass rod. The area around the flame nozzle 390 of the heating source 122 was soaked in the cleaning liquid 398. To clean the heating source 122, an ultrasonic wave with a vibration frequency of 10 kHz to 100 kHz was oscillated for 30 minutes by the ultrasonic oscillator 396 having output of 500 W. Then, the heating source 122 was removed from the ultrasonic cleaning apparatus 404 and any cleaning liquid 398 remaining on the surface of the heating source 122 was cleaned with pure water. The heating source 122 was then dried.

The top of the outside pipe 285 and the inside pipe 286 were inspected, and metal oxides and foreign matter impurities were not found in the outside pipe 285 and the inside pipe 286. The surface of the glass rod 106 was heat treated by the cleaned heating source 122. The ratio of the number of glass rods 106, which had foreign matter impurities attached, compared to the total number of treated glass rods 106 was 6 percent.

The surface of the glass rod 106 was heat treated by the heating source 122, which was not cleaned, for a comparison. In this case, the ratio of the number of glass rods 106, which had foreign matter impurities attached, to the total number of heat treated glass rods 106 was 15 percent. This is larger value than the ratio obtained by the cleaned heating source 122.

As shown above, the metal oxide and attached foreign matter generated on the top of the heating source 122 can be removed by cleaning the heating source 122 with the ultrasonic cleaning apparatus 404. A preform 107 of high quality can be obtained by heating the glass rod 106 with a heating source 122, which is cleaned by the ultrasonic cleaning apparatus 404, because less foreign matter is attached to glass rod 106.

FIG. 55 shows a configuration of the preform drawing apparatus 500 that draws the preform 107 to an optical fiber. The preform drawing apparatus 500 comprises a chuck 346, which holds a dummy rod 342 that is welded to the preform 107; a heating means 348 which heats the preform 107; movable support 344 which supplies the preform 107 to the heating means 348; a diameter measurement device 352 which measures the diameter of an optical fiber 350 drawn from the preform 107; a first coating device 354 which undertakes the first coating of the optical fiber 350; a first curing device 356 which cures the first coated optical fiber 350 by a ultraviolet rays; a second coating device 358 which coats the optical fiber 350 a second time; a second curing device 360 which cures the second coated optical fiber 350 by a ultraviolet rays; and a tractor 362 which winds the optical fiber 350.

To draw the preform 107 into an optical fiber 350 using the preform drawing apparatus 500, first, the dummy rod 342, which is welded to the preform 107, is held by the movable support 344 with the chuck 346. The starting end of the preform 107 is then set to the prescribed position of the heating means 348, and the preform 107 is heated. When the tip of the preform 107 softens and drops, the dropped tip of the preform 107 is caught and drawn out to be passed through the diameter measurement device 352.

When the diameter of the optical fiber 350 reaches the desired diameter, the optical fiber 350 is first coated with resin bypassing through the first coating device 354. The first coated optical fiber 350 is then passed through the first curing device 356 to be cured. The optical fiber 350 is then second coated by the second coating device 358 and cured by the second curing device 360. When the diameter and the speed of the drawing of the optical fiber 350 reaches a prescribed value, t he optical fiber 350 is wound onto a bobbin, not shown in the figure, through the tractor 362.

A preform 107 of high quality and little variation in diameter can be manufactured by the glass base material first drawing apparatus 900 and the glass rod second elongating apparatus 111 shown above. Therefore, optical fibers of high quality and reduced diameter variation can be manufactured by drawing the preform 107, manufactured by the glass base material first drawing apparatus 900 and the glass rod second elongating apparatus 111, using the preform drawing apparatus 500.

Although the present invention has been described by reference to specific embodiments, the scope of the present invention is not limited to these embodiments. Those skilled in the art can make various modifications and improvements to these embodiments of the present invention. It is clear from the appended claims that such modifications or improvements are also covered by the scope of the present invention.

What is claimed is:

1. A method for manufacturing an optical fiber comprising:
    first elongating a glass base material, which is a parent material of said optical fiber, in the vertical direction to produce a glass rod;
    second elongating said glass rod, which is produced by said first elongating, in the horizontal direction to produce a preform; wherein:
        said second elongating includes:
            setting a heating condition for heating said glass rod and an elongating speed of said glass rod based on a progress time of said elongation;
            heating and elongating said glass rod in a horizontal direction to generate a preform based on said heating condition and said elongating speed which are set by said setting; and
            drawing said preform to a filament-like form by further heating said preform to generate said optical fiber.

2. A method as claimed in claim 1, further comprising:
    end drawing said glass rod for reducing a diameter of an end of said glass rod to cut off a part of said glass rod that becomes said preform from a remaining part of said glass rod;
    wherein:
        said end drawing end-draws said end of said glass rod with heat and elongation based on said progress time of said end drawing.

3. A method as claimed in 1, wherein said setting sets a location of a burner, which heats said glass rod, and an amount of gas supplied to said burner as said heating condition based on said progress time of said elongation.

4. A method as claimed in claim 1, wherein said setting sets a moving speed of a chuck, which holds said glass rod, as said elongating speed based on said progress time of said elongation.

5. A method for manufacturing a preform, which is a parent material of an optical fiber, comprising:
    first elongating a glass base material, which is a parent material of said optical fiber, in the vertical direction to produce a glass rod;
    second elongating said glass rod, which is produced by said first elongating, in the horizontal direction to produce a preform; wherein:
        said second elongating includes:
            setting a heating condition for heating said glass rod, and an elongating speed of said glass rod based on a progress time of said elongation; and
            heating and elongating said glass rod to generate said preform based on said heating condition and said elongating speed which are set by said setting.

6. A method as claimed in claim 5 further comprising:
    end drawing said glass rod for reducing a diameter of an end of said glass rod to cut off a part of said glass rod that becomes said preform from a remaining part of said glass rod; wherein:
        said end drawing includes:
            pre-heating said glass rod until a prescribed region of said glass rod softens with a flame;
            elongating said prescribed region with heating said prescribed region for reducing a diameter of said prescribed region;
            second-heating a region which is more towards a middle side of said glass rod than a center of said prescribed region with a flame, a thickness of said flame being smaller than a thickness of said flame of said pre-heating;
            second-drawing said prescribed region with heating said prescribed region; and
            fusing said prescribed region with flame, the thickness of which is smaller than the thickness of the flame of said pre-heating, to cut off said prescribed region; and
            said heating condition and said elongating speed of said pre-heating, elongating, second-heating, second-elongating, and fusing are set based on a progress time of said end drawing.

7. A method as claimed in claim 6, further comprising:
    end drawing said glass rod for reducing a diameter of an end of said glass rod to cut off a part of said glass rod that becomes said preform from a remaining part of said glass rod; wherein:
        said end drawing end-draws said end of said glass rod with heat and elongation based on said progress time of said end drawing.

8. A method as claimed in claim 1 further comprising:
    end-drawing said glass rod for reducing a diameter of an end of said glass rod to cut off a part of said glass rod that becomes said preform from a remaining part of said glass rod; wherein
        said end drawing includes:
            pre-heating said glass rod until a prescribed region of said glass rod softens with a flame;
            elongating said prescribed region with heating said prescribed region for reducing a diameter of said prescribed region;
            second-heating a region which is more towards a middle side of said glass rod than a center of said prescribed region with a flame, a thickness of said flame being smaller than a thickness of said flame of said pre-heating;

second-elongating said prescribed region with heating said prescribed region; and fusing said prescribed region with flame, the thickness of which is smaller than the thickness of the flame of said pre-heating, to cut off said prescribed region; and said heating condition and said elongating speed of said pre-heating, elongating, second-heating, second elongating, and fusing are set based on a progress time of said end drawing.

* * * * *